US008057235B2

(12) United States Patent
Kuznar et al.

(10) Patent No.: US 8,057,235 B2
(45) Date of Patent: Nov. 15, 2011

(54) AGENT BASED MODELING OF RISK SENSITIVITY AND DECISION MAKING ON COALITIONS

(75) Inventors: Lawrence Anthony Kuznar, Albion, IN (US); William George Frederick, Fort Wayne, IN (US); Robert Louis Sedlmeyer, Fort Wayne, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1798 days.

(21) Appl. No.: 11/203,060

(22) Filed: Aug. 12, 2005

(65) Prior Publication Data

US 2006/0059113 A1    Mar. 16, 2006

Related U.S. Application Data

(60) Provisional application No. 60/600,947, filed on Aug. 12, 2004, provisional application No. 60/653,777, filed on Feb. 16, 2005.

(51) Int. Cl.
*G09B 19/00* (2006.01)

(52) U.S. Cl. ............... 434/236; 703/14; 706/13; 705/37; 463/1

(58) Field of Classification Search .................. 434/236; 703/14; 706/13; 705/37; 463/1
See application file for complete search history.

(56) References Cited

U.S. PATENT DOCUMENTS

| 5,730,654 | A * | 3/1998 | Brown | 463/1 |
| 6,210,272 | B1 * | 4/2001 | Brown | 463/1 |
| 6,829,569 | B1 * | 12/2004 | Drucker et al. | 703/6 |
| 7,590,589 | B2 * | 9/2009 | Hoffberg | 705/37 |
| 2005/0131746 | A1 * | 6/2005 | Beausoleil et al. | 705/7 |
| 2005/0197787 | A1 * | 9/2005 | Diedrich et al. | 702/20 |

OTHER PUBLICATIONS

Alvard MS and Kuznar L. Deferred Harvests: The Transition from Hunting to Animal Husbandry. American Anthropologist 103 (2):295-311.*
Alvard MS and Nolin, DA. Rousseau's Whale Hunt? Coordination among Big Game Hunters. Current Anthropology, vol. 43, No. 4, pp. 533-559, Aug./Oct. 2002.*
Kuznar LA. Herd Composition in an Aymara Community of the Peruvian Altiplano: A Linear Programming Problem. Human Ecology, vol. 19, No. 3, 1991.*
Kuznar, LA. Mathematical Models of Pastoral Production and Herd Composition in Traditional Andean herds. Journal of Quantitative Anthropology 3:1-17, 1991.*
Hartog J et al. Linking Measured Risk Aversion to Individual Characteristics. Kyklos, vol. 55, 2002, Fasc. 1, 3-26.*

(Continued)

*Primary Examiner* — Nikolai A Gishnock
(74) *Attorney, Agent, or Firm* — Barnes & Thornburg LLP

(57) ABSTRACT

An agent based model system provides simulation of the influence of environmental variables and tendencies in individual and social decision making relating to the formation of coalitions and ethnic groups. The system is based on improved understandings of human decision making under risk, and incorporates recent theoretical developments and computational tools. The system gives analysts the ability to predict the development of coalitions and ethnic groups, as well as the ability to manage the behavior of individuals in such groups. The model results provide confidence intervals for various possible scenarios in a mix of agents' decision rules and distribution of environmental resources. Applications include management of ethnic groups and violent conditions in unstable nations, the tracking of terrorist organizations, development of coalitions and oligopolies in business, and the modeling and interdiction of criminal organizations.

38 Claims, 30 Drawing Sheets

OTHER PUBLICATIONS

Mann BS. A Note on Risk Aversion and Preferences. Economic Inquiry, vol. XXIX, Jan. 1991, pp. 115-118.*

Alvard MS and Kuznar L. Deferred Harvests: The Transition from Hunting to Animal Husbandry. American Anthropologist, 103 (2):295-311 (2001).*

Dibble, C., and P. G. Feldman. "Combating Terrorrist Networks: Current Research in Social Network Analysis for the New Warfighting Environment." 8th International Command and Control Research and Technology Symposium, National Defense University, Washington, D.C., (Jun. 17-19, 2003), pp. 10.*

International Search Report and The Written Opinion of the International Searching Authority (Feb. 15, 2007).

Kirchkamp, Oliver, "Spatial evolution of automata in the prisoners' dilemma", Journal of Economic Behavior & Organization, vol. 43, 239-262 (2000).

Lee, Susan, "Assortative Interactions and Endogenous Stratification", Department of Economics, University of Wisconsin-Madison, 1-38 (May 14, 1999).

Pepper, John W. et al., "Agent-Based Modeling of Multilevel Selection: The Evolution of Feeding Restraint As a Case Study", Swarm User Group Meeting, 57-68 (2000).

Rankin, Frederick W. et al., "Strategic Similarity and Emergent Conventions: Evidence from Similar Stag Hunt Games*", Games and Economic Behavior, 32, 315-337 (2000).

Szilagyi, Miklos N. et al., "Non-Trivial Solutions to the N-Person Prisoners' Dilemma", Systems Research and Behavioral Science Syst. Res., 19, 281-290 (2002).

Collier, N. 2002. "Repast: An Extensible Framework for Agent Simulation," vol. 2002.

Danielson, P. 2002. Competition among Cooperators: Altruism and Reciprocity. Proceedings of the National Academy of Sciences 99 supplement 3:7237-7242.

Dibble, C., and P. G. Feldman. n.d. "Combating Terrorist Networks: Current Research in Social Network Analysis for the New Warfighting Environment." 8th International Command and Control Research and Technology Symposium, National Defense University, Washington, D.C., n.d., pp. 10.

Dombroski, M.. and K. Carley. 2002. "NETEST: Estimating a Terrorist Network's Structure." CASOS (Computational Analysis of Social and Organizational Systems) Proceedings, 2002, Pittsburg, 2002.

Epstein, J. M., and R. L. Axtell. 1996. Growing Artificial Societies: Social Science from the Bottom Up. Cambridge, Massachusetts, and Washington D.C.: MIT Press, and the Brookings Institute.

Friedman, M., and L. J. Savage. 1948. The Utility Analysis of Choices Involving Risk. Journal of Political Economy 4:279-304.

Gigerenzer, G. 2000. Adaptive Thinking: Rationality in the Real World. New York: Oxford University Press.

Gigerenzer, G. 2001. The Adaptive Toolbox, in Bounded Rationality: The Adaptive Toolbox. Edited by G. Gigerenzer and R. Selten, pp. 37-50. Cambridge, Massachusetts: MIT Press.

Gintis, H. 2000. Game Theory Evolving. Princeton: Princeton University Press.

Haynes, L. 2000. "Agents for Distributed Systems." Presented at Distributed Air/Ground Traffic Management Workshop, NASA, Ames, 2000.

Henrich, J., and R. Boyd. 1998. The Evolution of Conformist Transmission and the Emergence of Between-Group Differences. Evolution and Human Behavior 19:215-241.

Henrich, J., and F. Gil-White. 2001. The Evolution of Prestige: Freely Conferred Deference as a Mechanism for Enhancing the Benefits of Cultural Transmission. Evolution and Human Behavior 22:165-196.

Kahneman, D., J. L. Knetsch, and R. H. Thaler. 2000. "Anomalies: The Endowment Effect, Loss Aversion, and Status Quo Bias," in Choices, Values, and Frames. Edited by D. Kahneman and A. Tversky, pp. 159-170. New York: Cambridge University Press.

Kahneman, D., and A. Tversky. 1979. Prospect Theory: An Analysis of Decision Under Risk. Econometrica 47:263-291.

Kohler, T. A., and G. J. Gummerman. Editors. 2000. Dynamics in Human and Primate Societies: Agent-Based Modeling of Social and Spatial Processes. Oxford: Oxford University Press.

Krebs, V. E. 2002. Uncloaking Terrorist Networks. First Monday 7.http://firstmonday.org/issues/issue7_4/krebs/index.html.

Kuznar, L. A. 2002. Evolutionary Applications of Risk Sensitivity Models to Socially Stratified Species: Comparison of Sigmoid, Concave and Linear Functions. Evolution and Human Behavior 23:265-280.

Kuznar, L. A., and W. G. Frederick. 2003. Environmental Constraints and Sigmoid Utility: Implications for Value, Risk Sensitivity, and Social Status. Ecological Economics 46:293-306.

Luke, S., G. Catalin. L. P. Balan, C. Cioffi-Revilla, and S. Paus. 2003. "Mason: A Java Multi-Agent Simulation Library." Proceedings of the Agent 2003 Conference, 2003.

Lustick, I. S. 2002. PS-I: A User-Friendly Agent-Based Modeling Platform for Testing Theories of Political Identity and Political Stability. Journal of Artificial Societies and Social Simulation 5:1-37. http://jasss.soc.surrey.ac.uk/5/3/7.html.

MacKerrow, E. P. 2003. Understanding Why—Dissecting Radical Islamist Terrorism with Agent-Based Simulation. Los Alamos Science 28:184-191.

McCabe, J. T., and V. L. Smith. 2001. "Goodwill Accounting and the Process of Exchange," in Bounded Rationality: The Adaptive Toolbox. Edited by G. Gigerenzer and R. Selten, pp. 319-340. Cambridge, Massachusetts: MIT Press.

Parker, .M. 1999. "Ascape: An Agent-based modeling framework in Java." Proceedings of Agent Simulation: Applications, Models and Tools, 1999.

Tsvetovat, M., and K. M. Carley. 2002. "Knowing the Enemy: A Simulation of Terrorist Organizations and Counter-Terrorism Strategies." Computational Analysis of Social and Organizational Systems (CASOS) Conference 2002, Pittsburg, Pennsylvania, 2002.

Tversky, A., and D. Kahneman. 1981. The Framing of Decisions and the Psychology of Choice. Science 211:453-458.

Tversky, A. 1992. Advances in Prospect Theory: Cumulative Representation of Uncertainty. Journal of Risk and Uncertainty 5:297-323.

Winterhalder, B., F. Lu, and B. Tucker. 1999. Risk-Sensitive Adaptive Tactics: Models and Evidence from Subsistence Studies in Biology and Anthropology. Journal of Archaeological Research 7:301-348.

* cited by examiner

| PAYOFFS, WHERE R>T=P>S | | COLUMN PLAYER | |
|---|---|---|---|
| | | JOIN | DEFECT |
| ROW PLAYER | JOIN | (R, R) | (S, T) |
| | DEFECT | (T, S) | (P, P) |

| JOIN/JOINS | OBSERVED (DIFF) | EXPECTED |
|---|---|---|
| AMONG RISK PRONE | 70 (35.5) | 34.5 |
| AMONG RISK AVERSE | 10 (-24.5) | 34.5 |
| ACROSS PRONE/ AVERSE | 58 (-11) | 69 |
| TOTALS | 138 | 138 | df=2, Chi-SQUARE=55.681, p<0.0001

FIG. 6D

| PLAYER1/ PLAYER 2 | CLASS 1 (PRONE) | CLASS 2 (AVERSE) | CLASS 3 (PRONE) | CLASS 4 (AVERSE) | TOTALS |
|---|---|---|---|---|---|
| CLASS 1 (PRONE) | 20 | 7 | 18 | 9 | 54 |
| CLASS 2 (AVERSE) | 7 | 4 | 8 | 1 | 20 |
| CLASS 3 (PRONE) | 18 | 8 | 14 | 5 | 45 |
| CLASS 4 (AVERSE) | 9 | 1 | 5 | 4 | 19 |
| TOTALS | 54 | 20 | 45 | 19 | 138 | df=9, Chi-SQUARE=60.957, p<.0001

FIG. 6E

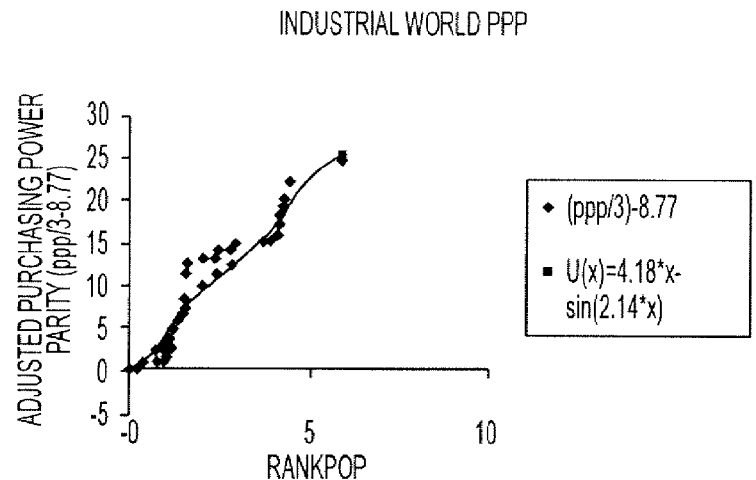
FIG. 20
| HYPOTHESIS | COALITIONS? | ENVIRONMENTAL INSTABILITY EFFECT | CYCLES | FRACTAL EFFECTS |
|---|---|---|---|---|
| H1: OPTIMIZATION | | SMALL | STRONG | MODERATE |
| H2: COMFORMISM | YES | STRONG | MODERATE | MODERATE |
| H3: PRESTIGE BIAS | | STRONG | STRONG | STRONG |
FIG. 21
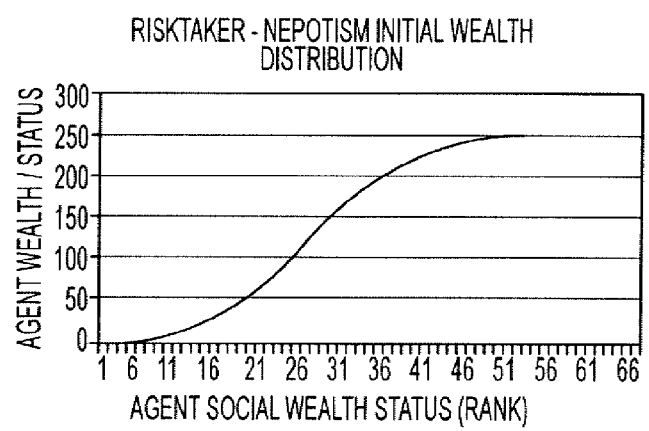
FIG. 22

| ECONOMIC ACTIVITY | ISIC | NUMBER OF ENTERPRISES | NUMBER OF PERSONS ENGAGE | COMPENSATION OF EMPLOYEES | OUTPUT | INTERMEDIATE CONSUMPTION | GROSS VALUE ADDED | G.F.C.F | N | N PER WORKER |
|---|---|---|---|---|---|---|---|---|---|---|
| OTHER MINING AND QUARRYING | 14 | 301 | 1542 | 4028.5 | 16113.4 | 5864.8 | 10248.6 | 142.7 | 1542 | 2.61 |
| MANUFACTURE OF FOOD AND BEVERAGES | 15 | 1532 | 7439 | 20151.3 | 237475.6 | 135775.9 | 101699.7 | 1504.3 | 7439 | 2.71 |
| MANUFACTURE OF TOBACCO PRODUCTS | 16 | 8 | 211 | 1440.3 | 65029.1 | 35979.6 | 29049.5 | 107.8 | 211 | 6.83 |
| MANUFACTURE OF TEXTILES | 17 | 286 | 1711 | 5315.5 | 46982.1 | 26527.5 | 20454.6 | 829.5 | 1711 | 3.11 |
| MANUFACTURE OF WEARING APPAREL | 18 | 2274 | 14926 | 29454.6 | 82791.2 | 32240.9 | 50550.3 | 250.5 | 14926 | 1.97 |
| TANNING OF LEATHER; MANUFACTURER OF BAGS | 19 | 695 | 2932 | 4296.2 | 29185 | 15899.2 | 13285.8 | 194 | 2932 | 1.47 |
| MANUFACTURE OF WOOD AND ITS PRODUCTS | 20 | 838 | 2265 | 2760.8 | 21534 | 13064.4 | 8449.6 | 225.3 | 2265 | 1.22 |
| MANUFACTURE OF PAPER AND ITS PRODUCTS | 21 | 45 | 423 | 1556.2 | 14117.2 | 10358.8 | 3758.4 | 167.4 | 423 | 1.22 |
| PUBLISHING, PRINTING AND REPRODUCTION | 22 | 159 | 816 | 2298 | 11996.1 | 7544.7 | 4451.4 | 43.6 | 816 | 3.68 |
| MANUFACTURE OF CHEMICALS & ITS PRODUCTS | 24 | 158 | 1750 | 7019.1 | 62463.8 | 31287.9 | 31175.9 | 805.6 | 1750 | 2.82 |
| MANUFACTURE OF RUBBER AND PLASTIC | 25 | 128 | 1167 | 3264 | 31720.8 | 20139.9 | 11580.9 | 1788.8 | 1167 | 4.01 |
| MANUFACTURE OF NON-METALLIC PRODUCTS | 26 | 1730 | 10403 | 28439.8 | 193383.2 | 124540.4 | 68842.8 | 765 | 10403 | 2.80 |
| MANUFACTURE OF BASIC METALS | 27 | 20 | 47 | 68.8 | 464.6 | 257.8 | 206.8 | 0 | 47 | 2.73 |
| MANUFACTURE OF METAL PRODUCTS | 28 | 2902 | 6110 | 7642.6 | 82208.2 | 50727.2 | 31481 | 211.1 | 6110 | 1.46 |
| MANUFACTURE OF MACHINERY AND EQUIPMENT | 29 | 199 | 762 | 1982.9 | 14097.7 | 7591 | 6506.7 | 124.2 | 762 | 1.25 |
| MANUFACTURE OF ELECTRICAL MACHINERY | 31 | 80 | 287 | 428.2 | 3668.8 | 2151.4 | 1517.4 | 3.4 | 287 | 2.60 |
| MANUFACTURE OF MEDICAL, OPTICAL EQUIP. | 33 | 46 | 95 | 268.6 | 1441.7 | 528.3 | 913.4 | 1 | 95 | 1.49 |
| MANUFACTURE OF MOTOR VEHICLES, TRAILERS | 34+35 | 18 | 66 | 80.7 | 2904.6 | 2618.6 | 286 | 0 | 66 | 2.83 |
| MANUFACTURE OF FURNITURE | 36+37 | 1925 | 6219 | 9312.2 | 113345.3 | 52292.8 | 61052.5 | 436.7 | 6219 | 1.22 |
| RECYCLING | | | | | | | | | | 1.50 |
| ELECTRICITY | 40 | 19 | 343 | 4260 | 21491.5 | 3279.5 | 18212 | 983.1 | 343 | 12.42 |
| COLLECTION & DISTRIBUTION OF WATER | 41 | 330 | 671 | 732.2 | 5946.2 | 2678.1 | 3268.1 | 349.2 | 671 | 1.09 |
| CONSTRUCTION | 45 | 348 | 3693 | 14694.6 | 159462.8 | 104169 | 55293.8 | 1313.9 | 3693 | 3.98 |
| SALE & REPAIR OF MOTOR VEHICLES | 50 | 5234 | 11097 | 11626.4 | 65547.6 | 16571.5 | 48976.1 | 1338.3 | 11097 | 1.05 |
| WHOLESALE TRADE & COMMISSION TRADE | 51 | 2845 | 10621 | 24169.6 | 208491.8 | 73056.8 | 135435 | 1656.3 | 10621 | 2.28 |
| RETAIL TRADE, REPAIR OF PERSONAL GOODS | 52 | 31110 | 55758 | 31396.3 | 322958.4 | 86276.9 | 236681.5 | 3601.4 | 55758 | 0.56 |
| HOTELS & RESTAURANTS | 55 | 2593 | 6011 | 6427.4 | 57830.5 | 25868.7 | 31961.8 | 4681.4 | 6011 | 1.07 |
| LAND TRANSPORT | 60 | 174 | 1483 | 5137.8 | 21066.5 | 6332 | 14734.5 | 353.9 | 1483 | 3.46 |
| SUPPORTING & AUXILIARY TRANSPORT | 63 | 167 | 493 | 806.2 | 4200.7 | 1347.7 | 2853 | 53.4 | 493 | 1.64 |
| POST & TELECOMMUNICATIONS | 64 | 103 | 2353 | 27227.5 | 173739.7 | 13664.1 | 160075.6 | 12721 | 2353 | 11.57 |
| REAL ESTATE ACTIVITIES | 70 | 52 | 148 | 1140.7 | 2660.6 | 569.6 | 2091 | 0 | 148 | 7.71 |
| RENTING OF MACHINERY WITHOUT OPERATOR | 71 | 161 | 305 | 501.5 | 2680.3 | 764.8 | 1915.5 | 537 | 305 | 1.64 |
| COMPUTER & RELATED ACTIVITIES | 72 | 56 | 183 | 721.7 | 2712.4 | 445.8 | 2266.6 | 44 | 183 | 3.94 |

FIG. 24A

| | | | | | | | | |
|---|---|---|---|---|---|---|---|---|
| RESEARCH & DEVELOPMENT | 73 | 13 | 141 | 1111.3 | 1499.6 | 621.2 | 878.4 | 20.5 | 141 | 7.88 |
| OTHER BUSINESS ACTIVITIES | 74 | 2235 | 6004 | 15197.5 | 41443.4 | 11309.6 | 30133.8 | 585.8 | 6004 | 2.53 |
| EDUCATION | 80 | 1150 | 9766 | 51500.5 | 80459.4 | 13396.3 | 67063.1 | 2385 | 9766 | 5.27 |
| HEALTH & SOCIAL WORK | 85 | 2492 | 9052 | 33045.7 | 65674 | 20096.2 | 45577.8 | 1043.9 | 9052 | 3.65 |
| SEWAGE AND REFUSE DISPOSAL | 90 | | | | | | | | | |
| ACTIVITIES OF MEMBERSHIP ORGANIZATIONS | 91+ | 244 | 3711 | 15259.1 | 18864.7 | 5547.5 | 13317.2 | 221.9 | 3711 | 4.11 |
| RECREATIONAL CULTURE & SPORTING ACT | 92 | 681 | 2383 | 5797.2 | 12675.3 | 4699.7 | 7975.5 | 631.9 | 2383 | 2.43 |
| OTHER SERVICE ACTIVITIES | 93 | 2248 | 3449 | 1994.3 | 15734.4 | 5998 | 9736.4 | 1072.9 | 3449 | 0.58 |
| INDUSTRIAL ACTIVITIES | | 13693 | 60185 | 134800.5 | 1058360.2 | 581368.6 | 476991.4 | 8933.1 | 60185 | 2.24 |
| CONSTRACTION ACTIVITIES | | 348 | 3693 | 14694.6 | 159462.8 | 104169 | 55293.8 | 3.2 | 3693 | 3.98 |
| INTARNAL TRADE ACTIVITIES | | 39189 | 77476 | 67192.2 | 596997.8 | 175905.3 | 421092.5 | 6596 | 77476 | 0.87 |
| SERVECIES ACTIVITIES | | 11925 | 41153 | 132697 | 302234.8 | 89317.4 | 2129172 | 11224.2 | 41153 | 3.22 |
| TRANSPORT, STORAGE & COMMUNICATIONS ACTIVITIES | | 444 | 4329 | 33171.5 | 199006.9 | 21343.8 | 177663.1 | 13128.3 | 4329 | 7.66 |
| TOTAL | | 65599 | 186836 | 382555.8 | 302234.8 | 972104.1 | 1343958 | 41194.8 | 186836 | 2.05 |

PALESTINIAN CENTRAL BUREAU OF STATISTICS, http://www.pcbs.org/economic/table1b.aspx

YEAR 2003 WEST BANK AND GAZA

FIG. 24B

AGENT BASED MODELING OF RISK SENSITIVITY AND DECISION MAKING ON COALITIONS

CROSS-REFERENCE TO RELATED APPLICATIONS

This application claims the benefit of U.S. Provisional Application Nos. 60/600,947 filed Aug. 12, 2004, and 60/653,777 filed Feb. 16, 2005, both titled AGENT BASED MODELING OF RISK SENSITIVITY AND DECISION MAKING ON COALITION FORMATION AND DISSOLUTION, which are hereby incorporated herein by reference in their entirety.

REFERENCE TO A COMPUTER PROGRAM LISTING APPENDIX

A Computer Program Listing Appendix has been submitted on a single compact disc ("Copy 1") and an identical duplicate copy ("Copy 2") of the compact disc. The contents of the compact disc, and its identical duplicate copy, include twenty (20) ASCII files entitled: Table01.txt (1,696 bytes, created Apr. 7, 2011); Table02.txt (2,691 bytes, created Apr. 7, 2011); Table03.txt (3,736 bytes, created Apr. 7, 2011); Table04.txt (1,212 bytes, created Apr. 7, 2011); Table05.txt (1,235 bytes, created Apr. 7, 2011); Table06.txt (415 bytes, created Apr. 7, 2011); Table07.txt (932 bytes, created Apr. 7, 2011); Table08.txt (522 bytes, created Apr. 7, 2011); Table09.txt (670 bytes, created Apr. 7, 2011); Table10.txt (582 bytes, created Apr. 7, 2011); Table11.txt (1,854 bytes, created Apr. 7, 2011); Table12.txt (1,851 bytes, created Apr. 7, 2011); Table13.txt (2,542 bytes, created Apr. 7, 2011); Table14.txt (1,199 bytes, created Apr. 7, 2011); Table15.txt (184 bytes, created Apr. 7, 2011); Table16.txt (1,805 bytes, created Apr. 7, 2011); Table17.txt (1,316 bytes, created Apr. 7, 2011); Table18.txt (287 bytes, created Apr. 7, 2011); Table19.txt (1,207 bytes, created Apr. 7, 2011); and Table20.txt (998 bytes, created Apr. 7, 2011). The contents of this Computer Program Listing Appendix, filed on compact disc, are incorporated herein by reference.

FIELD OF THE INVENTION

The invention relates generally to agent based systems for social simulation, and more specifically to methods and systems for agent based computer simulation of environmental variables and tendencies in individual and social decision making relating to the formation of coalitions and ethnic groups. Additionally, the invention relates to a method and system for deriving a function describing wealth distribution in a population.

BACKGROUND AND SUMMARY

Agent based modeling (ABM) provides a means to analyze individual and social behavior, including the formation of coalitions of individuals, their adoption of ethnic and other norms, and the influence of ethnic and other affiliation on coalition members' behavior. Ethnic norms include shared beliefs and behaviors such as religious beliefs, dialects, modes of dress, ideology, and cuisine. Those sharing norms form a coalition of individuals who, at least sometimes, act out of group interest rather than short term individual interest. How coalitions emerge, when members adopt norms, what motivates individuals to join such groups, and how group membership influences behavior are issues that have become increasingly important to researchers in the social sciences. Recent successes in recruiting among terror groups and potential alliances among these groups represent security concerns regarding dynamics of coalition formation that may lead to social unrest, collective violence and/or terrorism. Despite revolutionary rhetoric, rebellions usually are started and led by the well-off.

Human ethnicity involves coalitions of individuals who adhere to norms of behavior. Anthropology is a particularly rich discipline in which to address questions of ethnic coalition formation, given the discipline's important cross-cultural comparative data on the formation and extinction of ethnic groups under a variety of environmental, social, and historical conditions.

Anthropologists have researched the origin of coalitions and the development of cultural norms from cultural ecology or human behavioral ecology research programs. In these programs, human behavior is seen as an evolutionary outcome of adapting to physical and social environments. Adaptive theories of coalition formation and ethnicity are grounded in rational choice, or bounded rationality theories. The methods anthropologists use include optimization, game theory, and computer simulation. Decision rules and other formulations are used to simulate and test proposed theories. In all cases, researchers propose that their models are on the whole, adaptive for meeting agents' material needs, even if agents sometimes adopt norms that fail in particular circumstances.

A drawback to these otherwise useful investigations is that researchers usually evaluate the performance of only one decision rule at a time, and usually over a limited number of iterations. Furthermore, competition for resources via genuinely competing strategies in large populations with varying environments usually has not been simulated or analyzed discretely. The discrete mathematics involved becomes intractable as dimensions or numbers of players increase and the entries in payoff matrices fluctuate. Instead, researchers commonly summarize the effects of model parameters with systems of differential equations and Lyapunov functions to produce more qualitative, global analyses of stability or convergence, ultimately obscuring coalitions and tending to analysis of mean behaviors and variances at best.

Competing theoretical claims of coalition and norm formation may be evaluated using computer simulations. These simulations shed light upon the emergence of ethnic and other affiliation and identification. To simulate the complexity of human social interaction, parallel processing computer clusters that have the computing power required for modeling large numbers of interacting agents may be used. Such simulations may model coalition formations and the development of norms under varying environmental conditions relevant to recent theories of ethnic group formation.

Advantageously, an illustrative ABM stimulation system can be used to evaluate the effects of numerous environmental conditions, simulate large populations, and accommodate more than one type of decision rule. The system can be used to evaluate propositions regarding human rationality and selfishness, develop simulation methodology for modeling coalition formation, and to advance substantive understanding of just how and why coalitions form or disperse. The simulation system provides a test bed for competing theories of macro- and micro-behaviors in dynamic games by controlling the fluctuations of environmental constraints, information constraints, and proximal interactions among agents. Post-simulation analysis provides, with some degree of confidence levels and reproducibility, measures of the model's sensitivity to parameters in payoff matrices, resource allocations, agent strategies and choices.

The use of such a system may have broad impacts for both education and policy. Policy implications involve shedding light on political Balkanization and the rise of ethnic identity in the post-Cold War world. The understanding of individual and coalition behaviors subject to fluctuating environmental constraints or controls is a necessary first step for applications in foreign affairs planning and domestic concerns, such as political action groups, criminal rings, and community organizations.

In accordance with the teachings of this disclosure, a method in a computer system for simulating individual and social behavior, includes: providing for creating a neighborhood of cells; providing for allocating resources to the cells; providing for assigning an agent to each cell; providing for selecting one of a plurality of decision rules for interactions between agents; providing for iteratively conducting discrete interactions between the agents using the selected decision rule and allocated resources; and providing for recording interaction outcome. The one of the plurality of decision rules may include a coordination game.

In accordance with the teachings of this disclosure, a computer-readable medium having machine-executable code for simulating the interactions of agents, includes: code for creating a neighborhood of cells; code for allocating resources to the cells; code for assigning an agent to each cell; code for selecting one of a plurality of decision rules for interactions between agents; code for iteratively conducting discrete interactions between the agents using the selected decision rule and allocated resources; and code for recording interaction outcome. The one of the plurality of decision rules may include a coordination game.

In accordance with the teachings of this disclosure, a system for agent based modeling, includes a computer and software enabling the computer to use a coordination game model to simulate and analyze the interactions of individual agents. The computer may include processors configured for parallel processing of the software.

In accordance with the teachings of this disclosure, a method of estimating the distribution of wealth in a population comprises applying the equation $W(x)=e^{(d+ax+c\ sin(bx))}$, where a>bc. A method of estimating parameters of an expo-sigmoid model of wealth distribution comprises: creating a data set by taking the natural log of wealth data of a population; deriving a linear equation in the form of d+ax by performing an ordinary least squares regression of the data set; performing a fast-fourier transform on the residuals of the ordinary least squares regression; picking terms from the fast-fourier transform which are statistically significant to form a trigonometric polynomial in the form of $f(x)=\Sigma \cos(x)+\sin(x)$; and constructing an equation estimating the wealth distribution of a population by calculating the exponential value of the sum of the linear terms and the trigonometric terms in the form of $W(x)=e^{(d+ax+\Sigma\ cos(x)+sin(x))}$.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the following figures, in which:

FIG. 6D is a table of the observed joins and expected joins for an exemplary simulation among the classes identified in FIG. 6A;

FIG. 6E is a table of the in-class and cross-class coalition joins for an exemplary simulation among the classes identified in FIG. 6A;

FIG. 20 is a graph of the distribution of wealth among 36 industrialized nations in 1987 and the best fitting curve Adjusted PPP=4.18*population−sin(2.14*population), $R^2$=0.965, statistically significant at well below the 0.00001 level;

FIG. 21 is a table illustrating outcome expectations of the illustrative ABM system for strengths of effects relative to different decision rules;

FIG. 22 is a graph illustrating a simple sigmoid wealth distribution among agents used to initialize the illustrative ABM system for simulating nepotism;

FIGS. 24A and 24B are a data table of Palestinian wealth used as input data for the initial distribution of resources for an illustrative simulation of Palestinian society;

FIG. 33 illustrates an initial wealth distribution according to a derived sigmoid distribution W(x)=15x−400 sin(x);

FIG. 34 illustrates the calculated join probability by wealth;

FIG. 35 illustrates the AP measure of risk sensitivity by wealth rank;

FIG. 36 illustrates the wealth mobility (the difference between an agent's lowest rank and highest rank in a simulation) of agents according to wealth rank;

FIG. 37 illustrates the volatility, or the sum of the absolute value of wealth gains and losses for a simulation; and FIGS. 38A-38F illustrate the rank history for specific iterations of game play for various agents.

DETAILED DESCRIPTION

The illustrative agent based model ("ABM") system provides simulation of the influence of environmental variables and tendencies in individual and social decision making relating to the formation of coalitions and ethnic groups. The system is based on improved understandings of human decision making under risk, and incorporates recent theoretical developments and computational tools. The system gives analysts the ability to predict the development of coalitions and ethnic groups and to adapt policies and actions accordingly, as well as the ability to manage the behavior of individuals in such groups. The model results provide confidence intervals for various possible scenarios in a mix of agents' decision rules and distribution of environmental resources. Applications include management of ethnic groups and violent conditions in unstable nations, the tracking of terrorist organizations, development of coalitions and oligopolies in business, and the modeling and interdiction of criminal organizations.

Figure 1:
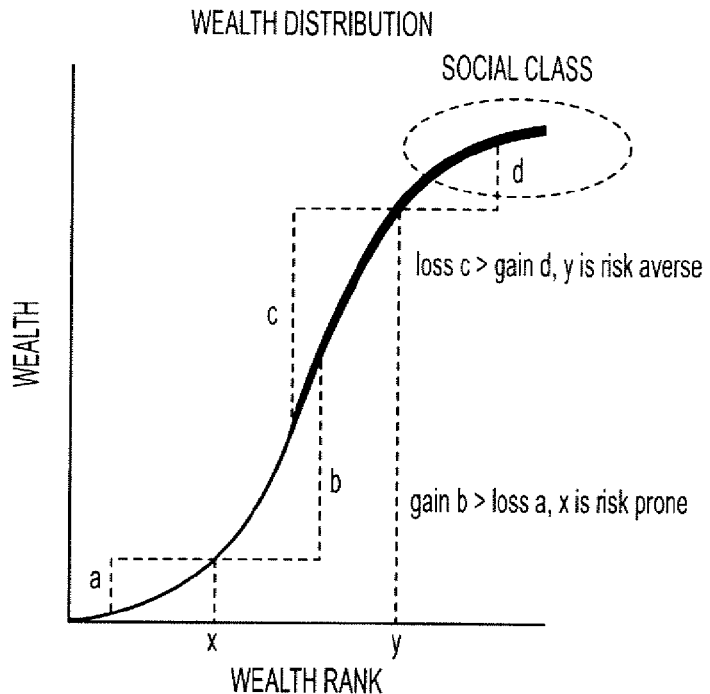
FIG. 1 is graph showing an illustrative distribution of resources obtained and valued by individuals in a society, in this case wealth, the distribution being a sigmoid function.
Figure 2:
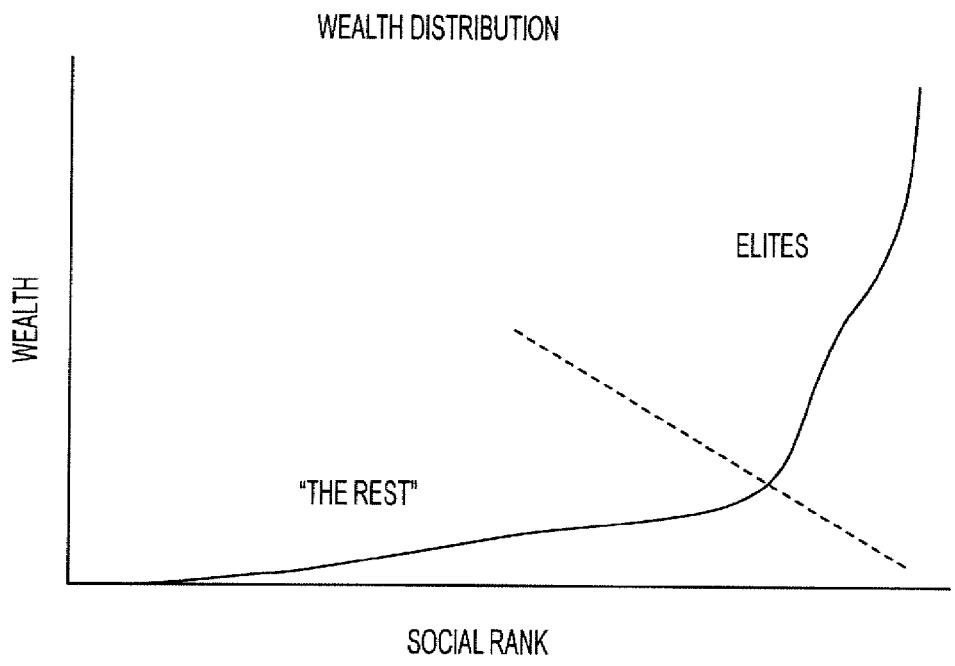
FIG. 2 is a graph showing an illustrative distribution of resources obtained and valued by individuals in a society, in this case social rank, the distribution being a expo-sigmoid function.

The distribution of resources obtained and valued by individuals in a society may be modeled by a sigmoid function, for example as shown in FIG. 1, or a expo-sigmoid function, for example as shown in FIG. 2. Resources include well-being, including, for example, monetary wealth, social status and social worth. Culturally defined wealth is the most common measure of social status and people are often willing to take a risk which may result in a loss or gain of status when the amount of possible gain in status from taking the risk exceeds the amount of possible loss in status from taking the risk.

Figure 3A:
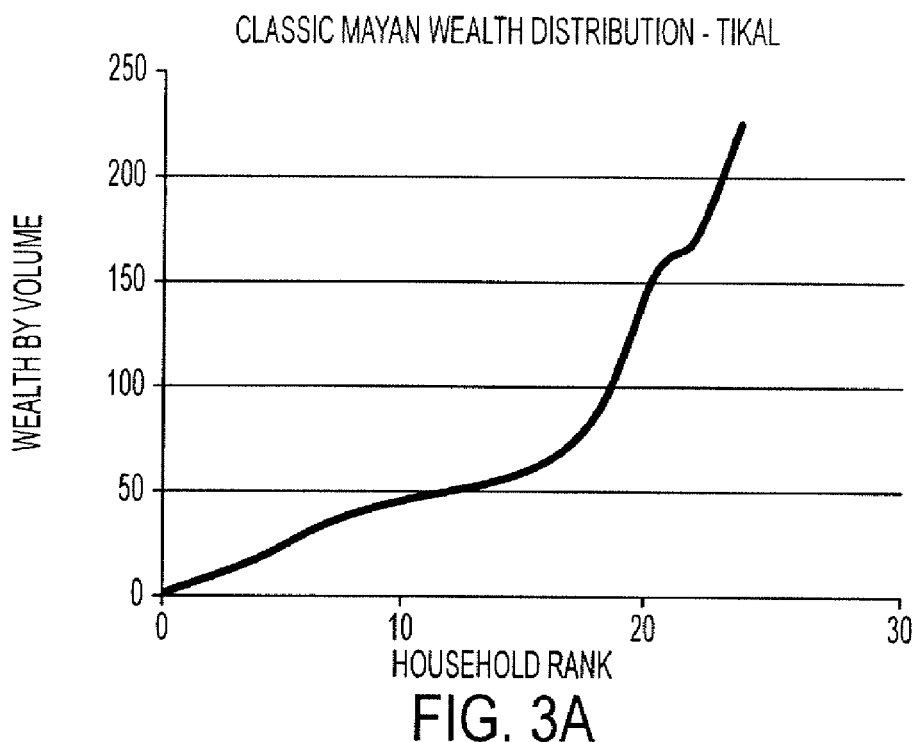
FIG. 3A is a graph showing an illustrative distribution of resources obtained and valued by individuals in a society, specifically wealth in Mayan society, the distribution being an expo-sigmoid function.
Figure 3B:
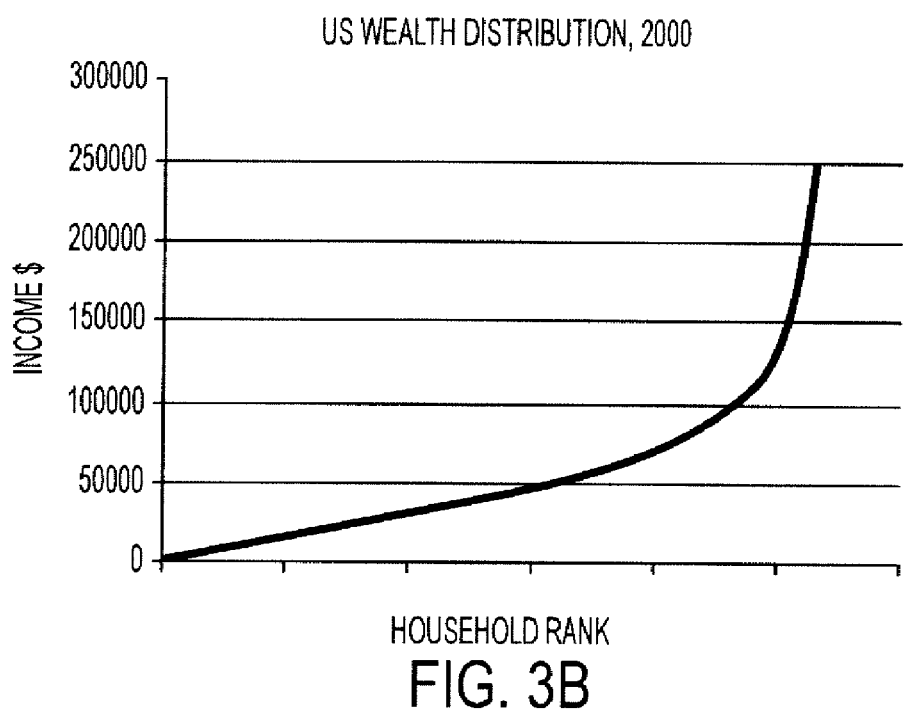
FIG. 3B is a graph showing an illustrative distribution of resources obtained and valued by individuals in a society, specifically wealth in US society in 2000, the distribution being an expo-sigmoid function.
Figure 3C:
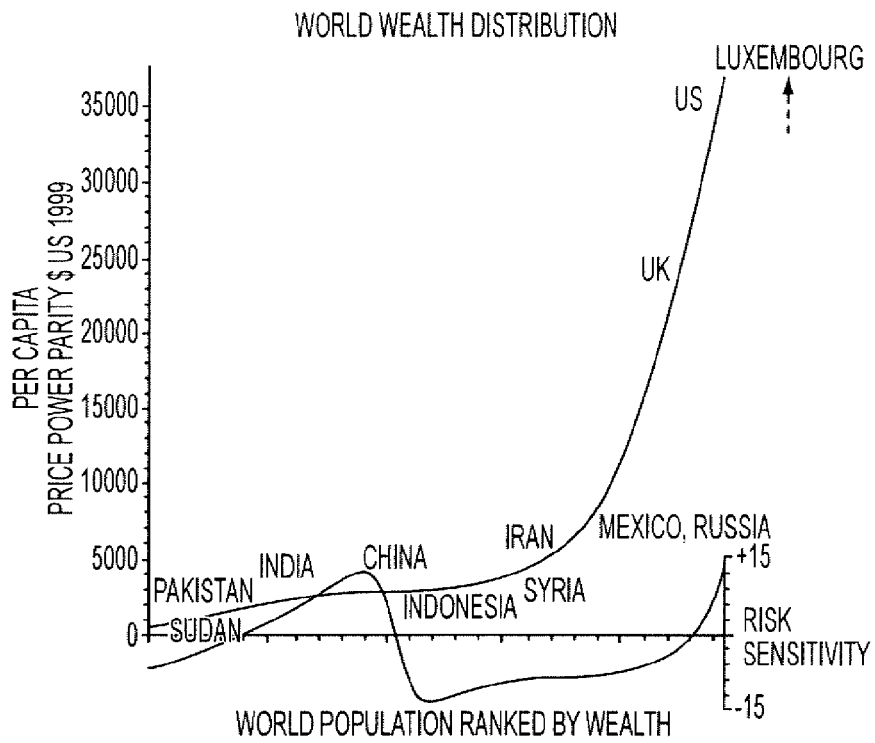
FIG. 3C is a graph showing an illustrative distribution of the world population ranked by wealth and risk sensitivity related to the distribution.

As shown in FIG. 1, the people most likely to take a risk to gain resources are located in the rank area(s) of convexity x. Simple societies, for example foraging societies, commonly have wealth distributions that may be described by a sigmoid function, for example in the form $r(x)=-U''(x)/U'(x)$, where $U(x)=\alpha x-\sin(\beta x)$, $\alpha>\beta>0$, and $x>2\pi/\beta$. Complex societies, for example ancient states such as Mayan society, for which the wealth distribution is illustrated in FIG. 3A, and modern states such as the United States, for which the wealth distribution of 2000 is illustrated in FIG. 3B, most often have wealth distributions in which elites control a majority of the wealth. Such wealth distributions exhibit an overall exponential distribution of wealth with sigmoid fluctuations around this trend and can be described by an expo-sigmoid function, for example in the form $W(x)=e^{(d+ax+c\ sin(bx))}$, where a>bc. Wealth distribution between societies, for example between countries, may also be described by an expo-sigmoid function as illustrated in FIG. 3C. FIG. 3C illustrates convexity, thus risk proneness, in areas of the distribution where countries known for Jihadist recruiting are located, including Iran, Syria, and Pakistan.

Figure 4:
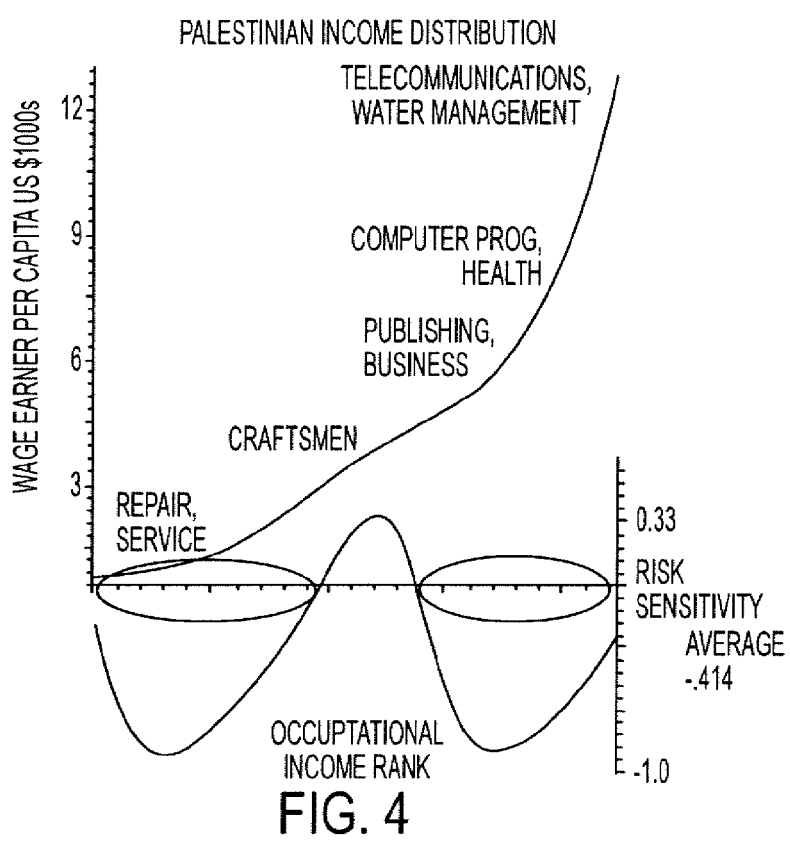
FIG. 4 is a graph showing an illustrative distribution of income among Palestinian society and risk sensitivity related to the distribution.

One measure of risk proneness and risk adversion well know in the art is the Arrow-Pratt ("AP") measure of local risk aversion where U is a twice differentiable utility function $r(x)=-U''/U'$. Negative values correspond to risk proneness and positive values correspond to risk adversion, for example as shown in FIG. 4, which illustrates income distribution and risk sensitivity within Palestinian society.

Figures 5, 6A:
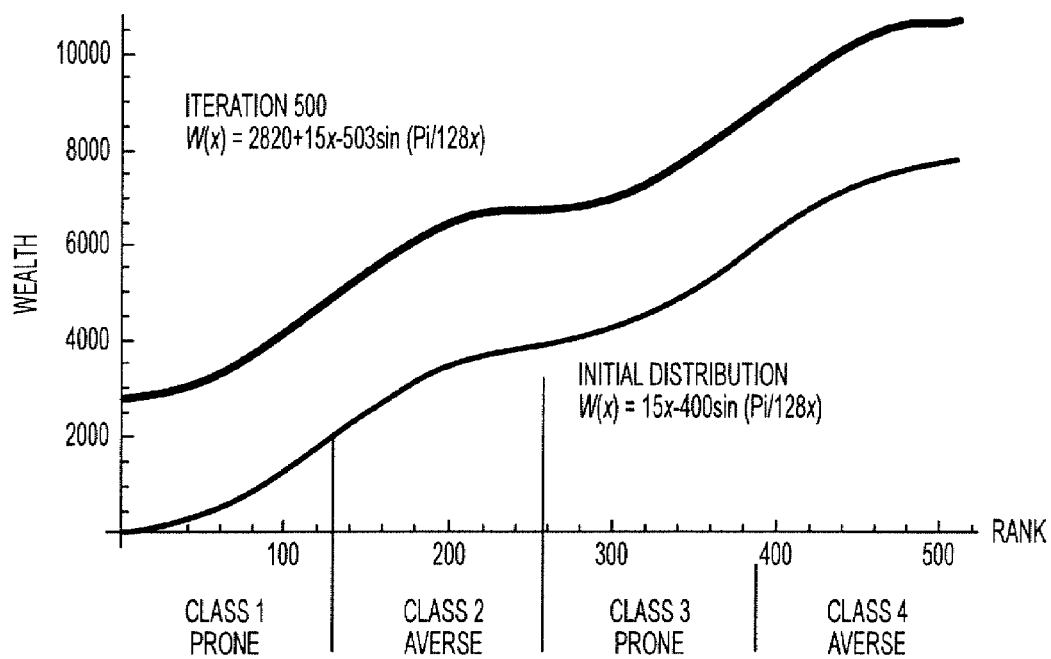
FIG. 5 is a table illustrating the join and defect resource payoffs for a type of decision rule, specifically the coordination game.
FIG. 6A is a graph showing an exemplary initial wealth distribution described by the function $W(x)=15x-400\ sin(\pi/128x)$, a simulation iteration 500 wealth distribution described by the function $W(x)=2820+15x-503\ sin(\pi/128x)$, and classes of individuals and their risk sensitivities.

Computer-based or other computationally-based models of individual and social behavior include an ABM. The present illustrative ABM system, a flowchart of which is illustrated by FIGS. 7A-7D simulates risk sensitive behavior, dynamics of resource flow, and coalition formation, and can identify, for example, individuals ("agents") vulnerable to terrorist or insurgent recruitment. There is a long history of using prisoner's dilemma games to model the tradeoffs between joining with, or defecting against, others. Recent research indicates that another class of game, the coordination game, best models human interactions where cooperation potentially yields benefits. The illustrative ABM system disclosed herein utilizes a form of the coordination game, the join and defect resource payoffs of which are illustrated in FIG. 5. Measured or otherwise collected data for a society, for example the wealth distributions of FIGS. 3A-3C can be used by the illustrative ABM system to evaluate influences of various factors on agent interaction and to predict future or confirm historic individual and social behavior.

As a starting point for analysis to evaluate models and predict individual and social behavior, the decision rule for agents can be the rationally optimal Nash equilibrium strategy that, by definition, offers an individual agent the best long-run payoff, considering what all other agents are doing. No player may profitably deviate from his strategy while all others retain their same equilibrium strategies. For example, as illustrated by FIG. 5, where R>T=P>S, or more specifically, R=5, P=3, T=3, and S=0, if Row player agrees to Join, but Column player Defects, Row would receive 0 and Column, 3. However, if both agree to Join (a coalition), then Row receives 5 and Column, 5. The best strategy is to play Join (thereby forming a coalition) a proportion, p, of the time and Defect (refusing to join a coalition) 1−p of the time. The values of the payoffs are key influences in inducing coalition formation. For the example values discussed above, p=⅗. Beginning with this payoff structure, analysis can be performed on how changes in the payoffs to joining or defecting influence coalition formation.

The illustrative ABM system may be used to explore sufficiency of the rational choice model for explaining and predicting coalition formation. Researchers have noted that wealth inequities influence risk sensitivities of agents. Risk sensitivity refers to the likelihood that an individual will accept an unfair gamble, or will insure against losses in a fair gamble. Risk sensitivity alters the payoffs in the coalition game matrix and therefore the likelihood of Joining or Defecting. People on the verge of entering a higher social status or who are absolutely destitute are typically willing to take risks whereas those well ensconced within a class tend to be averse to risks. Such tendencies could, for instance, explain the rise of militant clerics and their recruitment from the very poor in present day Iraq. Another example would be Al Qaeda's and perhaps Hamas' recruitment from impoverished populations in south Asia. One of the advantages of the illustrative ABM system is the ability to explore how emergent wealth inequities influence agent risk sensitivity and the consequent formation or dissolution of coalitions, providing a deeper understanding of their underlying causes.

ABM simulations typically provide for arming agents with one type of decision rule, such as rational maximization of satisfaction. However, researchers have proposed other decision rules based on imitation heuristics that can lead to the formation of ethnic groups. Conformist heuristics involve individuals assessing what behaviors are most common and imitating those behaviors. Prestige heuristics involve individuals identifying high status individuals and imitating their behavior. Research to date has focused on demonstrating the effectiveness of a particular theory or decision rule. The illustrative ABM system accommodates more than one type of decision rule, allowing more thorough tests and comparison of current and competing theories, leading to the development of more powerful theories and associated ABM systems.

Figure 6B:
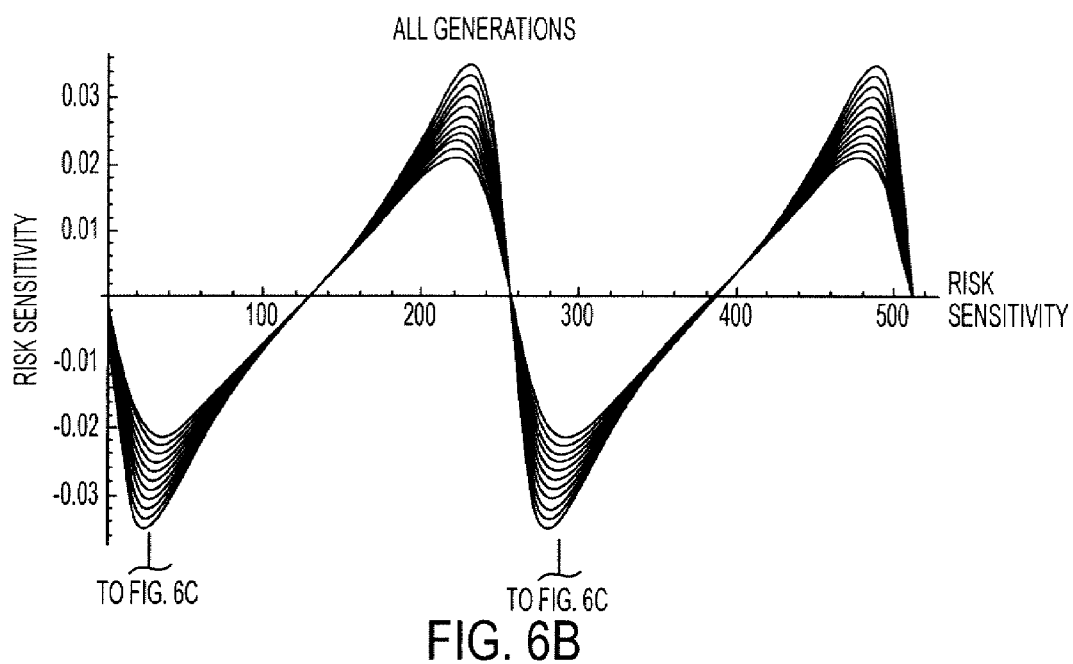
FIGS. 6B and 6C are aligned graphs showing the exemplary initial and iteration 500 distributions of FIG. 6A and the corresponding AP risk sensitivity for each rank generation.
Figure 6C:
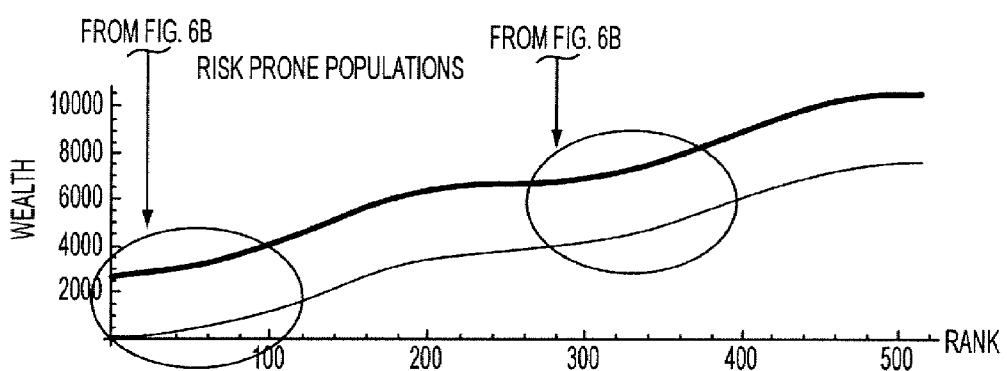
Figure 6F:
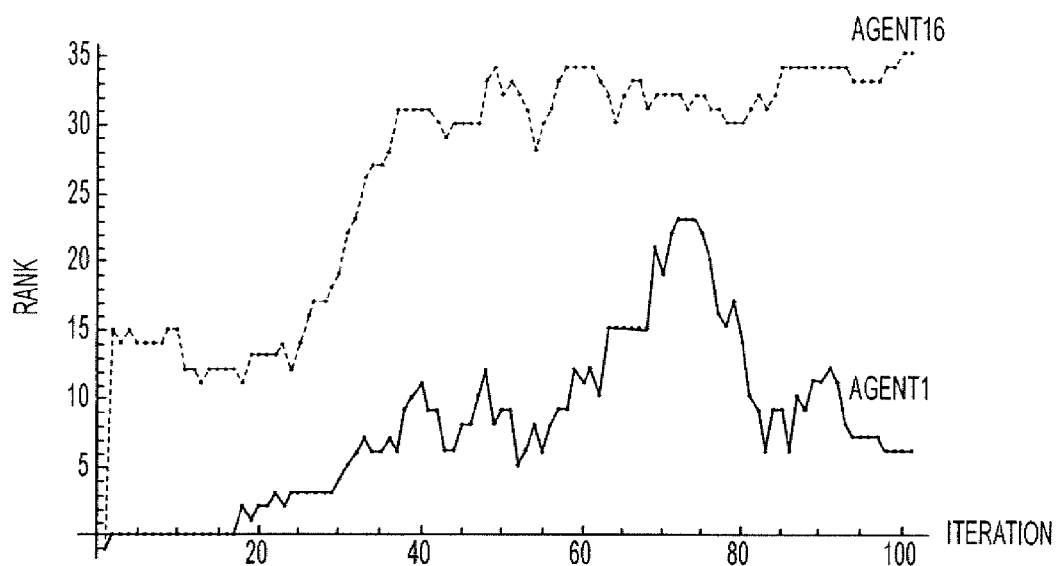
FIGS. 6F-6G are graphs illustrating the social (resource) mobility of sample agents in the exemplary simulation of FIGS. 6A-6E.
Figure 6G:
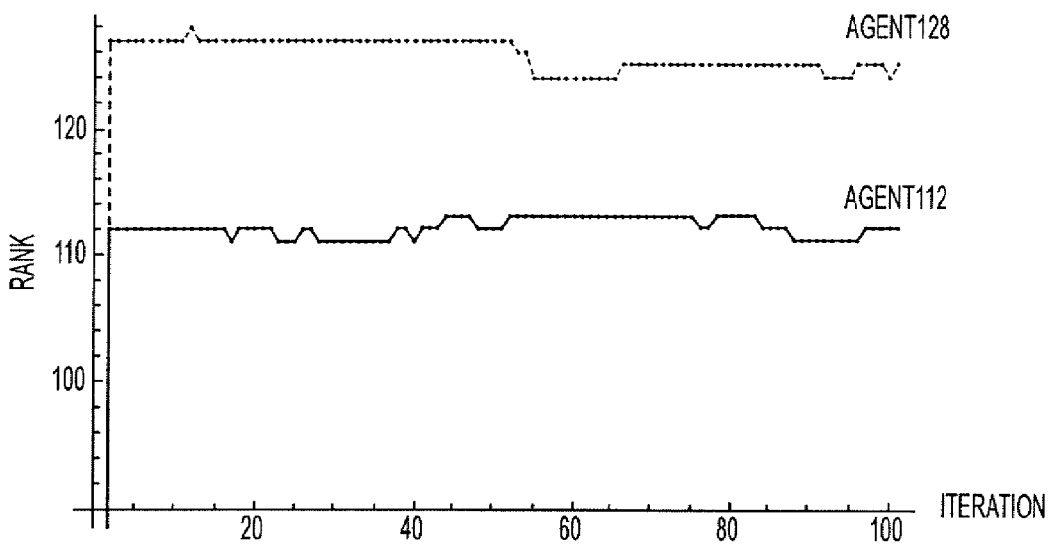
Figure 6H:
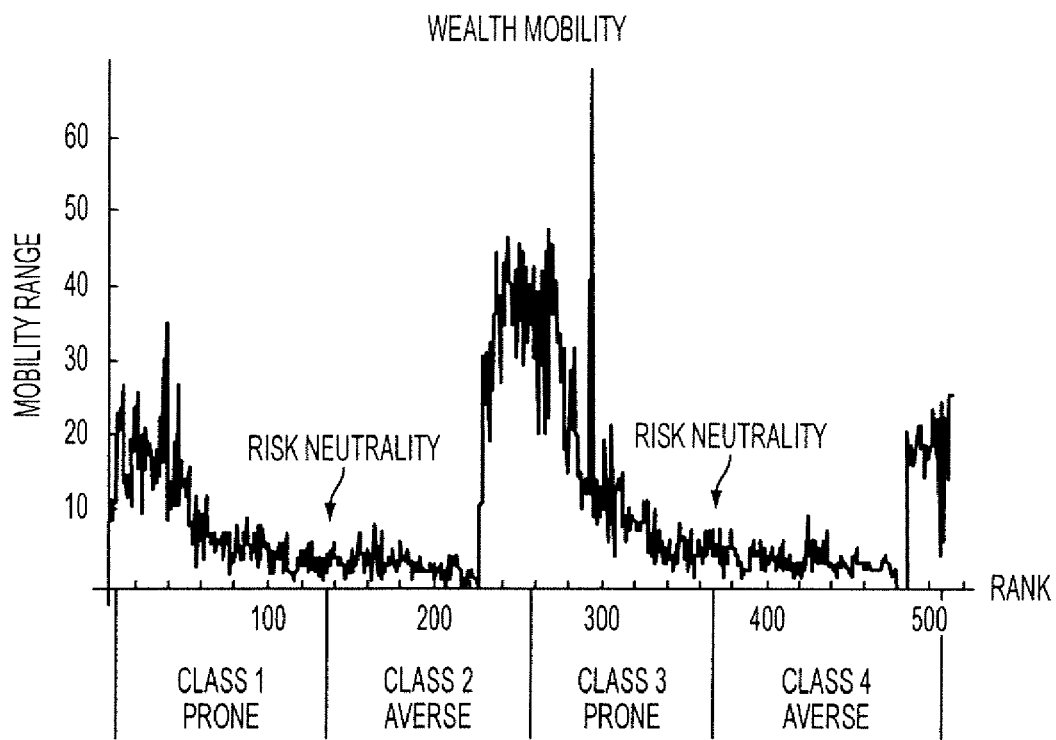
FIG. 6H is a graph illustrating the social (resource) mobility of all agents in the exemplary simulation of FIGS. 6A-6E.

For example, analysis of output data from iterations of the illustrative ABM system demonstrate that the amplitude of resource class boundaries increase with iterations (time), solidifying class boundaries (FIG. 6A showing an initial wealth distribution described by the function $W(x)=15x-400 \sin(\pi/128x)$ and an iteration 500 wealth distribution described by the function $W(x)=2820+15x-503 \sin(\pi/128x)$); the agents in convex wealth distributions form risk prone coalitions (FIGS. 6B-6D); the agents form coalitions across class boundaries (FIG. 6E); and risk prone agents experience greater social mobility (FIG. 6F illustrating the changing rank over time of agents 1 and 16; FIG. 6G illustrating agents 112 and 128; and FIG. 6H illustrating all agents).

Nearly all established ABM's use a grid upon which researchers build abstract environments, and over which agents move and communicate with nearest neighbors. The illustrative ABM system provides a scalable grid of cells that may be integrated with available and future geographic information system ("GIS") and other databases. The illustrative ABM system also provides for agent communication and movement across the landscape (cells), for example with vehicular or air transportation, and electronic or other communication. Additionally or alternatively, the ABM system may utilize a conceptual universe relying on a construct other than a grid of cells, thus providing simulation of more complex environments and interactions, including geography, nation-states, kinship and the like. For example, the conceptual universe may be defined as overlapping regions or related functions that best represent the environment being simulated and data being input into the ABM system.

Agents can be configured with initial wealth levels, decision rules, sex, age, and other features that model an agent's well being. Detailed histories of each agent's states (wealth, group affiliation, status, etc.) can be stored and analyzed. As coalitions form, histories of membership, group size, and member wealth may also be recorded. These simulation outputs provide the basic data for analyzing what factors (environmental, decision rules, chance) actually lead to the formation of coalitions, alliances of coalitions, and the dissolution of coalitions. Simulation results, such as coalition boundaries or wealth distributions, can be displayed in graphical or other form.

Coalition formation can be based on pair-wise or complex agent interactions. For example, for pair-wise interaction in the illustrative ABM system, the Moore neighborhood of agents in which each agent interacts with one of its eight nearest neighbors is utilized. Alternatively, interaction may include non-adjacent or multiple agent interactions. Coalitions are identified as agents, for example adjacent agents, who play Join during a particular iteration of game play. In order to analyze the effects of ethnicity or other factors, simulations can utilize a decision rule that incorporates ethnic affiliations or other factors appropriate to the analysis. For example, for ethnic affiliations, a decision rule would enhance cooperation among members of a common ethnic group and decrease the likelihood of interaction with members of other groups.

Referring to FIGS. 7A-7D, algorithm 100 illustrates a flowchart for an illustrative ABM simulation system modeling a optimal mixed strategy for agent interaction and which may be implement, for example, by software in a computer system. Typically, ABM software is designed for use on sequential processing desktop computers, and is employed for demonstrating particular theories of decision-making that may explain the formation of coalitions and ethnic groups. In order to resolve scientific debates regarding which theories more adequately explain ethnic behavior, and in order to provide for more realistic simulations, scientists need more flexible ABM's run on parallel processing computer clusters. For example, FIG. 8 illustrates an illustrative parallel processing computer system 200, in this example a Beowulf cluster.

The system 200 may include, for example, a server 202 coupled to a cluster of personal computer workstations 204 or other computer processors via a local area network ("LAN") 216 and a LAN switch 206. For controlling and monitoring the system 200, a keyboard, video, and mouse ("KVM") switch 214 may be used to selectively couple a keyboard 208, a monitor 210, and an input device 212 to the server 202 and the workstations 204. Additionally, the server 202 or another element of the system 200 may be coupled to the Internet 218 or another public switched communications network or private network, for example a fiber-optic network, for interconnectivity with data sources, data storage, large-scale memory, and/or other processors.

A variety of Java-based software frameworks exist for implementing ABM simulations, including Swarm, Ascape, MASON, and Cybele. All of these frameworks have rich sets of resources for constructing complex agents and environments, visualizing their interactions, and monitoring statistics of interest. The Cybele architecture supports a distributed computing environment and can be used to overcome the limitations of single-processor environments that have reduced the scope of ABM simulations to relatively small populations impacted by few environmental and individual factors. More realistic simulations involve complex environments and populations of thousands of agents. To create such simulations, the illustrative ABM system may be implemented on a Beowulf cluster such as that illustrated in FIG. 8. Such a computing environment permits running concurrent simulations to evaluate a wide range of parameter sets.

Figure 8:
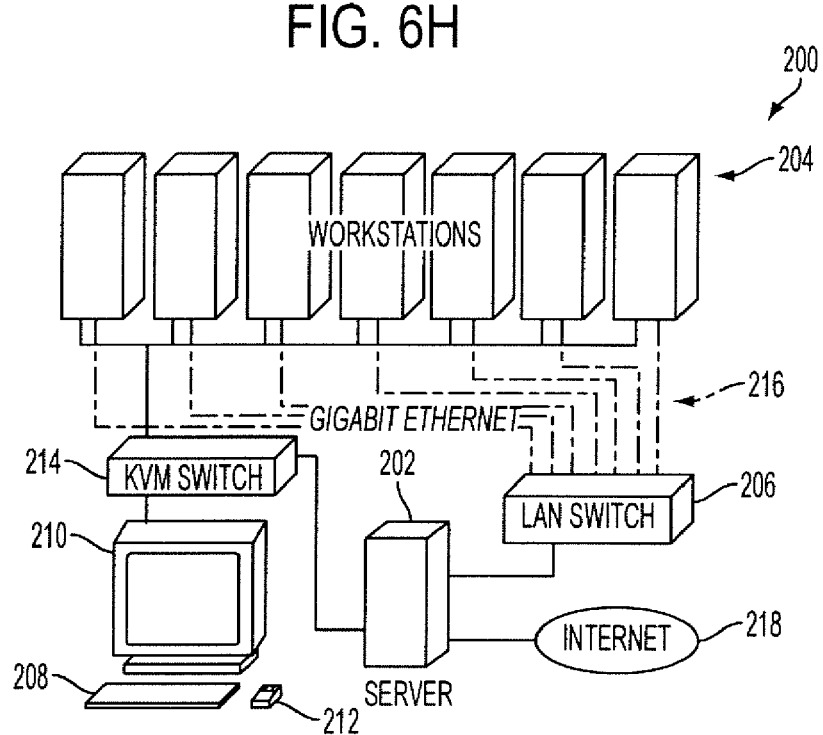
FIG. 8 is a block diagram showing an illustrative Beowulf cluster parallel processing computer system.
Figure 7A:
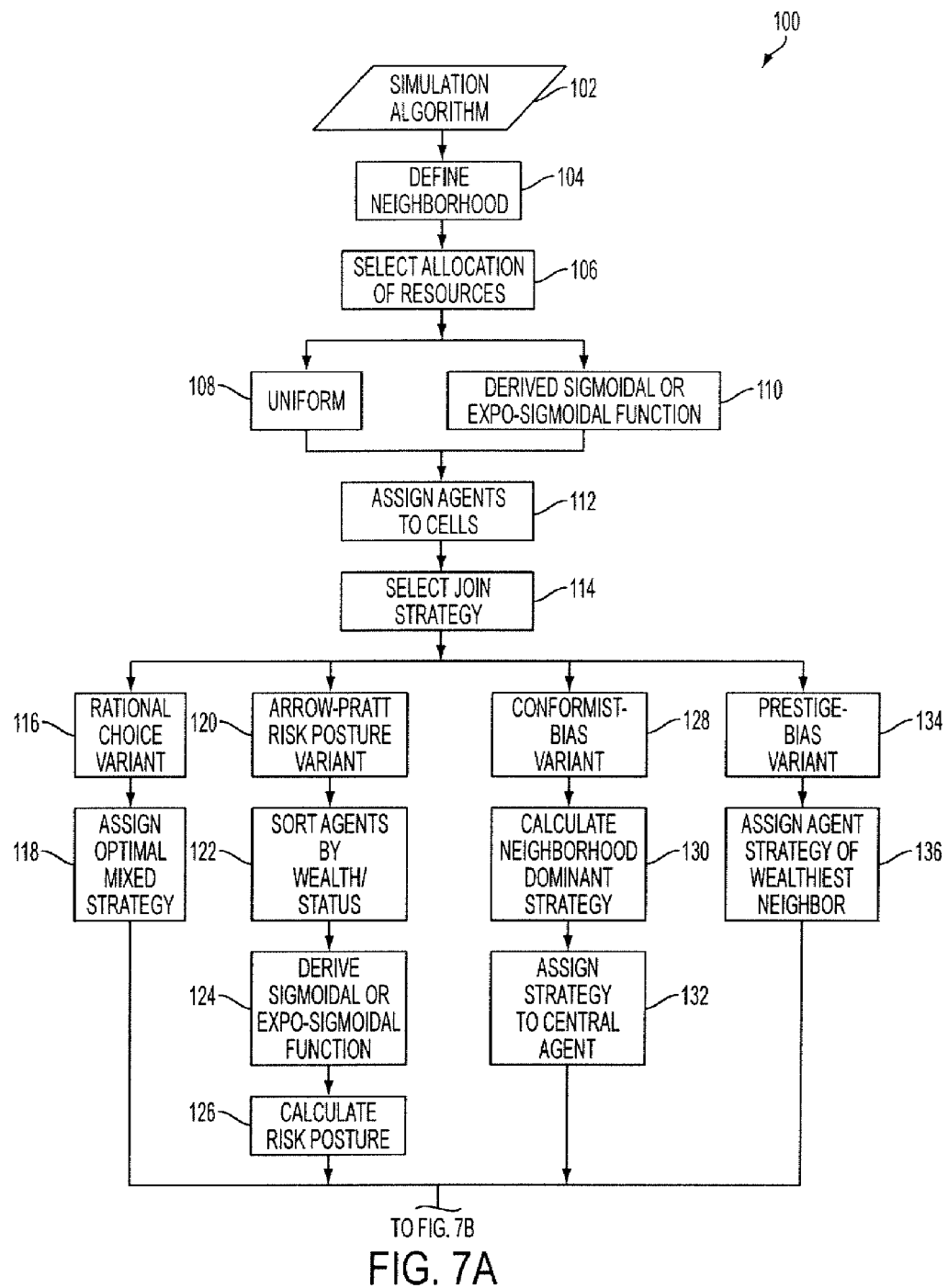
FIGS. 7A-7D is a flowchart showing an illustrative ABM simulation algorithm for modeling a optimal mixed strategy for agent interaction and which may be implemented by software in a computer system.
Figure 7B:
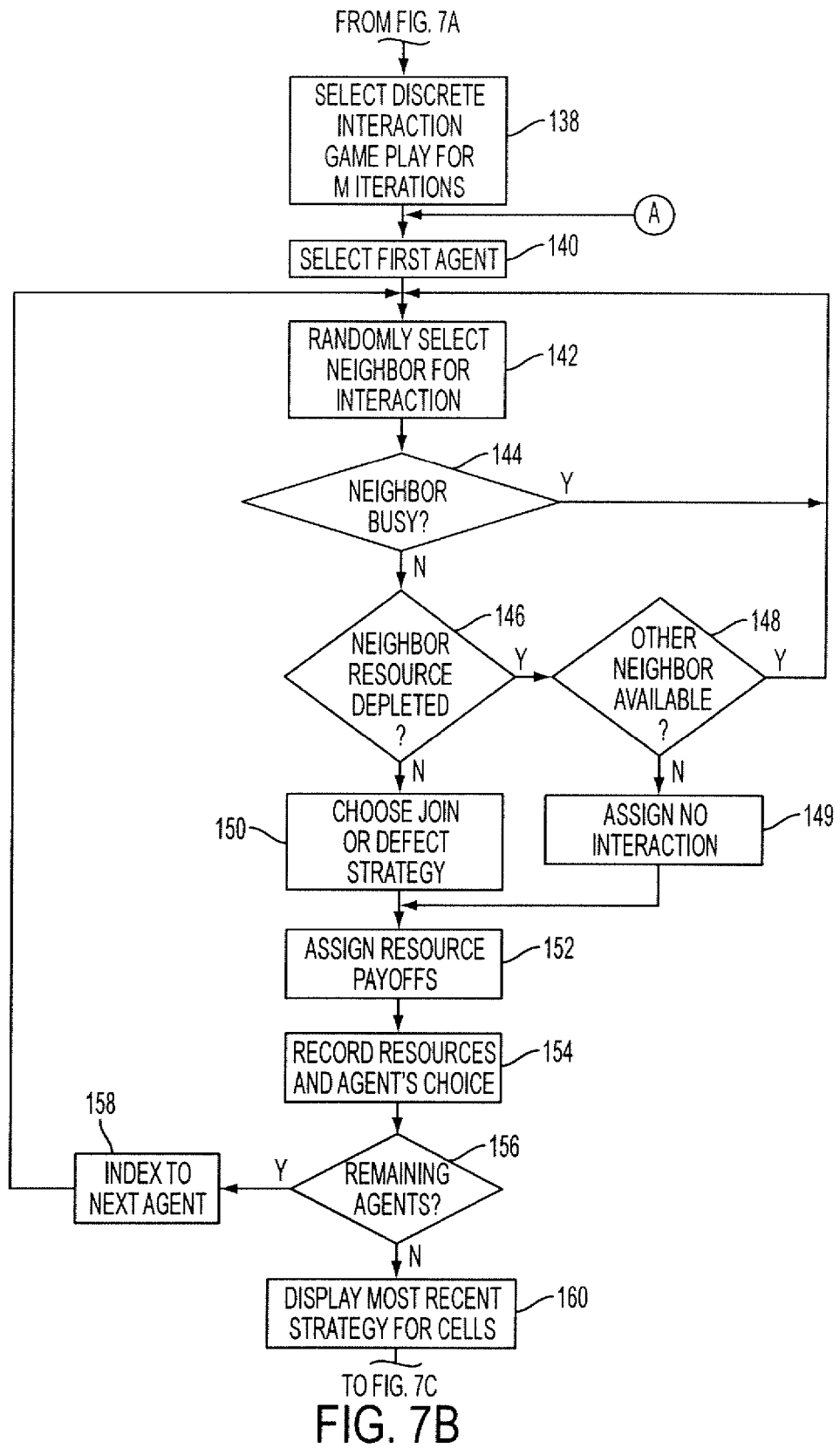
Figure 7C:
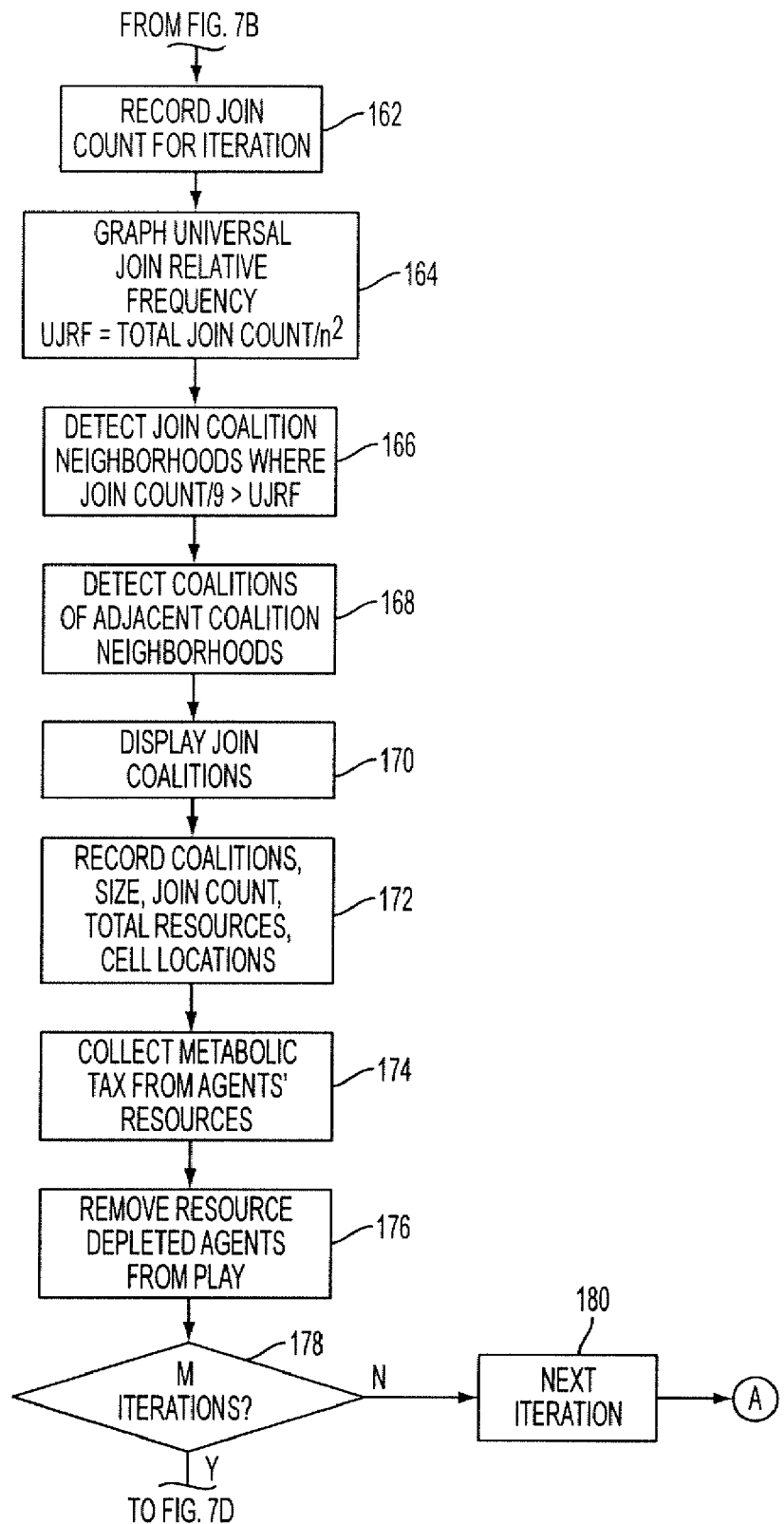
Figure 7D:
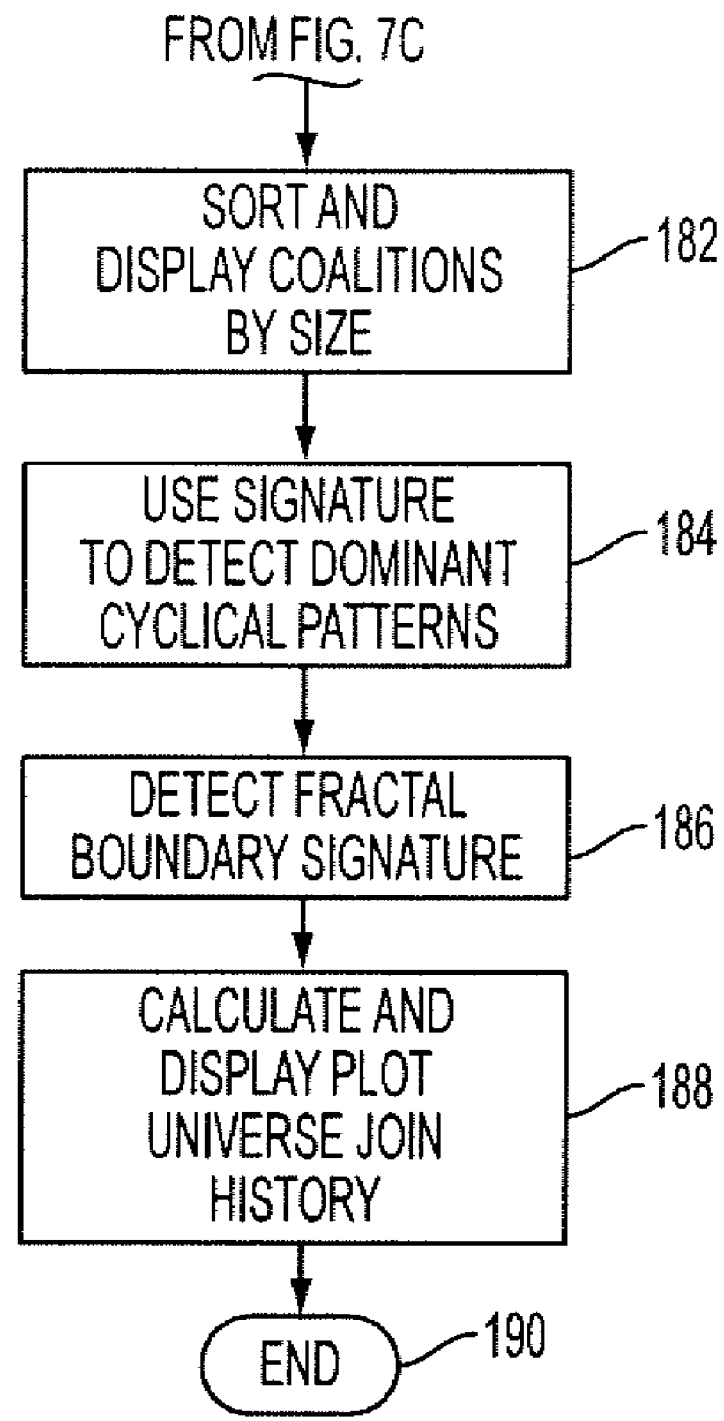

The algorithm 100 may be configured to be implemented on a parallel processing system such as the system 200 of FIG. 8, or may be configured to be executed by a sequential processing computer system or other computational devices known in the art. The algorithm 100 begins at step 102 and is executed by the processor(s) (hereinafter "processor") of the system 200. At step 104, the processor defines the neighborhood for simulation game play. For example, the neighborhood may be defined as a Moore neighborhood universe in which a two-dimensional grid of n×n cells are mapped as onto a sphere, giving each cell a neighborhood of eight adjacent (bordering) neighbors (N, NE, E, SE, S, SW, W, NW). The neighborhood universe may be alternatively geometrically or non-geometrically defined and neighborhoods may also be defined to include non-adjacent cells in the neighborhood of a particular cell.

At step 106, an allocation of resources (as defined above) is selected, and allocated to the cells. If selected, at step 108 the processor allocates resources uniformly across the universe, for example assigning (total resources)/$n^2$ to each cell for an n×n grid. Alternatively, if selected, at step 110 the processor allocates resources non-uniformly, for example, as a sigmoidal or expo-sigmoidal function of the form described above. The function may be derived from Fourier signature analysis fit of residuals from a linear regression to collected data, or, for an expo-sigmoidal function, from a logarithm of collected data. Deriving the sigmoidals function is described in further detail below.

At step 112, the processor assigns agents to cells, for example, one agent to each cell for a total of $n^2$ agents for an n×n grid. Alternatively, agents may be non-uniformly distributed to cells, for example according to a geographic or other data set or function.

At step 114, the join strategy for the coordination game play is selected for determination of the join probability and resources payoff for an agent joining or defecting or otherwise interacting with other agents. At step 116, for the rational choice variation, each agent is given the optimal mixed strategy with a choice biased according to the optimal mixed strategy of joining=⅗ and defecting=⅖. For each interaction of agents in each iteration of game play, the choice of joining or defecting is made according to a random choice biased according to the joining and defecting probabilities.

Figure 9:
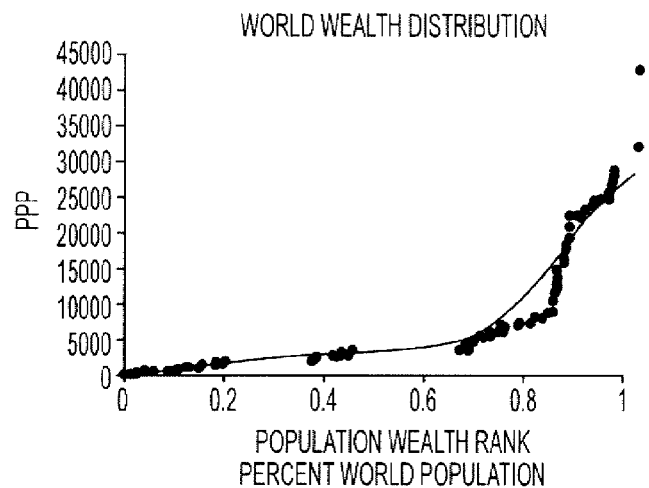
FIG. 9 is a graph illustrating the world wealth distribution (Price Power Parity index, PPP in $US) fitted with an illustrative expo-sigmoid curve on the original data, the expo-sigmoid curve being $W(x)=e^{(-0.438+0.4x+0.399\ sin(x))}$, with all coefficients significant at the p<0.0001 level, $R^2$=0.966.
Figure 12:
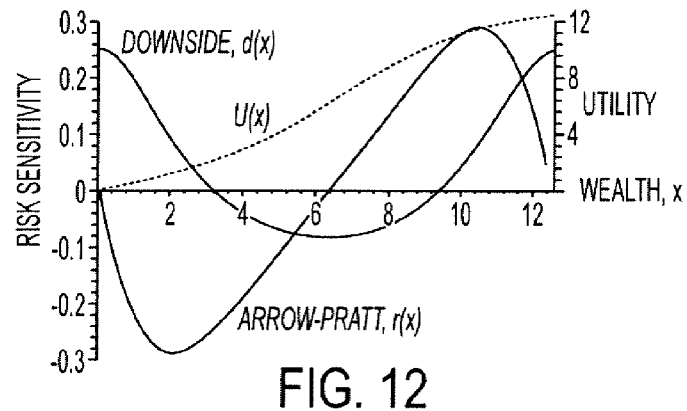
FIG. 12 is graph showing an illustrative comparison of AP and downside risk aversion measures with sigmoid utility, $U(x)=x-sin(0.5x)$, AP $r(x)=-0.25\ sin(0.5x)/(1-0.5\ cos(0.5x))$, downside risk adversion $dra(x)=0.125\ cos(0.5x)/(1-0.5\ cos(0.5x))$, carrying capacity $K=2\pi/0.5=4\pi$.

At step 120, the processor alters the probability of joining and defecting based on an AP risk posture. At step 122, the processor sorts agents according to resources, for example, wealth or status as illustrated in FIGS. 3A-3C. At step 124, the processor uses quasi-Fourier Analysis for an initial AP calculation, for example, a sigmoidal or expo-sigmoidal function that may be derived from Fourier analysis fit of residues from a linear regression to collected data, or, for an expo-sigmoidal function from a logarithm of collected data. For example, as illustrated by FIG. 9. Alternatively, the processor may refit sorted agent resource distribution after each iteration of interactions by all agents. At step 126, the processor calculates the AP risk posture based on the sigmoid or expo-sigmoid function, for example as illustrated in FIG. 12. If AP is ≧0, then the processor assigns agent join probability JP=(⅗)*(1−AP/maximum AP), JP=⅗+(AP/minimum AP)*(1−⅗).

At step 128, for a conformist-biased variant an individual agent's choice to join or defect is based on the dominate strategy in the agent's neighborhood during the last iteration of game play. At step 130, the processor calculates the dominate strategy in the agent's neighborhood, for example choice of joining or defecting made by the agent and the agent's eight neighbors for a two-dimensional grid universe. At step 132, the calculated dominate strategy is assigned to the agent for the present iteration of game play.

At step 134, for a prestige-biased variant an individual agent's strategy is influenced by the neighbor having the greatest total resources, for example the greatest wealth or status. At step 136, the processor assigns the strategy of the neighbor with the greatest resources to the individual agent.

At step 138, game play is initiated by selecting the number M of iterations of discrete interaction by each individual agent. At step 140, the processor selects the first agent for game play. At step 142, the processor randomly selects a neighbor for interaction. Alternatively, the selection of an agent for interaction may be biased or determined according to other functions or data sets as further described herein, for example an agent may interact with more than one agent, may interact with a non-neighboring agent, or may be biased toward Joining kin.

At step 144, the processor determines whether the neighbor selected for interaction is busy. If so, execution of the algorithm 100 returns to step 142, else step 146 is executed. At step 146, the processor determines whether the neighbor selected for interaction is resource depleted and not available for a game play. If so, execution of the algorithm 100 continues at step 148, else execution continues at step 150. At step 148, the processor determines whether an alternative neighbor is available for game play. If so, execution of the algorithm 100 returns to step 142 in order to select another neighbor for interaction. If at step 148 the processor determines that no other neighbor is available for interaction then at step 149 the processor assigns no interaction to the agent for the present iteration of game play and execution of the algorithm 100 continues at step 152.

If at step 146 the processor determined that the neighbor selected for interaction is not resource depleted, then at step 150, the processor chooses a join or defect strategy according to steps 114-136 discussed above. At step 152, the processor assigns resources payoffs between the interacting agents according to the chosen join or defect strategy and the resulting resource payoffs. At step 154, the processor records agents resources and choices resulting from the present interactions. At step 156 the processor determines whether there are agents remaining to interact for the present iteration of game play. If so, at step 158 the processor indexes to the next agent available for game play and the execution of the algorithm 100 returns to step 142. If at step 156, the processor determines that there are no agents remaining for interaction then execution of the algorithm 100 continues at step 160.

At step 160 the processor displays or otherwise stores or tabulates the strategy for cells selected in the current iteration of game play. Additionally or alternatively, other results or analysis of results may also be displayed, stored, or otherwise tabulated for the most recent iteration of game play. At step 162, the processor records the join count for the just completed iteration. Additionally, the processor may also record the defect count and other aspects of the interactions and resulting payoffs for the iteration. At step 164, the processor may calculate and display a graph of the universal join relative frequency $UJRF=(total\ join\ count)/n^2$.

At step 166, the processor detects coalition neighborhoods. For example, a neighborhood may be labeled as a coalition neighborhood if the join count amongst the nine agents in a neighborhood exceeds the UJRF. At step 168, the processor detects adjacent coalition neighborhoods, for example, neighborhoods are adjacent if their intersecting cells are not empty. A coalition may be, for example, the union of adjacent coalition neighborhoods and the size of the coalitions equal to the number of cells in the union of adjacent coalition neighborhoods.

At step 170, the processor displays the coalitions. At step 172, the processor records additional results of the just completed iteration and the result in coalitions, for example the coalition size, join count, total resources, and sole locations. At step 174, the processor collects a metabolic tax from each agent's resources. At step 176, the processor removes resource depleted agents from game play. At step 178, the processor determines whether the number of iterations M has been reached. If not, at step 180 the processor index game play to the next duration and the algorithm 100 returns to step 140. If at step 178 the processor determines that game play is complete, then the algorithm 100 continues at step 182 for post simulation analysis. Steps 182-188 include illustrative post simulation analysis; however such analysis may include other analyses including that disclosed elsewhere herein.

At step 182, the processor sorts and displays coalitions by size. At step 184, the processor chooses signature analysis to detect dominant cyclical patterns. Fourier analysis is used to detect these cycles and their dominant periods. At step 186, the processor detects fractal boundary signatures if any exist. This is done by sorting measures of coalition size or clustering by their frequencies. These data are logged, and inspected for scale-free power distributions. At step 188, the processor calculates and displays a plot universe join history. Coalitions are represented by color-coding agents according to which coalitions they belong. At step 190, algorithm 100 is complete.

Tables 1-20 (set forth in the Computer Program Listing Appendix) list illustrative code implementing the illustrative algorithm 100. Specifically, the code illustrated by Tables 1-20 is C++ source code and header modules suitable for execution by a sequential processing computer. Illustrative input and output data associated with the illustrative software of Tables 1-20 is illustrated in FIGS. 22-38.

Additionally or alternatively, the illustrative algorithm 100 or other algorithms within the scope of the invention may be parallelized for execution, for example, by the parallel processing computer system 200. For example, the server 202 may execute code for regulating communications among the workstations 204 and for compiling and analyzing the data outputs from the workstations 204. The individual workstations 204 may each execute code for similar or same repetitive tasks simultaneously.

A parallelized software system architectural design may be viewed as a top-down arrangement of independent units, capable of acting in parallel with each other on separate cluster nodes of the system 200, or in synchronization with high-speed communication links. Each unit is identified as an independent unit. Initially, some sequential processing of "macro-independents" is required to effect system operation and is reflected in the following listed order: Control Panel, Governing Authority, Agent Mind and Control, Data Collection, Real-Time Data Maps, and Data Mining.

The independent units, themselves, may be further divided into parallel processes to take advantage of idle nodes. Should, the initial, static mapping of processes onto nodes become less than optimal, dynamic mapping of process onto idle nodes may be allowed to enhance the computational throughput through a "re-docking process" in the control panel. The following is intended to provide a description of each macro-independent and is only one alternative guideline for actual implementation onto a cluster. The actual cluster hardware configuration and communication capabilities will impose unforeseen adaptations on individual clusters. One advantage of the illustrative algorithm is that it provides for such modifications through task separation and independence.

The macro-independent Control Panel enables initial and real-time control of many aspects of algorithm, system and hardware. It is the dashboard/human-computer-interface for the modeler. Parameter controls may provide slider-type interfaces for continuous variation of input parameters/variables and multi-state switch interfaces for multiple discrete state selections, for example mind control selection for agents and interactive coalition labeling. The Control Panel enables the user to manage governing authority, control real-time population profile graphs, pause and review, and re-construct with docking authority as causal/plausability analysis.

The macro-independent Agent Mind and Control allows for and engenders emergent behaviors in agents and coalitions. In short, with this algorithm, agents become more than "ants" searching a landscape for resources. They behave. The agent categorization and mind control may include the herein discussed interaction strategies, including rational choice, AP risk analysis and join probability adaptation, conformist-bias, and prestige-bias; as well as other aspects such as privacy/visibility to other agents and access to other agent history and global data.

The macro-independent Governing Authority proscribes agent actions and "daily" lives. For example, conducting game play, including agent selection for play, pairing or grouping for interaction, inter-agent communication protocols, and agent interaction strategies. The Governing Authority may also provide census authority as data reporting, initial resource allocation, resource variation during game play, and game rewards.

The macro-independent Data Collection provides data recording with carefully controlled access. Data may be collected and recorded in memory or other known data storage devices, or transmitted for recording and analysis by another system. Data that is collected may include agent play histories, mindsets, wealth, status, ranks, coalition memberships, fitness and other measures of well-being and status and game play results, population global profiles and analysis, and control panel settings.

The macro-independents Real-time Data Maps and Data Mining provide data analysis, mapping and visualization for simulation monitoring and control. Real-time data analysis may include global mappings such as resource allocation, resource depletions, agent life cycles, and agent ranking/prestige; granular mappings such as neighborhoods and coalition boundary mappings; real-time data and analysis displays; and system monitoring such as throughput/bandwidth and feedback response time monitor.

Development of Models Using Expo-Sigmoid Utility. As discussed above, while basically sigmoid wealth distributions are common, complex societies in which elites control a majority of the wealth exhibit an overall exponential distribution of wealth with sigmoid fluctuations around this trend. For example, FIGS. 3C and 9 illustrate world wealth distribution. For FIG. 9, the wealth distribution (Price Power Parity index, PPP in $US) is fitted with an expo-sigmoid curve on the original data. Wealth distribution equation for the scaled data is $W(x)=e^{(-0.438+0.4x+0.399\ sin(x))}$, with all coefficients significant at the p<0.0001 level, $R^2=0.966$.

The general form of the exponential extension of the original sigmoidal formulation which models such distributions is $W(x)=e^{d+ax+c\ sin(bx)}$, a>bc. W is used for this function to avoid confusion with traditional utility functions, although a systematic relationship between W and the U of utility functions holds. The parameter, a, is the same as in the sigmoid function discussed herein. Parameter c is an additional parameter that allows for amplitude in the sigmoid fluctuation around the underlying exponential distribution. The constant, d, is the natural log of the y-intercept of the expo-sigmoid distribution. A scaling method that sets b=1, providing a simple periodicity of $2\pi$.

This expo-sigmoid function is a robust model of the overall distribution of wealth in a complex economy, allows calculation of risk sensitivity measures for all individuals, and facilitates deeper mathematical analyses. The function's parameters are easily estimated with non-linear regression techniques that provide extremely close (over 95% variance explained) statistical fits to data. Furthermore, the underlying functionality allows identification of risk prone individuals with risk sensitivity measures, even in the relatively wealthier segments of a society where sigmoid fluctuations are less apparent graphically.

Application of Fast-Fourier Transforms for estimating parameters of the expo-sigmoid model provides for the more difficult fitting of a curve to data in the upper range of a wealth distribution. Fast-Fourier Transforms may be used to identify the dominant and statistically significant periods of the sigmoid fluctuation around the exponential pattern in wealth distribution data. An illustrative method is as follows and also can be used for modeling measures of other resources and other data:

1. Take the natural log of wealth data to remove exponential effects.
2. Perform an ordinary least squares ("OLS") regression to extract the linear effects from the data, resulting in an equation d+ax.
3. Perform a Fast Fourier Transform on the residuals of the OLS. This produces a list of complex numbers, the real part corresponding to the coefficient of a cosine of x term, and the imaginary part corresponding to the coefficient of a sine of x term. Pick out the terms that are statistically significant from the Fast Fourier Transform analysis and this results in a trigonometric polynomial of the form: $f=\Sigma \cos(x)+\sin(x)$.
4. Construct an argument for the expo-sigmoid function by adding the sine and cosine terms from the Fast Fourier Transform analysis, to linear and constant terms from the OLS, resulting in: $W(x)=e^{d+ax+\Sigma\ cos(x)+sin(x)}$.

Development of Models Using Sigmoid Utility. Key issues in the nature of decision making include whether or not individuals maximize utility, how much culture conditions values, and how and to what extent risk and uncertainty play a role in decision making. A connection between environmental constraints and decision making can be made by modeling the implications of potential environmental constraints on risk sensitivity and the value of goods. A sigmoid (S-shaped) utility formulation exhibits both the ecological and social dimensions of value under risk. The general applicability of the sigmoid model is indicated by widespread cross-cultural support in Industrial and non-Industrial economies, examples of which are given below, for example, data on the collapse of an ancient Mayan city-state in Central America, the American Revolution, and contemporary voting behavior in the United States.

Researchers commonly assume that marginal value decreases as one obtains more of a good, implying that value functions are concave and that decision makers are risk averse. The term material wealth is used herein to refer to actual goods, capital, or social rank, and the more generally accepted terms utility and value to refer to the satisfaction one derives from possession of material wealth or social rank. Despite the general acceptance of and empirical support for risk aversion, it is not universal. Others have argued that a decision maker's sensitivity to risk would vary with material wealth and status. At some wealth levels decision makers will be risk prone, preferring a risky gamble with a low expected value but having the possibility of winning a large reward over more assured outcomes. Such a gamble can be considered an unfair bet. At different wealth levels decision makers would avoid such risks, preferring more assured outcomes with lower expected values than probabilistic outcomes.

Milton Friedman and Leonard Savage posited a sigmoid utility curve with alternating concave and convex portions to model such behavior. In the sigmoid model illustrated in FIG. 10, an individual at wealth w in the convex region of the curve offered an even chance of either increasing or decreasing wealth by p, would take the gamble because the increase in utility, b, is greater than the potential loss of utility, a. As labeled, a risk prone individual would have a tendency to take chances to gain wealth to move upward in social rank. Such a person would in other words be willing to pay a cost, or invest, on a particularly risky venture. An individual whose material wealth lies at pointy in the concave region of the curve would be risk averse and refuse the same gamble (refuse to pay a cost) because the most possibly gained would be d, which is less than the potential loss c. Friedman and Savage suggested that those well established within a particular social stratum would be risk averse and have concave utility. Such decision makers would be reluctant to risk losing too much wealth and sliding back to a lower social status. In contrast, others on the boundary of a wealth stratum would have convex utility and would take a risk for a potential gain that would move them to a higher social status. The consequence of losing for those on the convex portion of the utility curve would be no worse than dropping back to the status they occupied before the gamble.

Full exploration of this proposal requires the specification of a sigmoid functional form that can be tested against data and used for further analytical research. A sigmoid utility function should exhibit changes in concavity and be monotonically increasing, and constants in such a function should directly correlate with observed social factors. The following illustrative sigmoidal analytical function meets these criteria: $U(x)=\alpha x-\sin(\beta x)$, where x is the objective measure of material wealth or social status, $\alpha>0$ is the cultural emphasis on status, $\beta>2\pi\beta$ is the quasi-period delineating distinctive social strata (classes) with respect to material wealth, and $\alpha > \beta > 0$. With the restriction, $\alpha > \beta > 0$, $U(x)$ is monotonically increasing with respect to material wealth.

The implications of sigmoid utility can be explored analytically by considering standard measures of risk sensitivity such as AP and downside risk aversion. The AP measure of absolute risk aversion, $r(x) = -U''(x)/U'(x) = \beta^2 \sin(\beta x)/(\alpha - \beta \cos(\beta x))$, as illustrated by FIG. 12. Since the first derivative of the sigmoid utility function is positive, $U''(x) < 0$ implies risk aversion (concave) and $U''(x) > 0$ (convex) implies risk proneness. An inflection point of the utility function, $U''(x_0) = 0$, implies risk neutrality at $x_0$. The zeros of AP risk aversion are at the inflection points, $x = n\pi/\beta$, $n = 0, 1, 2, \ldots$.

Figure 10:
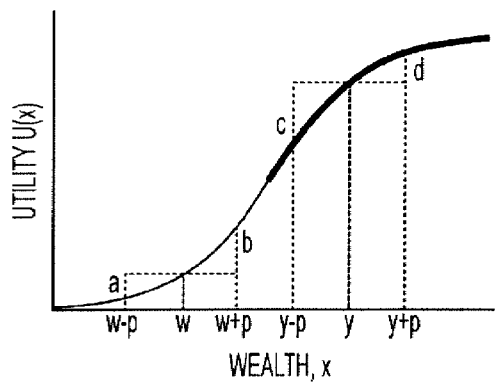
FIG. 10 is graph showing an illustrative distribution of resources obtained and valued by individuals in a society, in this case wealth, the distribution being a sigmoid function.
Figure 11:
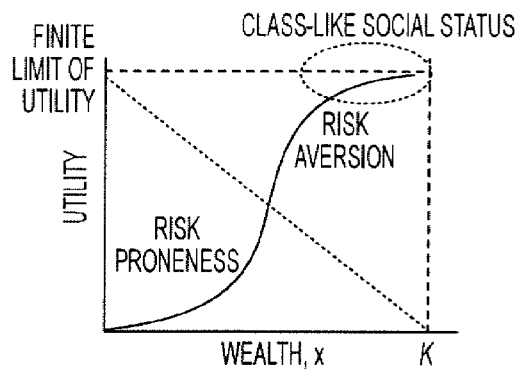
FIG. 11 is graph showing an illustrative distribution wealth and classes of wealth associated with risk sensitivity.

The AP measure yields negative (risk prone) values in convex and positive (risk averse) values in concave sections of the curve. Socio-economic classes would be defined in the step-like areas between the inflection points of steep sections of the curve $x = 2n\pi/\beta$, $n = 0, 1, 2, \ldots$ as illustrated in FIG. 11. While sigmoid utility is not periodic, divisions between classes are delineated by quasi-periods, $2n\pi/\beta$, $(2n+1)\pi/\beta$. FIGS. 10 and 11 show one quasi-period of the sigmoid utility function.

The AP measure is limited because the underlying probability distribution for losses and gains assumed in that model is symmetrical. Some decision makers are willing to accept a gamble with a lower expected value, provided that the gamble provides an asymmetrically distributed probability of loss and gain in which there is a negligible probability of a large loss and a high probability of a small loss, offset by a small probability of a very large gain. This observation has been made in detailed studies of industrial firms, pig-raising operations, and in Indian peasant agriculture. Such preferences imply a probability distribution skewed to the right toward higher gains. This behavior indicates sensitivity to the third moment, or skewness, of a probability distribution. The third derivative of a utility function will be positive for a person with downside risk aversion.

Researchers have proposed various measures of downside risk aversion based on the third moment and have derived a measure analogous to the AP. However, this measure provides negative values for downside risk aversion. For consistent comparison with the AP measure, the measure of downside risk aversion must be negated as follows: $dra(x) = -U'''(x)/U'(x) = -\beta b^3 \sin(\beta x)/(\alpha - \beta \cos(\beta x))$.

FIG. 12 illustrates that having a convex or concave utility function does not necessarily imply either downside risk averse or risk prone behavior. Those who are on or straddle a class boundary (quasi-period), are predictably downside risk prone ($dra(x) > 0$), willing to take the gamble of falling back into their class for a long chance at raising their social status. Individuals on or straddling the mid-point of a class are predictably downside risk averse ($dra(x) < 0$), fearing their loss of social status. These social insights underscore the importance of knowing more moments of the underlying probability distributions associated with the losses and gains a decision maker is considering when confronting a gamble. Class boundaries are pivotal for the implications of behavior under risk, as described in the examples below.

Prospect theory and sigmoid utility. AP and downside risk measures are grounded in standard neoclassical economic theory. Prospect theory was developed to explain paradoxes (e.g. Allais' Paradox, framing effects, loss aversion) unexplained by traditional utility theory. Research has established how people systematically deviate from rational expectations, and can be used to make theories of decision making more realistic. However, neither prospect theory nor any other alternative provides a coherent explanatory framework that can replace utility theory, despite its limitations. Therefore, a more fruitful approach is to enrich utility theory by incorporating insights from prospect theory. Two aspects of prospect theory, loss aversion and the framing effect, are relevant to this application of sigmoid utility.

People exhibit a stronger disutility from losses than utility from gains. It has been proposed that the carrier of utility is not a level a wealth, but changes from one's wealth. A sigmoid utility curve, convex for losses and concave for gains, with the slope of the convex curve greater than the concave section, can be used to model such changes. Despite the evidence in support of this model, the three examples below demonstrate where individuals arguably were concerned with gains, not losses, and where they exhibited convex utility preferences.

People are strongly influenced by the way problems are framed. People behave differently if they are considering a payoff as a loss rather than a gain. In a now famous experiment people were asked whether or not they would adopt a treatment, providing information on its success rate and its failure rate. People presented with the treatment's success rate said yes, and those presented with its failure rate said no. The findings of prospect theorists indicate that people's regard for their prospects and emphasis on disutility are important contextual factors that condition otherwise rational decisions, and these considerations will be incorporated in the examples below.

Empirical evidence of sigmoid utility. Economic anthropologists, using an implied AP model of risk sensitivity, have independently corroborated Friedman and Savage's sigmoid utility model. For instance upper middle class Maya peasants in Zinacantan, Mexico who anticipate moving into a higher social class are more likely to try new risky agricultural techniques and take the chance for increased productivity. Research among peasants around the world confirms these observations. Risk sensitivity among four ethnic groups in three societies: indigenous Mapuche Indians in Chile, their mainstream Chilean neighbors known as Huinca, the agropastoral Sangu of Tanzania, and University of California undergraduates, are measured with experiments in which they offer subjects different lotteries with real cash awards. The impoverished indigenous populations exhibit risk proneness, while economically middle class Huinca and American undergraduates are typically risk averse.

An empirical study of risk sensitivity among goat and alpaca herders in Andean Peru also fits Friedman and Savage's sigmoid model. This study measures the distribution of herd sizes in two traditional Aymara Indian communities and assesses their individual risk sensitivity experimentally. Very poor and wealthy herders exhibit a relative attraction to risk, and middle-wealth herders demonstrate strong risk aversion, indicating that risk sensitivity alternates with quantitative differences in wealth as predicted by a sigmoid model.

The illustrative ABM system can be configured to incorporate Friedman and Savage's sigmoid utility into a model describing the step-like distribution of reproductive fitness enhancing goods in non-Western pastoral and foraging groups, as well as among non-human primates. Biologists have noted similar risk sensitivities among insects, birds and mammals and other studies of human societies and animal groups detail resource distributions and reproductive payoffs that appear to be related in a sigmoid fashion. In light of these varied studies, sigmoid models of utility appear to provide analytical insights into risk sensitivity in a wide variety of contexts.

Carrying capacity, finite material wealth, and utility. There are systematic relationships between utility, resource distribution, environmental structure, and competition. Researchers have recognized that there is a finite amount of material wealth in the world at any one time, even if technological developments enable future increases. The specification, at any one time, is important since material wealth can expand through time due to technological improvements in efficiency. However, during any one period when an individual must make a decision, wealth will be finite. Furthermore, there is a growing awareness that economies are constrained by these biotic limits of the environment.

Resources, and therefore material wealth, are finite at any one time. Value is potentially finite as well. Utility functions researchers use to model value are typically linear, concave, or sigmoid. If the material wealth upon which value (modeled with these functions) is based is finite, then the maximum value these functions could attain at any one time would likewise be finite. The crash of "overvalued" stocks, such as the recent drop in internet stocks and "bubbles" such as the famous tulip bubble in early 17th century Netherlands indicate that value is neither wholly subjective, nor unconstrained. Limits appear to exist even for subjectively valued tulip bulbs.

Anthropologists who have measured value as finite units of material wealth, such as energy and time, have been tremendously successful in explaining behavior in a wide range of environmental and economic settings. Using optimal foraging methods, researchers have explained the diets of hunters and gatherers in Paraguay, Australia, and the Peruvian Amazon, optimal group size among the Bari fishermen of Venezuela, Eskimo and Indonesian whale hunters, herd management among traditional pastoralists such as the Aymara of Andean South America and African cattle herders, and the dispersion of fields among peasant Quechua Indians of the Peruvian Andes and Medieval English serfs.

Empirical evidence clearly shows that material wealth is never equally distributed. Inequality in resource distribution is obvious in the competition over key fruit sources among non-human primates or the pervasive competition over mates and resources across all human societies. In summary, material wealth is finite, the value people can derive from such wealth is potentially finite, and wealth differentials exist. These implications necessarily imply sigmoid utility functions as demonstrated by considering the expected behavior at the upper and lower limits of material wealth.

Sigmoid utility, risk sensitivity, and the limited distribution of resources. The upper limit on material wealth and utility at any time in the illustrative sigmoid model is analogous to the concept of carrying capacity in ecology. Carrying capacity is a theoretical limit on population growth based on the distribution of limited resources. It is also a practical limit that empirically exists. An example is the collapse of human population on Easter Island as its indigenous Polynesian inhabitants over-extended use of agricultural land on this remote Pacific Island. Prehistoric Anasazi towns of the southwestern US similarly failed during the 13th century due to the combined effects of prolonged drought and erosion caused by traditional agriculture. The end result was the collapse of Anasazi food production and political structure into warfare and cannibalism. In the illustrative sigmoid model, material wealth is finite and the traditional symbol for carrying capacity, K, is used to designate it (FIG. 11). K marks the end of the last quasi-period. Given the existence of this limit, economic competition becomes zero sum at any one time, providing the basis for sigmoid utility based on material wealth distributions. The zero-sum nature of this competition implies a dynamic exchange of value throughout a society as the gains won by some are the losses felt by others.

With finite wealth capacity, consider the dilemma of those near this limit of material wealth who have little or nothing to gain and who can loose a great deal. Intuitively, these wealthiest individuals should be risk averse (barring the possibility of further large gains in wealth), especially to large losses. Both AP and downside risk aversion measures are consistent with this explanation (FIG. 12). At the other end of the spectrum, consider the poorest who have almost no material wealth at all. Any of these individuals immediately above a point of absolute destitution have almost nothing left to lose and everything to gain if they must consider only symmetrical gambles. If presented with gambles positively skewed toward high rewards, they would be predictably downside risk averse. Therefore, the utility function will necessarily be convex near zero material wealth (FIG. 11) with positive downside risk aversion (FIG. 12).

Standard measures of risk sensitivity yield reasonable and clear expectations for behavior in the illustrative sigmoid model, allowing prediction of which individuals are most likely to take chances. Since the illustrative sigmoid model is justified in reference to resource limitations, a full examination of the illustrative sigmoid model's explanatory potential requires a long-term diachronic study of environmental limitation and growing class-like wealth differentials. The long archaeological record of the rise and fall of Mayan civilization provides an ideal opportunity to examine such long-term effects. Also instructive is a clear case of historical economic growth followed by artificially imposed limits to explain revolutionary behavior in the American colonies, and the implications of sigmoid utility for voting among today's American citizens.

The Collapse of Mayan Copän. Mayan civilization flourished from about AD 400 to 850 in present day Central America. At its height, Mayan civilization existed as a number of independent city-states ruled by kings, and managed by lesser nobles and bureaucrats. Maize agriculture sustained the population and served as a basis for the taxation of peasants. This civilization, with its pyramids, scribes, astronomers and dense populations, collapsed during the 9th Century AD. Research at the Mayan city of Copän provides a detailed record of this collapse.

Copän is situated near the mountainous border of present-day Honduras and Guatemala. The environment today, like in the past, is heavily circumscribed. Fertile arable land exists only in small pockets scattered along major river valleys. A small population of Mayan farmers began clearing land in the Copän valley pocket by 3600 BC. Population grew rapidly from AD 400 to 750, reaching an estimated peak near 28,000 people. Traditional Central American (Mayan and Aztec) agriculture involves cutting and burning field plots every few years. This burning produces severe sheet erosion in the mountainous and wet environments of Central America. Archaeologists studying pollen samples from ancient bogs near Copän have charted environmental changes through time, and have found that severe erosion accompanied rapid population growth in the Copän valley.

Figure 13:
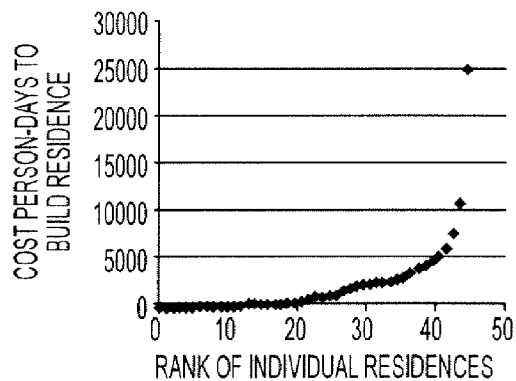
FIG. 13 is a graph showing an illustrative wealth distribution (labor cost of residence) in a sample of Late Classic Maya households at Copan.

Commensurate with the growth of Mayar population was increased competition over resources and the development of a distinct social hierarchy with the following classes: the royal family, representatives of elite noble lineages landed courtiers, and commoners. This social hierarchy was directly related to the material wealth invested in Mayan households as measured by number of person-hours required for construction. As FIG. 13 indicates, Mayan society had class-like divisions of wealth corresponding to the hierarchy archaeologists infer (A linear regression of labor cost on rank exhibited clear periodicity in the residuals, necessitating a sigmoid model. Using methods described herein, a sigmoid curve is fit to the Copän data, providing a close ($R^2$=0.888) and highly significant fit.).

These step-like sigmoid differentials became the faultlines along which Copän collapsed during the 9th Century AD. By AD 750, carrying capacity had been reached and breached, as evidenced by widespread malnutrition, first among Copän's heavily taxed peasantry, and eventually throughout all classes of Mayan society. Through careful dating, archaeologists document an economic expansion previous to this time (legitimating the use of a sigmoid curve over gains), environmental degradation, and subsequent social instability. Using hieroglyphic texts preserved in the stones of Copän structures, archaeologists have pieced together the history of an elite rebellion against Copän's king. However, their description lacks a theoretical expectation of an elite rebellion. Why wouldn't the elite have continued to support their king? Why was it not a peasant revolt? The illustrative sigmoid model suggests an answer.

Research documents the economic and political rise of elite nobles and rural political figures shortly before the king's overthrow. Based on Mayan texts and the dates of their monuments, archaeologists know that Copän's last king, Yax Pasah, was deposed between AD 820 and 822. The burning and defacement of the king's main complex indicates that the coup was violent. While the Copän monarchy disappeared, its lesser nobles and commoners did not. Archaeologists now know that a truncated Mayan hierarchy continued to exist for another 150 years, and that population decline was gradual. It appears that after the elite nobles' successful overthrow of the king, they continued to rule, and they vied for power among themselves for at least several generations. Referring back to FIG. 13, an illustrative sigmoid model predicts that precisely these nobles (approximately rank 40) would have been in a position to rebel, owing to the extreme convexity of Mayan wealth distribution in their position, which would have given them tremendous potential gains.

With the elimination of the king's household, the ruling elites formed an oligarchy, but it was one circumscribed by the limits of agricultural production in the Copan valley. Their gains were eventually lost due to the continuation of severe erosion that began in the 8th century, In the end, the Copan Maya were doomed, and the valley was effectively abandoned by the 13th Century, only regaining its population numbers (with a concomitant increase in severe erosion and social unrest) in the late 20th Century.

The American Revolution. Historians recognize the paradox that the American Revolution occurred among a largely prosperous people who enjoyed a long period of economic growth. Furthermore, instead of being a proletarian revolution of an oppressed underclass, the American Revolution drew adherents from across the economic spectrum of colonial America, including the poor, yeoman farmers, tenant farmers, merchants, intellectuals, and wealthy plantation owners.

By examining the distribution of wealth within the colonies, one can gain insight into the appeal of the revolution to people of greatly different wealth levels. The economic history of the American colonies up to the eve of the American Revolution confirms that, despite great wealth differentials among colonists, they had as a group experienced a long period of economic expansion and prosperity. This prosperity was threatened for all colonists by the imposition of various tax acts, and the Quebec Act that frustrated colonial attempts to make legal land claims west of the Appalachian and Allegany Mountains.

Figure 14:
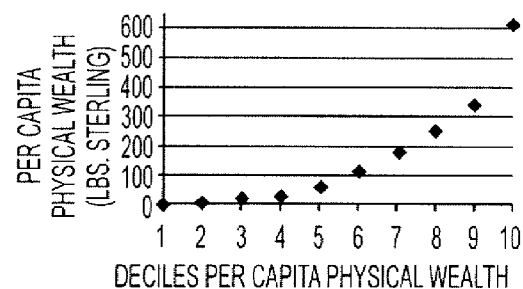
FIG. 14 is a graph showing an illustrative distribution of physical wealth (land, capital, slaves in the American Colonies, 1774.

A representative sample of 919 individuals who lived throughout the colonies in 1774 details their economic assets and liabilities. Examining the distribution of physical wealth (houses, equipment, real estate, slaves), it is clear that colonial America had an entirely convex distribution of wealth (FIG. 14). There were no clear wealth based classes in the colonies, Furthermore, the wholly convex distribution of wealth, in combination with the possibility of continued economic growth through economic and territorial expansion, implies that throughout all wealth levels, people would generally have been risk prone over gains, standing to gain much by supporting the revolution. Lists of participants on Philadelphia revolutionary committees confirm that the revolution drew substantial support from all wealth levels in the colonies. Therefore, the broad appeal of the revolution can be explained by considering the nature of colonial wealth distribution.

Contemporary American voting behavior. While driving to the polls is less dramatic than toppling a god-king or freezing at Valley Forge, researchers have established that the expected benefits of voting are less than the cost of voting, implying that voting is a risk prone behavior. Who is investing their time and effort to vote, and who is deciding that it is not to their benefit? Sociologists have long demonstrated that the poor are less likely to vote, and that this pattern has been historically very stable. Sociologists also stress that income is the key variable in understanding voting behavior and political participation. Given that Americans enjoyed a period of unprecedented economic expansion prior to the 2000 election suggests that the sigmoid model evaluated over gains can provide insight into the patterns of American voting behavior. The National Election Studies of 2000 provide extensive and representative data on 1807 Americans' income and voting behavior. These data provide the additional opportunity of examining whether or not the actual individuals who fall on a convex wealth distribution curve were indeed willing to invest in voting.

Figure 15A:
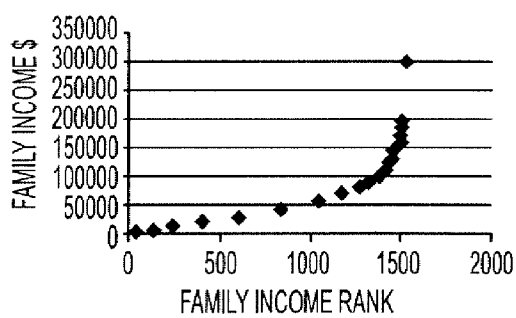
FIGS. 15A-15B are graphs showing the entire sample and a sub-sample of an illustrative distribution of family income in the US, 2000.
Figure 15B:
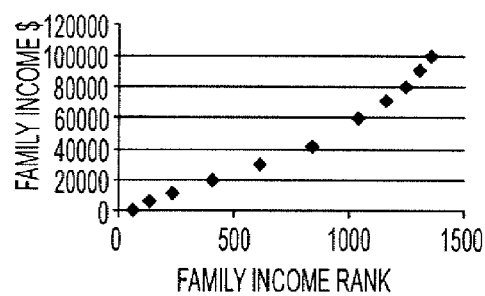

Examining the wealth distribution curve, it begins concave and has a clear inflection between $25,000 and 30,000. The convexity becomes abrupt after $150,000 (FIGS. 15A-15B). Strikingly similar American wealth distributions can be observed in census data and in studies by the Centers for Disease Controls (The initial concavity of the US wealth distribution curve implies two things. First, social mobility from the most destitute to lower income brackets is abrupt. Second, the initial concavity implies that the US economy is fueled by wealth drawn from outside the US national economy.). Therefore, one would expect voter turnout to increase with income, and to be higher than expected as the income distribution curve becomes more convex. In fact, sharp increases in voting behavior occur as income rises. Respondents with a family income in the lowest bracket ($0-2500) voted at a rate of 68% in the sample. Respondents whose family income was between $25,000 and 30,000 were 86% likely to vote, and respondents whose family income was greater than $135,000 generally had 100% voter turnout.

A binary logistic regression to predict probability of voting based on income level using SPSS 11.5 (available from SYSTAT Software Inc., of Point Richmond, Calif.) provided a highly statistically significant (P<0.00001) fit of expected and actual voting behavior (Log-of-the-odds ratio of voting behavior=0.934+1.89×10-5 (Income). $R^2$=0.075. All parameters and model are statistically significant at P<0.00001.). However, the fit is not very close (R2=0.075), and there are systematic deviations from expected voting behavior consistent with the illustrative sigmoid model. Using the SPSS nonlinear regression routine, the following sigmoid function is fit to the wealth distribution data, including scaling of the data. The resulting equation is Income=0.682×rank−sin(−0.707×rank), and its parameters are highly statistically significant (P<0.00001), and close fitting (R2=0.914). This wealth distribution curve begins concave, inflects after $25,000-30,000, and becomes concave from $75,000 to 145,000. Above income of $155,000, the data become strongly convex, requiring the fitting of another curve.

The sigmoid wealth distribution equation is used to calculate AP measures of absolute risk aversion, and these measures correlated with the residuals from the logistic regression. Risk averse decision makers should vote less than expected (have negative residuals), and vice versa. The resulting data confirm this pattern, with a statistically significant (P=0.007) and negative Pearson's correlation coefficient (r=−0.645) between residual voting behavior and AP risk aversion measures. In summary, voters with more to gain than to lose from participating in elections voted more than their income alone would predict. In contrast, voters for whom advancement would make less of a difference in their wealth and social standing did not turn out to vote as much as expected.

Ecological bounds exist on material wealth and these limitations imply that wealth distributions, and therefore, utility functions are best modeled with sigmoid curves. Individuals are not simply risk averse or risk preferring, but their sensitivity toward risk is expected to vary with wealth in a predictable manner. Individuals within a step-like social stratum (middle class accountants, university professors, or blue-collar workers with secure union jobs) are expected to be risk averse. Individuals between strata (starving animals, destitute poor people, upwardly mobile day traders, leaders of newly emergent world powers, adolescents) are expected to take chances, perhaps violent ones, because they have more wealth, status and prestige to gain if they win a gamble than they will lose. Depending on the underlying probability distribution of gambles, either AP or downside risk aversion measures provide reasonable predictions of behavior. Also, insights from prospect theory, such as the influence of framing and loss aversion, need to be considered when modeling decision making.

In the cases of Late Classic Mayans, American colonists, and late 20th century United States citizens, upwardly mobile (i.e. considering gains) people whose wealth falls on a convex curve of a social material wealth distribution are more likely to invest in or take a chance on increasing their material wealth and social status. Individuals whose wealth falls on a concave curve are less likely to make such investments and take such chances. These patterns have implications for both explanations of political conflict within a society, and for the design of development programs. For instance, the Sicilian Mafia originated among higher-class peasants, and neither among the landed elite nor the impoverished peasantry of 19th Century Sicily. Experimental agrarian development programs appear to be more attractive to people who are neither impoverished, nor wealthy, but who are on the verge of entering a new (and higher) social class. Finally, revolutions are typically initiated by disgruntled entrepreneurs and elites, rather than by the oppressed masses. These cases indicate that further attention to step-like wealth differentials, ecological constraints, and their systematic influence on risk sensitivity is warranted.

Modeling Effects of Global Wealth Distribution. In an earlier study of wealth distribution in the U.S., a two-tiered economy appeared to exist. Wealth distribution among the wealthy was S-shaped and very steeply increasing. Wealth distribution among the rest of the population had a shallow slope and began concave. According to the inventors' theory of sigmoid utility, the initial concavity of the U.S. wealth distribution curve indicated that in this First World country, wealth was being drawn from elsewhere. Data presented herein demonstrates that the global distribution of wealth behaves as the inventors' theory of sigmoid utility predicts—it is initially convex, demonstrating the impoverished and desperate condition of third world countries in relation to first world countries. Furthermore, there appears to be a two-tired global economy, with an initially convex, shallow-sloped sigmoid distribution for the third world, and a subsequent and initially convex, steep-sloped sigmoid distribution for industrial nations. The place of a nation on these curves can lend insights into which nations (on the convex curves) have the most to gain by challenging the dominant world economic system and which nations (on the concave sections) have little to gain by challenging the world economic system. Importantly, the risk sensitivity of a nation's citizens and leaders is less influenced by their absolute wealth/poverty, and more influenced by their wealth level relative to their nearest competitors.

In decision theory, an individual is expected to make choices that maximize his or her satisfaction, or utility. The standard neo-classical economics assumption is that utility is wholly subjective. While utility is subjective, its relationship to actual levels of wealth is thought to follow certain functional forms, namely linear or concave (negative exponential, power) functions. Utility is less a subjective individual phenomenon, and more influenced by social class and the distribution of objective wealth. Furthermore, wealth in a wide variety of economic systems is always differentially distributed such that qualitative leaps between classes of individuals exist. Such discoveries imply an S-shaped, or sigmoid function that has alternating oscillations between convex (concave upward) and concave (concave downward) sections.

The shapes of wealth distribution curves are informative since, as argued, utility is based on wealth distribution. Therefore, an individual's satisfaction with wealth is based on that individual's wealth relative to others. If an individual is on a convex curve for wealth, then by definition, that individual has more utility to gain (the marginal rate of wealth acquisition is increasing) by taking a fair bet (50:50 of losing/gaining an equal amount) than what he or she stands to lose. Such a person is attracted to taking chances, or in other words is risk prone. Conversely, if an individual is on a concave section of a wealth distribution curve, that individual would stand to lose more utility than to gain in a fair bet. Such a person would seek insurance against losses, or be risk averse.

The sigmoid model has been proposed to explain the influence of socioeconomic class on people's decision making and risk sensitivity. Subsequently, biologists and anthropologists have found the sigmoid model useful for explaining risk taking (risk proneness) and risk avoidance (risk aversion) in a variety of animal species and non-Western economies. Empirically, not only are wealth differentials in human (and non-human) societies ubiquitous, but they often contain qualitative leaps in status or wealth that cannot be modeled by simple linear or exponential functions. These leaps can only be modeled by a sinusoidal, or sigmoid function. Furthermore, these complexities cannot be captured by standard techniques such as Lorenz curves and Gini coefficients.

This theory has applications in global politics since nations, like individuals in a particular society, do not partake equally of global wealth flows. Therefore, the risk sensitivity of citizens as well as the leaders of these nations, should be subject to the same influences from wealth distribution that were identified among individuals in a variety of economies. Nations that fall on a concave section of global wealth distribution should be risk averse, and essentially play along with global economic influences since they have more to lose by not doing so than they have to gain by rebelling. Conversely, nations on convex curves should be risk prone, and willing to take risks (such as military aggression, overt challenges to the global economic market system itself) in order to capture more wealth.

The key point is that poverty or wealth per se is not the determinant of risk sensitivity. Instead, it is the position on a sigmoid wealth distribution that determines risk sensitivity. Therefore, it is entirely possible to have an extremely impoverished nation where leaders and people nonetheless will not challenge their position, provided that they are on a concave section of global wealth distribution. That is because, locally, they have more to lose than to gain from taking a risk. Conversely, it is possible to have a relatively well-off nation whose citizens and leaders would be attracted to taking a risk because they stand to gain more wealth than to lose given their position on a convex section of global wealth distribution.

Modeling Wealth Distribution. An illustrative sigmoid function has the general form of: ax−sin(bx) where $|b| \leq a$, and x is some measure of wealth or status. The linear parameter, a, measures the importance of good, x, in an economy. The sine parameter, b, measures the number of classes and the degree of wealth differences among classes. The sine parameter allows the curve to oscillate around the line, ax, providing for the sigmoid shape. Since the sine component is periodic, the function oscillates around quasi-periods of length $b=2\pi k$ where k is an integer.

Estimating such curves to yield statistical significance tests and measures of goodness of fit is possible with non-linear regression techniques, for example, the routines in the SPSS family of software, available from SYSTAT Software Inc., of Point Richmond, Calif. These techniques, based on maximum likelihood estimation, yield parameter estimates and standard errors that are asymptotically normal and therefore can be used to calculate standard test statistics, provided the number of cases is sufficiently large. Since the data set for the illustrative example contains 162 cases, the measures of statistical significance should be robust.

Testing for Non-linearity. There are several methods for testing for the non-linearity of data. Example methods that were used for the illustrative example were ANOVA and the Run's Test. In both cases, an OLS regression is performed on the data and the residuals are saved. If these residuals systematically tend above or below the regression line, then the data are non-linear and a simple linear model, despite its tractability and fit, is inappropriate. If the data alternately oscillate above and below the regression line, then the data clearly have a sigmoid distribution. ANOVA is used by sub-dividing data into the sections that appear to systematically deviate above and below the regression line, and comparing the mean values of the residuals across these classes. ANOVA has the advantage of being a parametric technique that utilizes interval data. The Run's Test is non-parametric and tests whether or not the sequence of runs (areas of sequential data above or below the regression line) is random or not. While this is a more qualitative test, it is more appropriate for the purposes since it monitors oscillations above and below the regression line. In both cases, ANOVA and the Run's Test yield highly statistically significant results indicating that the data are both non-linear, and that this non-linearity oscillates in a sigmoid fashion. Therefore, a sigmoid model is preferred over earlier models, even if it may not yield as close a fit as other models.

Measuring Population. The data on global wealth distribution are from a 1990 compilation by the Economist (Samuelson 1990) and the 2001 U.N. Human Development Index study (U.N. 2001). These studies contain data from 1987 and 1999 respectively. Of the various measures off wealth provided in these studies, one stands out as the best measure of relative wealth, the purchasing power parity measure ("PPP"). This measure, comparable across nations, is the value of the per capita wealth (measured from gross domestic product ("GDP")) in U.S. dollars adjusted for the cost of living in a particular nation.

The Economist data cover 150 nations and the U.N. data 162. Unfortunately, data are aggregated by nation, hiding wealth discrepancies within nations. However, these aggregated data can still provide a sense of the global distribution of wealth over nations, and, with modification, over populations. Furthermore, since many poor nations have only a few very wealthy families, the nationwide average statistics will provide a measure (admittedly imperfect and slightly inflated) of the wealth of most of its average citizens. (NOTE: The figures were adjusted by using GINI coefficients provided in the UN data. The adjustments had little effect, justifying the use of overall nation statistics).

Since the illustrative example concerns wealth distribution over people, not nations, the space each nation took up on the x-axis was adjusted by its relative population size as follows:
1. Rank the nations according to PPP.
2. Calculate the proportion of the world's population each nation has.
3. Multiply the lowest ranking nation's rank by its population proportion, then do the same with the second lowest ranking nation, adding the previous value. Repeat this iteratively until reaching the highest-ranking nation. This adjusts the various nations' ranks to represent the populations contained by these nations. This variable, hereafter referred to as population_rank (xppp), is the x-variable that monitors world population.

This procedure provides a sense of how wealthy the average person is in a particular nation and how this wealth is distributed across the world. Therefore, the analysis provides a sense of how the people of a nation feel about their relative wealth standing in the global economy. A nation's rulers, of course, will not necessarily share the view of their populace. However, to the extent that political leaders respond to the needs and aspirations of their people (and all must to some extent), the results of this analysis may provide a sense of which nation states will be more likely to challenge the world economy and which will be more conservative.

Measuring Wealth. Due to the form of the sigmoid function, both the range and domain must often be scaled to allow the function's parameters to capture the variability in the data. The entire world data set was scaled in the following way. The population rank (xppp) variable was multiplied by 10, and the PPP variable was divided by 750. This simple linear transformation of the data in no way alters the relationship between the variables.

Figure 16:
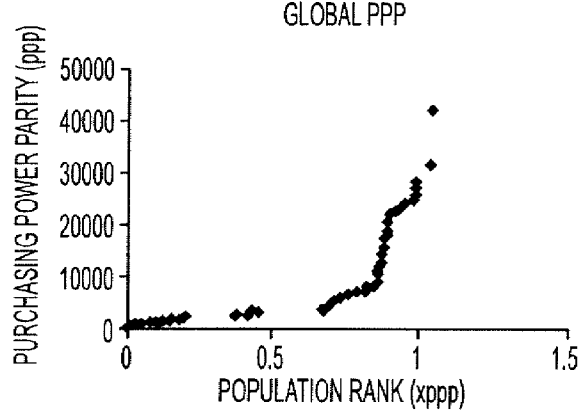
FIG. 16 is a graph showing the global distribution of wealth in 1999, and illustrating the basically convex containing sigmoid oscillations in certain sections.
Figure 17:
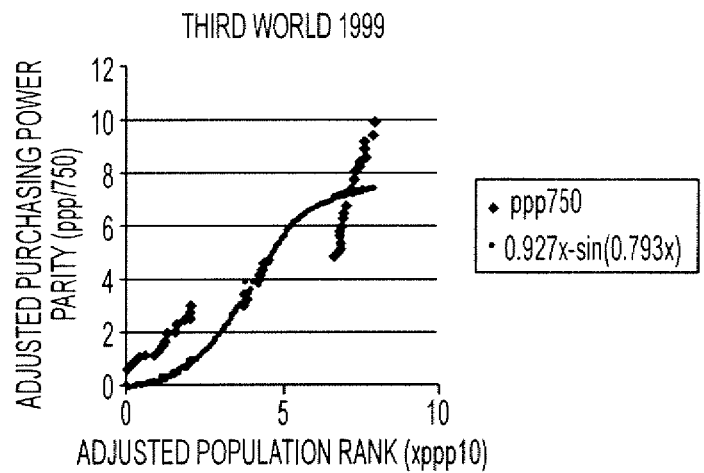
FIG. 17 is a graph of third world wealth distribution and an illustrative fitted curve, Adjusted PPP=0.927*xppp 10−sin (0.793*xppp 10), $R^2$=0.784 and parameters statistically significant at well below the 0.00001 level.

Fitting Curves. As demonstrated below, while sinuous oscillations clearly occur in the illustrative data, warranting a sigmoid model, there appear to be two qualitatively different relationships among the data: there appears to be a section with a very gradual slope between population and wealth, and another section with a steep slope. This warrants the fitting of two separate curves to the data in these respective sections (FIGS. 16 and 17). However, since all nations are integrated in one world economy, the two curves should be joined and continuous. Following standard procedures in numerical estimation, the two equations should be equal at the node (the point where the two functions join), and furthermore their second derivatives should be equal at the node, and in this case zero. The illustrative method for fitting these two separate yet continuous functions is as follows:

1. The initial section appears to contain one complete quasi-period. A period is defined by $b=2\pi/x_{endpoint}$ where $x_{endpoint}$ is the end of the period for the data range. Therefore, b is set equal to this value and the sigmoid equation for the initial data range is estimated.
2. For continuity between the two sections of the data, both the function values and their second derivatives should be equal at the node. The point at which the two equations join is the node, and this is the value ($x_{endpoint}$, y) from the first equation. The joint is formed by adding a y-intercept term, d, to the second equation. Adjusting d allows the joining of the two functions such that their values are equal at this point.

Since the illustrative sigmoid equation has a linear component and a sine component, the linear component drops out in the second derivative and only the sine component is left. Given that $b=2\pi/x_{endpoint}$ in the first equation, the sine component equals zero at $x_{endpoint}$, the node. In order to guarantee this same value for the next equation, b is required to be an integer multiple of the first equation's b. In most cases, this will yield an acceptable value of b for the next data section, and in this particular case, it yields an extremely good estimate of b.

Global Wealth Distribution in 1999. FIG. 16 illustrates the global distribution of wealth in 1999. This distribution is basically convex, but it contains sigmoid oscillations in certain sections. Wealth is concentrated in a minority (about ⅓) of the world's nations. The distribution can be decomposed into two contrasting sections, and within each of these sections a sigmoid relationship can be determined among the nations of that sub-section.

The Third World. The lowest ranking 106 nations (Sierra Leone to Brazil/Croatia) are placed on a decidedly shallow slope that foams the initial and long tail of world wealth distribution. These nations conform to what is generally called the Third World. The top ranking 54 nations (Russia to U.S./Luxembourg) exist on a much steeper section of the wealth distribution curve and conform to what are generally considered industrial and emergent nations. Examining these two sub-groups confirms that, while the world can be divided into haves and have-nots in this way, the picture also has some interesting complexities.

After scaling the data for the 106 third World Nations, a very close fitting, sigmoid curve with one oscillation can be fit to the data. The data and the fitted curve are illustrated in FIG. 17. The best fitting equation is Adjusted PPP=0.927*xppp 10−sin(0.793*xppp 10). The equation's $R^2$ is 0.784 and the model and its parameters are statistically significant at well below the 0.00001 level. The curve begins convex, as predicted for the world's most desperate nations (mostly located in sub-Saharan Africa and southern Asia). The curve becomes concave in the middle, with nations such as India and China (these appear as the two "gaps" between data points).

While the estimated curve follows the general shape of the data, there are a couple of informative discrepancies. First, the curve underestimates the wealth distribution of the lowest nations, although it parallels their convex curvature closely, capturing the essential relationship. Second, the curve both under and over estimates the wealth distribution for the very last section of the curve, which appears to have a steeper slope than the previous nations. Further accuracy in prediction is possible by further sub-dividing the data set. However, for preliminary analysis, and for a general, global view of wealth distribution, only two equations are estimated and joined for this example.

Interestingly, this last, steeply sloped section of the curve contains some of the world's most unsettled nations, whether measured by internal unrest or revolutionary politics. In Central and South America this includes Guatemala, El Salvador, Colombia, Peru, Venezuela and Brazil. In SE Asia this includes the Philippines, Fiji, and Thailand. In the Arab world this includes Jordan, Syria, Lebanon, Kazakhstan, Iran, Tunisia, Algeria, and Turkey. In Africa, this includes Swaziland, Namibia, Gabon, and Botswana. In Eastern Europe, this includes Romania, Bulgaria, Belarus, Latvia, and Macedonia (there were no data for Yugoslavia or Albania although one would predict their location here). With few exceptions, the nations listed above have arguably unsettled and frustrated populations, being on a steeply increasing curve (and convex in relation to wealthier countries) on the border between the poorest Third-world nations and the industrial world.

Figure 18:
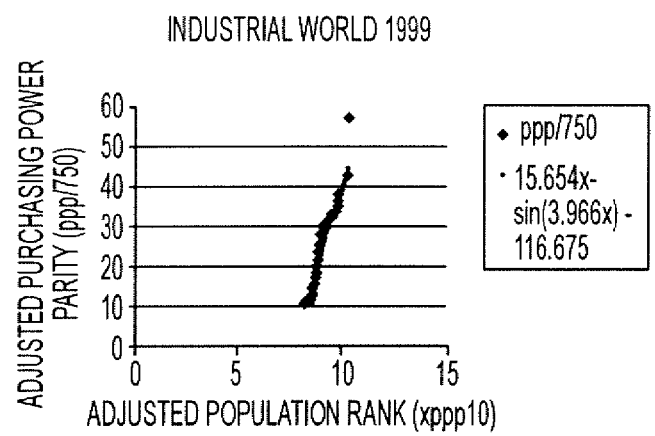
FIG. 18 is a graph of the wealth distribution for the world's wealthiest 54 nations and an illustrative fitted curve, Adjusted PPP=15.654*xppp 10−sin(3.966*xppp 10)−116.675, $R^2$ of 0.923 and parameters statistically significant at well below the 0.00001 level.

The Industrial World. FIG. 18 illustrates the wealth distribution and fitted curve for the world's wealthiest 54 nations. The best fitting curve is: Adjusted PPP=15.654*xppp 10−sin (3.966*xppp 10)−116.675. This curve has an extremely close fit with an $R^2$ of 0.923 and the model and all of its parameters are highly statistically significant well below the 0.00001 level. The curve begins convex, completes a period and ends convex.

By far, the wealthiest nation is Luxembourg. Only five nations comprise the wealthiest nations on the convex curve below Luxembourg. They are the U.S., Norway, Iceland, Switzerland, and Canada. Below these nations, one sees a class emerge on a convex curve that goes from Ireland (the wealthiest of this middle class of nations) down through all of NW Europe and most of the other European countries. This section also includes Arab countries such as Brunei, Kuwait, Saudi Arabia, Oman, Bahrain, Qatar, and developed Pacific countries such as Japan, Singapore, and Hong Kong. Interestingly, these represent Arab and Pacific nations closely allied to Western, Industrialized nations in the current conflict between Western nations and Islamic terrorists. The initially convex curve represents what many would call emergent nations. These include nations such as Russia, Mexico, Argentina, Malaysia, and Libya.

Figure 19:
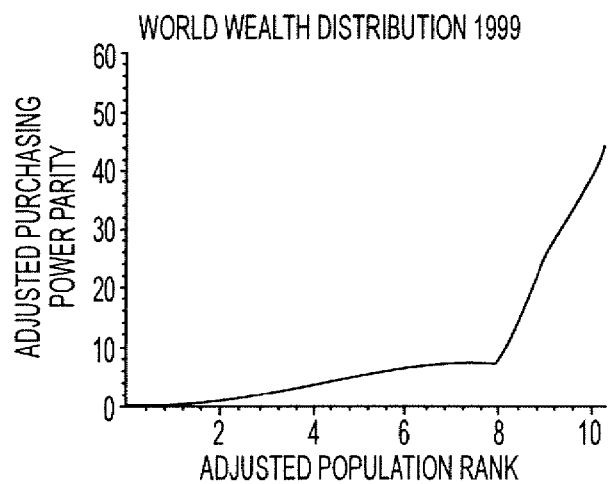
FIG. 19 is a graph of fitted curves predicting world wealth distribution in 1999.
Figure 23:
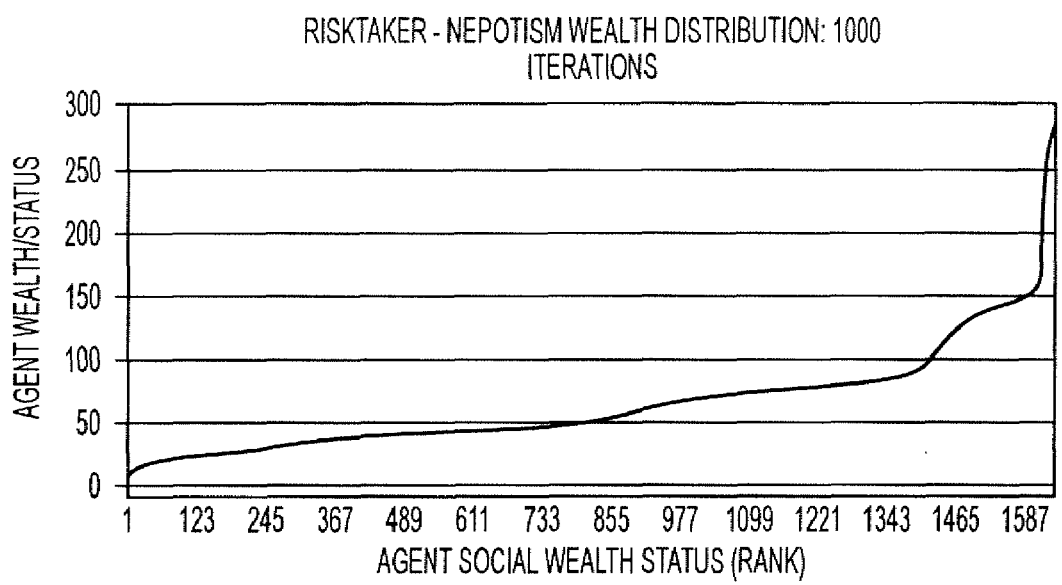
FIG. 23 is a graph illustrating the expo-sigmoid wealth distribution among agents after 1000 iterations of the illustrative ABM system simulating nepotism.

Referring still to FIG. 18, while a sigmoid curve provides a very close fit and agrees with the non-linearity in the data, the large value of a relative to b effectively linearizes the slope of the wealth distribution curve. This nearly linear slope means that, while variations in risk sensitivity and class difference exist, there are no large, qualitative leaps in wealth from nation to nation among the industrialized nations. Such a situation implies the possibility for social mobility by participating in the world economic system. Therefore, little social unrest within these nations or among them can be predicted, as is the situation in nearly all cases. While these nations certainly complete hotly with one another for wealth, they tend to do so in the arenas of diplomacy and economic competition, rather than revolution and military aggression. Overall, the fitted curves predicting world wealth distribution in 1999 are illustrated in FIG. 19.

The Economist provides data on PPP distribution for 1987, just before the end of the Cold War. The overall distribution is much like that in 1999. However, some informative differences exist when one compares industrial nations for the pre- and post-Cold War periods. FIG. 20 illustrates the distribution of wealth among industrialized nations in 1987 and the best fitting curve. The best fitting curve is: Adjusted PPP=4.18*population−sin(2.14*population).

The data comprise the wealthiest 36 nations in 1987. The curve has an $R^2$ of 0.965, statistically significant at well below the 0.00001 level. The linear parameter is likewise statistically significant at well below the 0.00001 level, and the sine parameter is statistically significant at the 0.003 level. Interestingly, before the fall of the Soviet Union, the sigmoid curve begins convex (as predicted) and completes two periods, ending concave. Such a distribution indicates that the supply of wealth is nearing exhaustion. A similar argument based on historical trends in agricultural growth has been advanced by others. The Cold War may have been draining the pace of economic growth by, this point in history.

The curve begins convex, as expected, and with many of the same nations seen in the 1999 data, including Mexico as an emergent nation. However, interesting changes have occurred in the positions of the top ranking nations. In 1987, the U.S. was ranked at the top, followed by Canada, Switzerland, Norway, Luxembourg and then Iceland. The first striking difference in the 1999 data is that the curve now ends convex, and the overall curve is more linear, only having 1.5 oscillations. This indicates that more wealth has been created since the Cold War, that opportunities to share in that wealth among Industrial nations have increased, and that 1999 was a period of genuine wealth expansion. Second, the U.S. and Canada have dropped in rank since the Cold War whereas the Scandinavian countries have increased their wealth ranking. Third, Luxembourg not only makes the most dramatic increase in wealth, but in 1999 it had a PPP ($42769) that was extremely higher than any nation, even the second-ranked U.S. ($31872). This clearly begs the question of how Luxembourg has managed to benefit in the world economy since the fall of the Soviet Union.

In general, the fall of the Soviet Union would have loosened up investment opportunities in the former Soviet-block countries. China has also seen an expansion of foreign investment since the end of the Cold War. So, in part, the increased generation of wealth can be attributed to capitalist expansion into these populations. Profit-oriented enterprise appears to generate more wealth through increased efficiency of production and exchange. However, considering the low rankings of Russia and China in 1999, there appears to be a net flow of new wealth toward Industrial nations. Should this situation continue to the detriment of the people and leaders of these nations, wealth distributions would shift them into more convex positions, making them more likely to take greater chances (as in aggression) to claim their portion of global wealth.

Of course, the increase in wealth in 1999 may also be a reflection of the dot-com and other corporate bubbles, and of increased energetic efficiencies during the 1990's.

Another point of interest, the wealthiest Arab nation in 1987 was Kuwait, and it was the 7th wealthiest nation, per capita, in the world. Perhaps it is not a coincidence that the U.S. took such interest in this ally's fate when it was attacked by Iraq.

An Expo-Sigmoid Model. As discussed above, while basically sigmoid wealth distributions are common, complex societies in which elites control a majority of the wealth exhibit an overall exponential distribution of wealth with sigmoid fluctuations around this trend (FIG. 17). The following extension of the above formulation models such distributions with a single functional form, avoiding singularities where two separate curves join. The resulting illustrative expo-sigmoid wealth distribution equation is $W(x)=e^{d+ax+c\,sin(bx)}$, $a>bc$. W is used for this function to avoid confusion with traditional utility functions, although a systematic relationship between W and the U of utility functions holds. The parameter, a, is the same as in the sigmoid function above. Parameter c is an additional parameter that allows for amplitude in the sigmoid fluctuation around the underlying exponential distribution. The constant, d, is the natural log of the y-intercept of the expo-sigmoid distribution. Applying this model to the world wealth distribution provides a close fit and yields the following equation: $W(x)=e^{(-0.438+0.4x+0.399\,sin(x))}$. All coefficients are significant at the p<0.0001 level, R=0.966.

An Expanded Expo-Sigmoid Methodology. Using standard non-linear regression techniques to fit curves to the expo-sigmoid formulation is difficult since the routines are very sensitive to parameter initializations, and often do not converge. The following method for fitting the expo-sigmoid model to actual data sets effectively sets b=1, providing a simple periodicity of 2π:

1. Take the natural log of wealth data to remove exponential effects.
2. Perform an OLS regression to extract the linear effects from the data, resulting in an equation d+ax, and residuals. Given the sigmoidal fluctuation around the exponential. curve, these residuals exhibit a degree of periodicity.
3. Most data samples are not uniformly spaced over the population. Lomb's periodogram method provides a means of determining the harmonicity influence at each data point in such a non-uniform sample while being able to eliminate independent Gaussian white noise in the data. Apply the periodogram algorithm to this data to determine the trigonometric polynomial that provides a least squares fit to the residual data. The resulting best-fitting equation to the data is of the form: $d+ax+\Sigma_j A_j cos(f_jx)+B_j sin(f_jx)$, where each $f_j$ is a statistically significant frequency influencing the periodicity with amplitude $A_j$ and $B_j$ that results in the sigmoid variation in the residuals.
4. Construct an argument for the expo-sigmoid function by using the best fitting trigonometric polynomial from the periodogram analysis as an argument to the exponential function: $W(x)=e^{d+ax+\Sigma\,cos(x)+sin(x)}$.

Simulating the Effect of Nepotism on Political Risk Taking and Social Unrest. Nepotism has been the primary influence on political behavior throughout human history. Despite the spread of democracy in the 20th century, nepotistic regimes have hardly disappeared. Nepotism heavily influences political activity throughout the developing world, Middle East, and central Asia where family ties are essentially for gaining access to power, state resources, and privileges. Rebelling against such nepotistic regimes is difficult and risky. The above disclosed illustrative ABM system can be used for testing the influences of various social forces on risk taking behavior, including the formulation of rebellious coalitions. The illustrative ABM system is also used to examine the influence of nepotism on the distribution of wealth and social status. Nepotism heavily skews the distribution of wealth and status, leading to the formation of opposing coalitions and exacerbating social unrest.

Political activity is influenced by many factors, including the pursuit of wealth, quest for power, and assertion of political and ethnic identity. Modern Western democracies admit of all these influences, but tend to de-emphasize the role kinship plays, and should play, in politics. However, anthropologists who work in non-Western societies recognize the central role kinship plays, and has historically played, in human political activity. Given their western, democratic bias, Westerners tend to ignore the important role kinship continues to play in the politics of many non-Western states.

Nepotism dynamically shifts the distribution of wealth and social status in a social system, increasing the potential for risk taking and social unrest. The analysis of nepotism not only has relevance to tribal politics and the rise and fall of ancient Kingdoms, but also sheds light on aspects of social unrest in patriarchically dominated modern states such as Saudi Arabia, and Uzbekistan.

Nepotism is the favoring of kin, in comparison to others. In many ways, nepotism is the first principle of human political interaction. It is only in developed democracies where nepotism laws are enacted, prohibiting the preferential assistance of kin. In the simplest human societies, hunter-gatherer bands, sibling alliances stand at the core of band political organization. In tribal Amazonian societies, kinship alliances structure intratribal violence and intertribal warfare. In more complex chiefdoms, powerful lineages not only come to dominate their own groups, but eventually dominate others. In the context of modern conflicts, nepotism is often a contributing cause of grievance and conflict. Anthropologists have described the connection between nepotism, xenophobic rhetoric, and modern political mobilization. Nepotism, alliance building and conflict extend to the analysis of street gangs and lynchings. Nepotism has figured heavily in popular violence and policing in Northern Ireland. Nomadic pastoralists typically distribute aid along kin lines, as among the Bedouin Arabs. Nepotistic favoritism among powerful Arab merchants and political leaders contributed to the current conflict and humanitarian crisis in Darfur, Sudan. Finally, modern states such as Saudi Arabia (ruled by the house of Saud) and Uzbekistan are wholly dominated by family ties. Nepotism is a pervasive tendency in human behavior, and any attempt at understanding human interaction must take it into account.

The wealth variable in the illustrative ABM system can be considered any culturally appropriate form of wealth or power over which individuals would compete in a particular society. Anthropologists have clearly demonstrated that wealth equality has never existed, even in the smallest and simplest hunter-gatherer societies. Status-conferring wealth in the simplest societies, such as hunter-gatherer bands, is typically distributed in a simple sigmoid fashion, which is best modeled as a linear increase with sigmoid fluctuation around this line, and a simple sigmoid wealth distribution can be used to initialize the illustrative ABM system for nepotism as illustrated in FIG. 22. Agents in convex (concave upward) sections have more to gain than to lose when taking chances, and are therefore risk prone. The symmetry of the distribution indicates that there is parity between risk prone and averse agents. Using standard measures of risk sensitivity, such as the AP measure, a society-wide risk sensitivity that is zero, or risk neutral is achieved.

However, in complex societies, wealth distributions are basically exponential, with sigmoid oscillations around the exponential curve, as illustrated in FIG. 3C. Interestingly, the sigmoid fluctuations dominate the risk sensitivity of agents, producing alternating risk prone and averse agents despite the overall concave convexity of the curve. However, the overall convexity of the curve increases the risk proneness of the population, yielding an overall negative measure of risk sensitivity. The key question is what dynamic creates the expo-sigmoid distribution of wealth, and how is it likely to affect the risk sensitivity of agents, and their coalition forming behavior. Agent coalition formation and its payoffs is modeled with the coordination game, which is described at length herein above for other analyses.

If nepotism is instantiated, then agents must have kin. For the illustrative ABM system, agents are allowed to reproduce at a rate of 2% per annum. Nepotism occurs in two ways. Children benefit from parents by having a higher probability of being born, and by inheriting a proportion of their wealth. Fertility is a function of wealth and status. Fertility is increased with wealth, and offspring inherit 50% of a parent's wealth during any iteration. Fertility is increased by increasing an agent's probability, of reproducing (Pr. Reproduce) =wealth(i)/MAX, where MAX=highest status agent's wealth. Also, an agent's payoff is a product of fitness, such that: Payoff=payoff*0.25(kin), where kin=inclusive reproductive fitness. In this manner, both the benefits of being born into a large, wealthy lineage, and the recursive benefits to lineage members of the addition of another agent to their kindred are captured.

The effects of nepotism transform a simple sigmoid wealth distribution into the classic expo-sigmoid distribution seen in complex societies. The resulting distribution has distinct concave and convex sections FIG. 23. These sections are created in two ways. First, the abundant descendants of high-status individuals tend to accumulate as a second-tier "noble class," reproducing the demographic seen in Kingdoms, and ancient states. Second, relatively impoverished agents tend to remain poor, as well as their offspring, leading to the long "tail" in the distribution of wealth.

The few convex sections of the curve are those areas where one would expect a high level of displeasure with the status quo, and consequently the source of social unrest. Furthermore, the overall convexity of the curve yields an overall risk prone, negative risk sensitivity value. The most risk sensitive agents are those between 0 and 250, and those around 1200. A distribution such as this produces alternating and strongly risk averse and risk prone agents. Research confirms that agents in convex sections tend to aggregate in coalitions, and these coalitions are potentially volatile due to the risk proneness of their agents. Empirical research confirms that agents in such real world coalitions are responsible for social unrest and collective violence, including political coups, and more popular rebellions.

Recent events in Uzbekistan provide an illustration of just how these dynamics can lead to political upheaval. Nepotism and abuse in the regime of Islam Karimov sparked an armed demonstration. For now, the Uzbek government has been able to stay in power; however the conditions that led to this social unrest will strengthen due to the recursive effects of nepotism in skewing wealth distributions.

Figure 25:
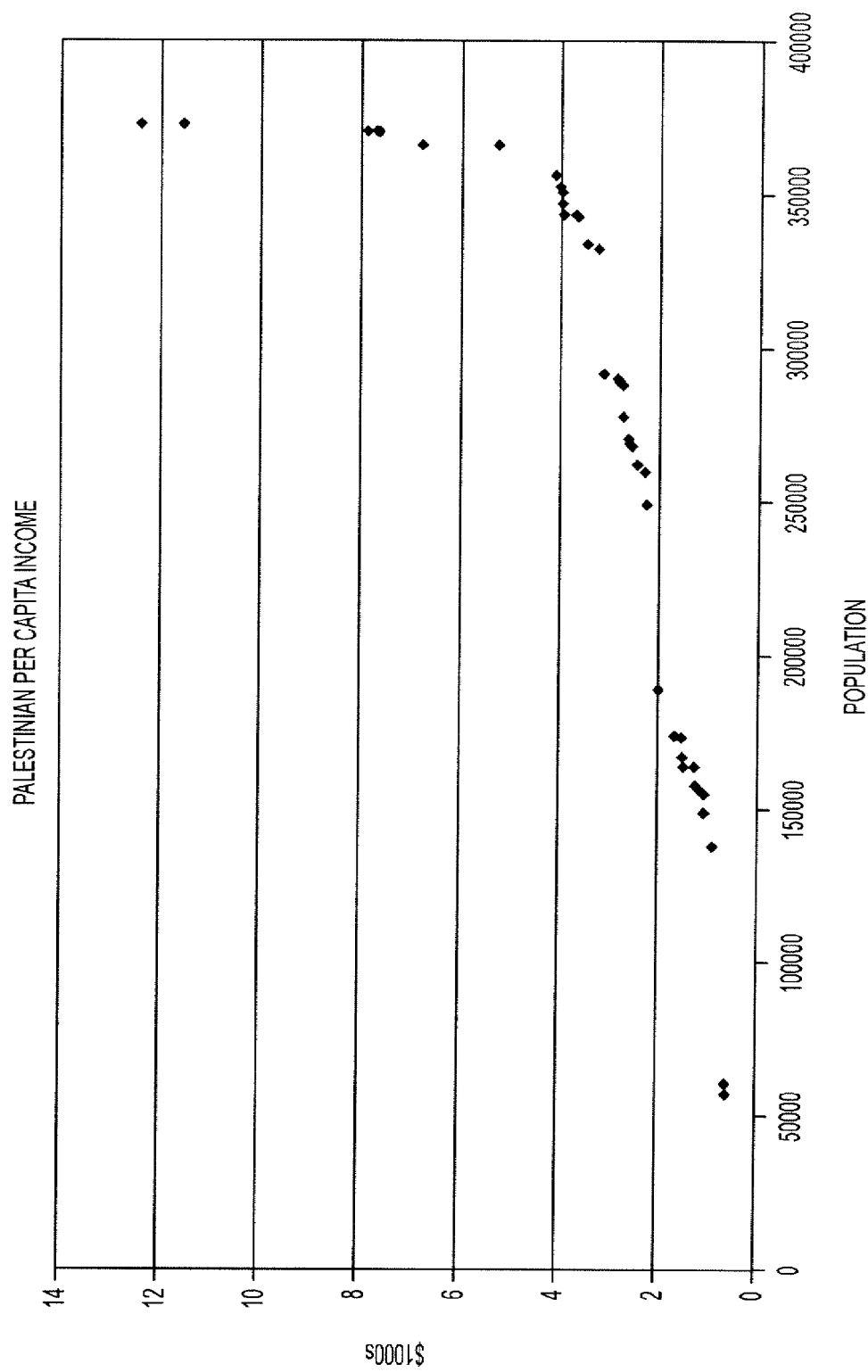
FIG. 25 is a scaled and sorted graph of the data drawn from FIGS. 24A and 24B.
Figure 26:
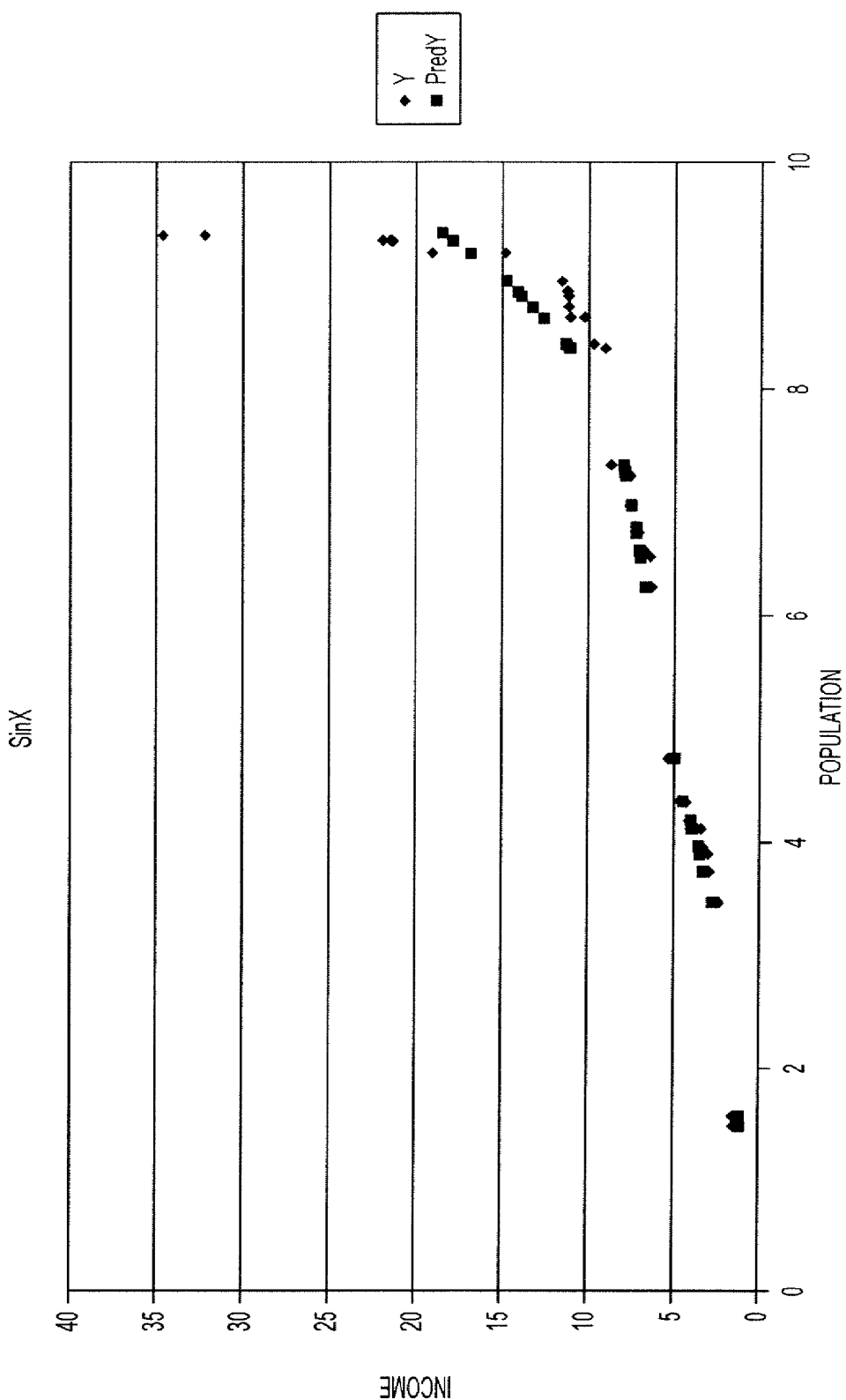
FIGS. 26-32 are graphs illustrating aspects of deriving an expo-sigmoid function for the scaled and sorted input data of FIG. 25.
Figure 27:
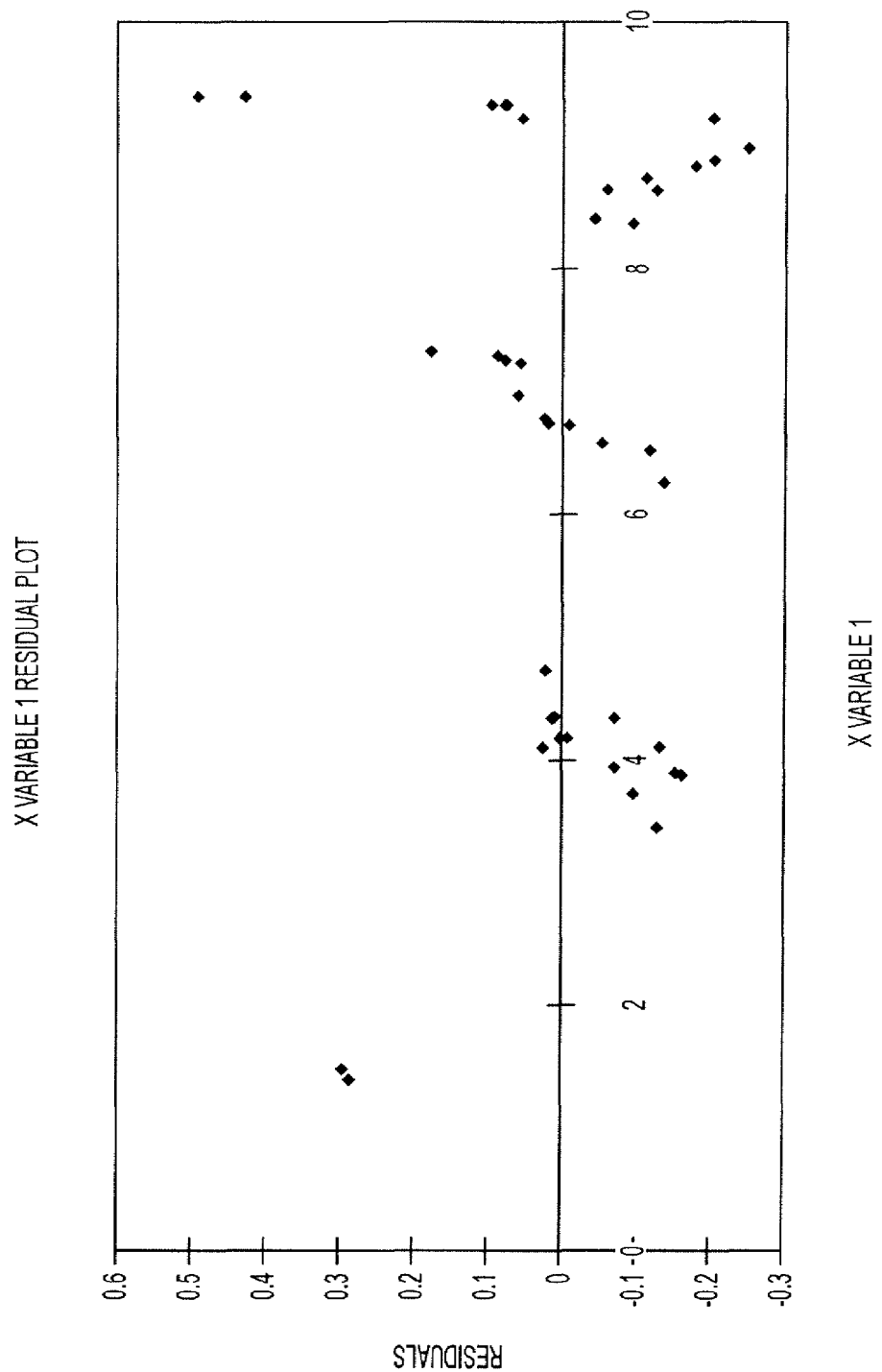
Figure 28:
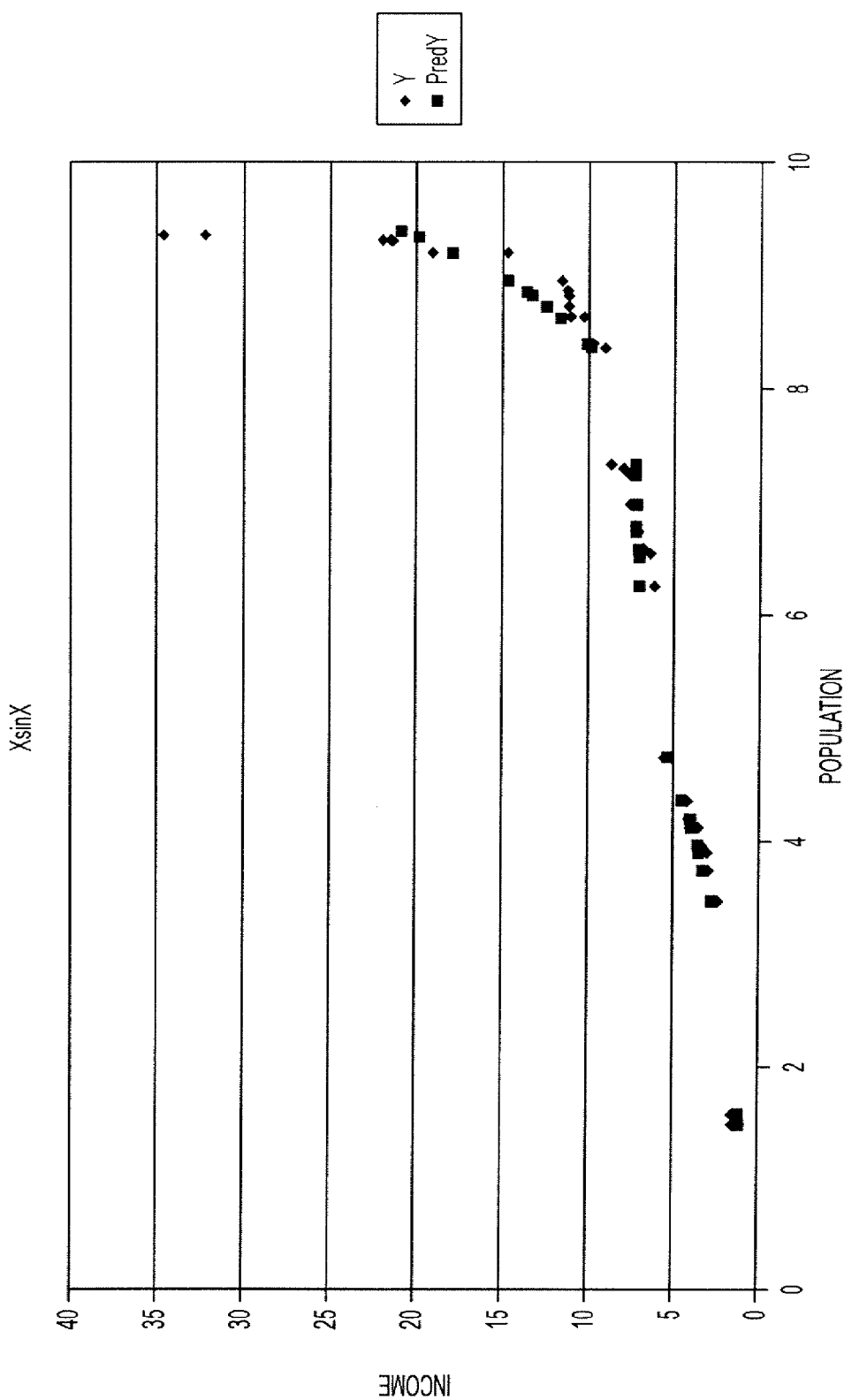
Figure 29:
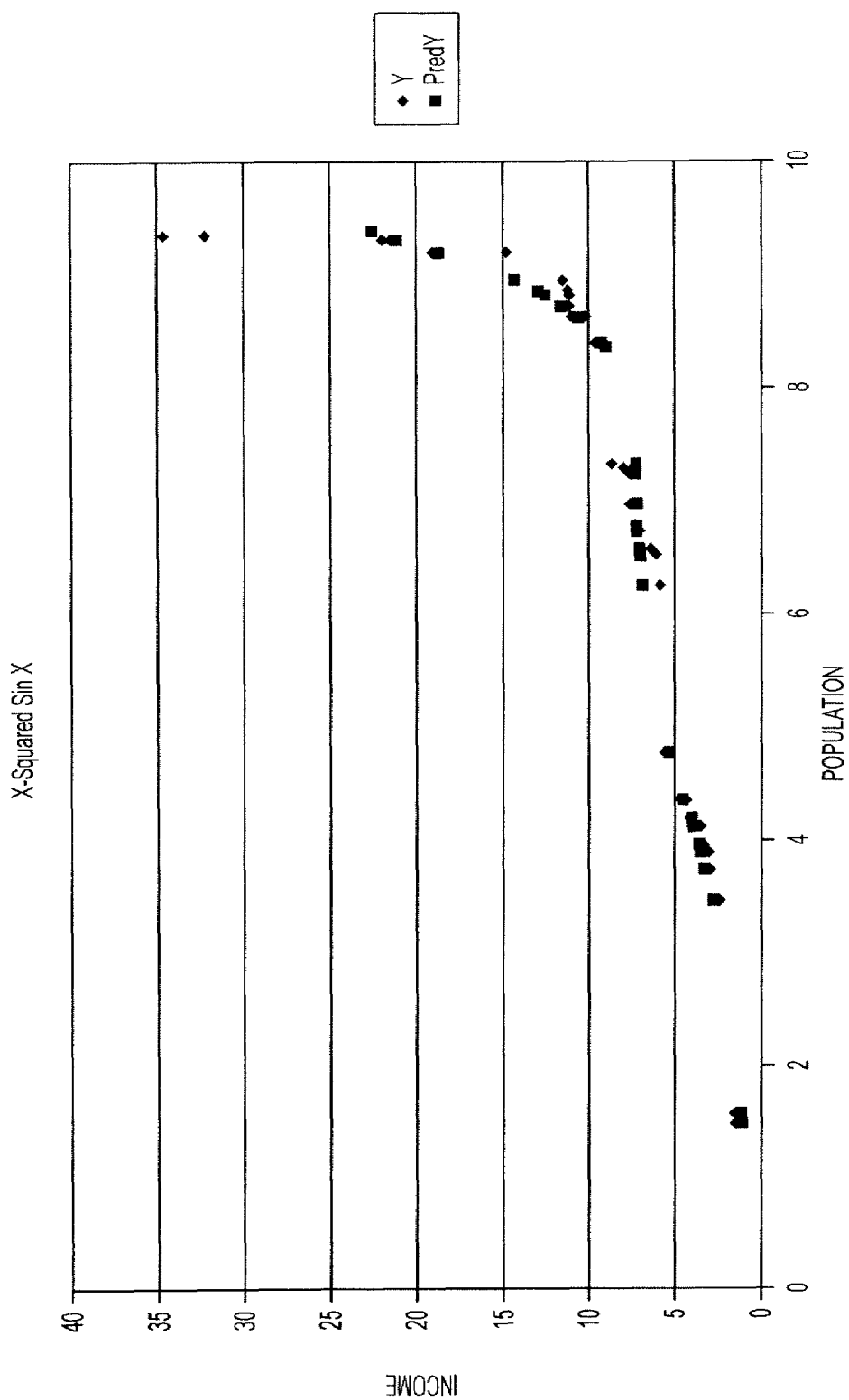
Figure 30:
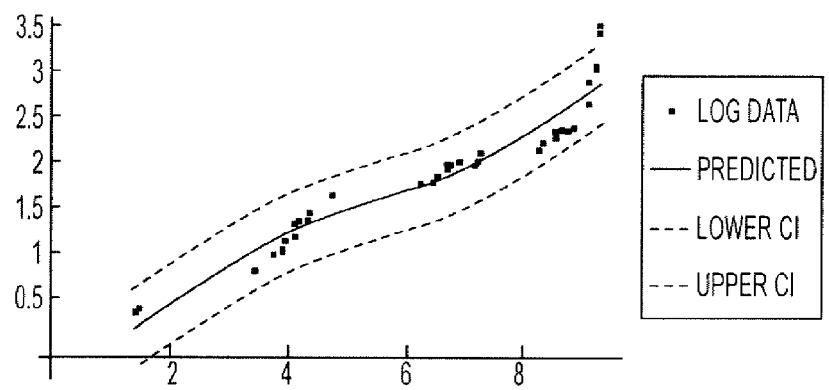
Figure 31:
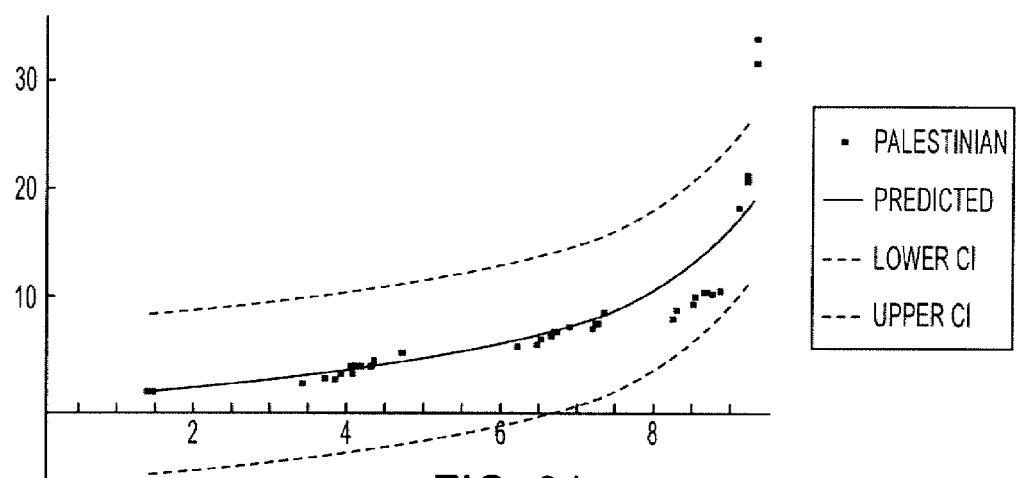
Figure 32:
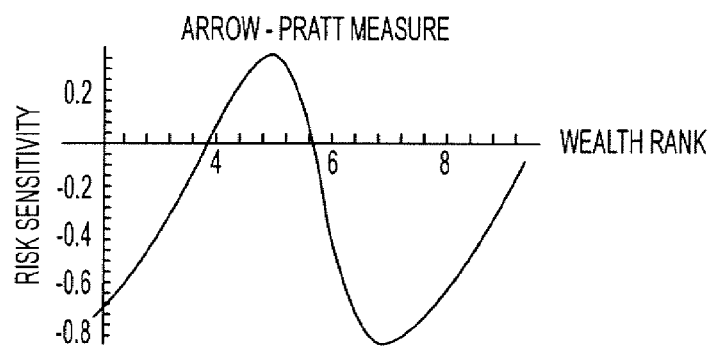

Illustrative input data sets and ABM simulation system output. FIGS. 24-32 represent illustrative input and output data for the illustrative ABM system to simulate agent interaction in Palestinian society. Specifically, FIGS. 24A and 24B are a data table of Palestinian wealth, and FIG. 25 is a scaled and sorted graph of the data drawn from the table and used as input data for the initial distribution of resources for the simulation. FIGS. 26-32 illustrate aspects of deriving an expo-sigmoid function for the scaled and sorted input data.

Figure 33:
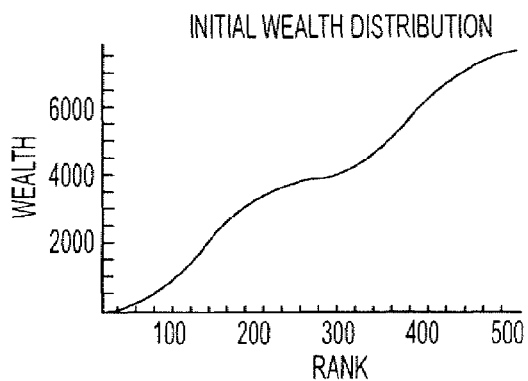
FIGS. 33-37 and 38A-38F are graphs collectively showing an illustrative input data set and simulation data output for the illustrative ABM system.
Figure 36:
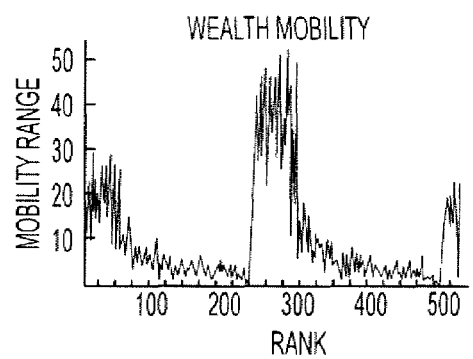
Figure 34:
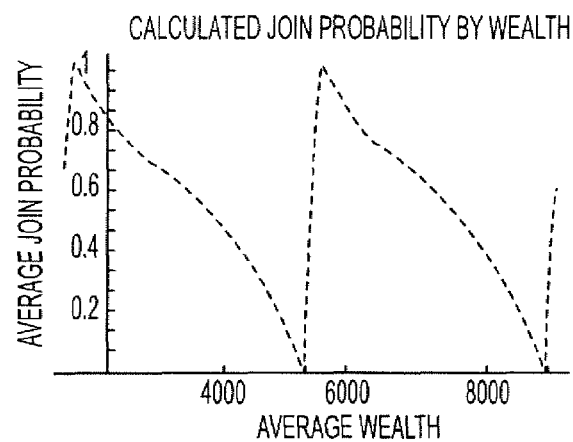
Figure 35:
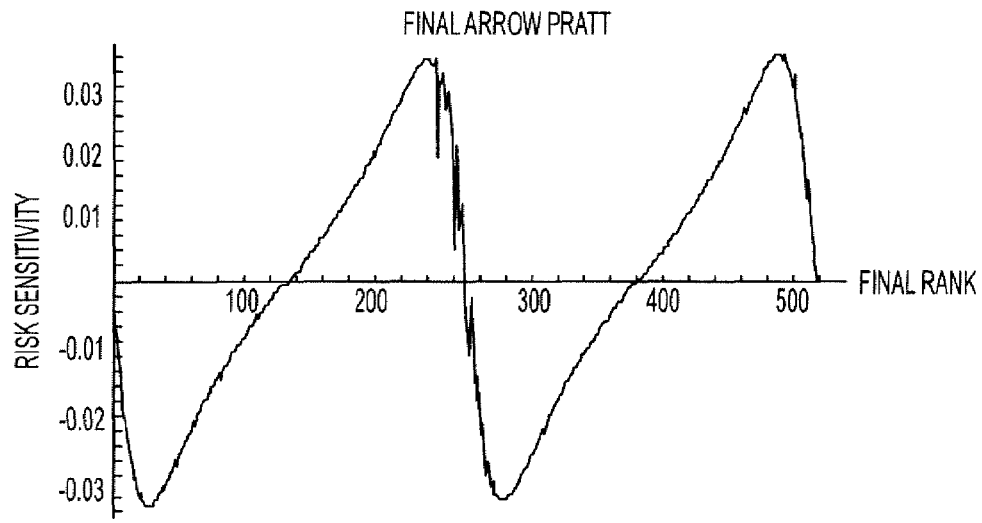
Figure 37:
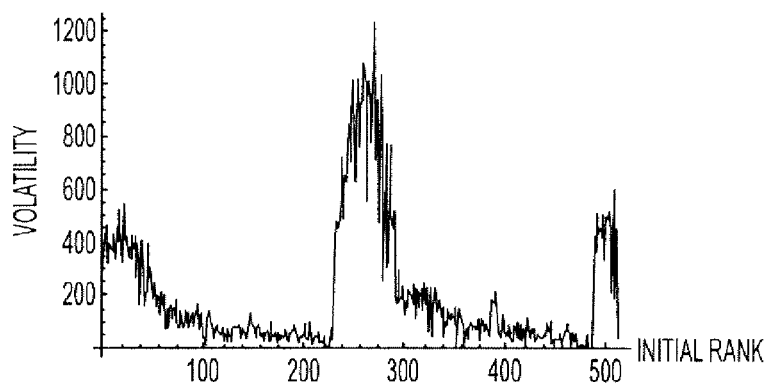

FIGS. 33-37 and 38A-38F illustrate an input data set and simulation data output for the illustrative ABM system. Specifically, FIG. 33 illustrates an initial wealth distribution according to a derived sigmoid distribution W(x)=15x−400 sin(x). FIG. 34 illustrates the calculated join probability by wealth. FIG. 35 illustrates the AP measure of risk sensitivity by wealth rank. FIG. 36 illustrates the wealth mobility (the difference between an agent's lowest rank and highest rank in a simulation) of agents according to wealth rank. FIG. 37 illustrates the volatility, or the sum of the absolute value of wealth gains and losses for a simulation.

Figure 38A:
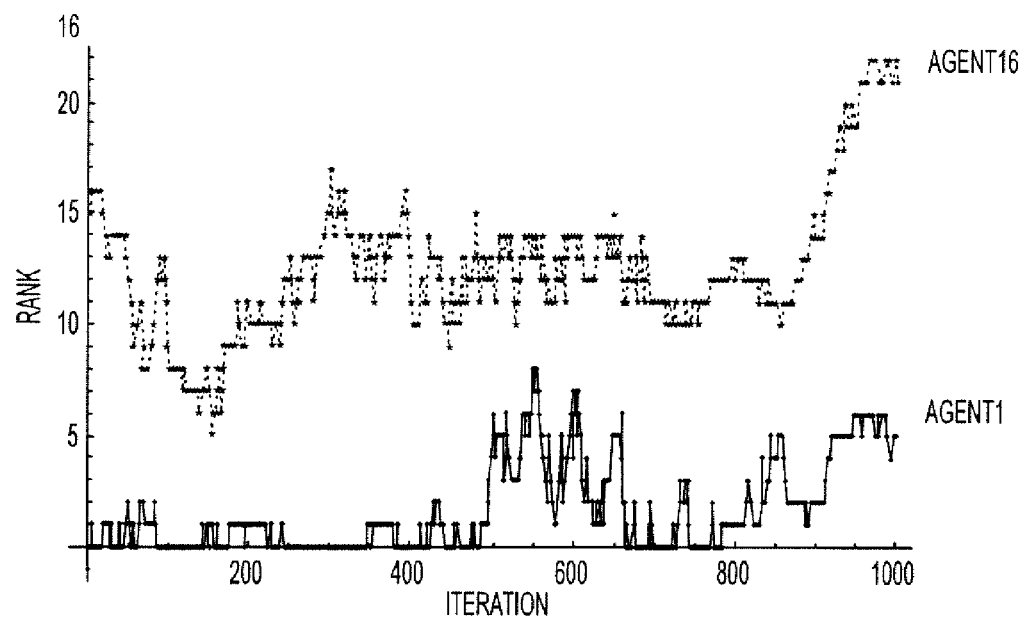
Figure 38B:
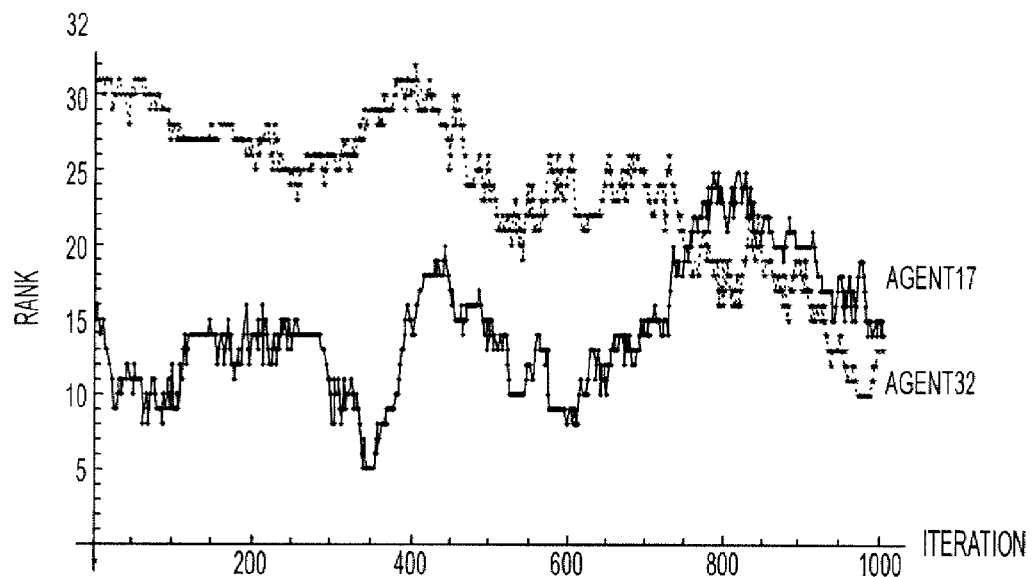
Figure 38C:
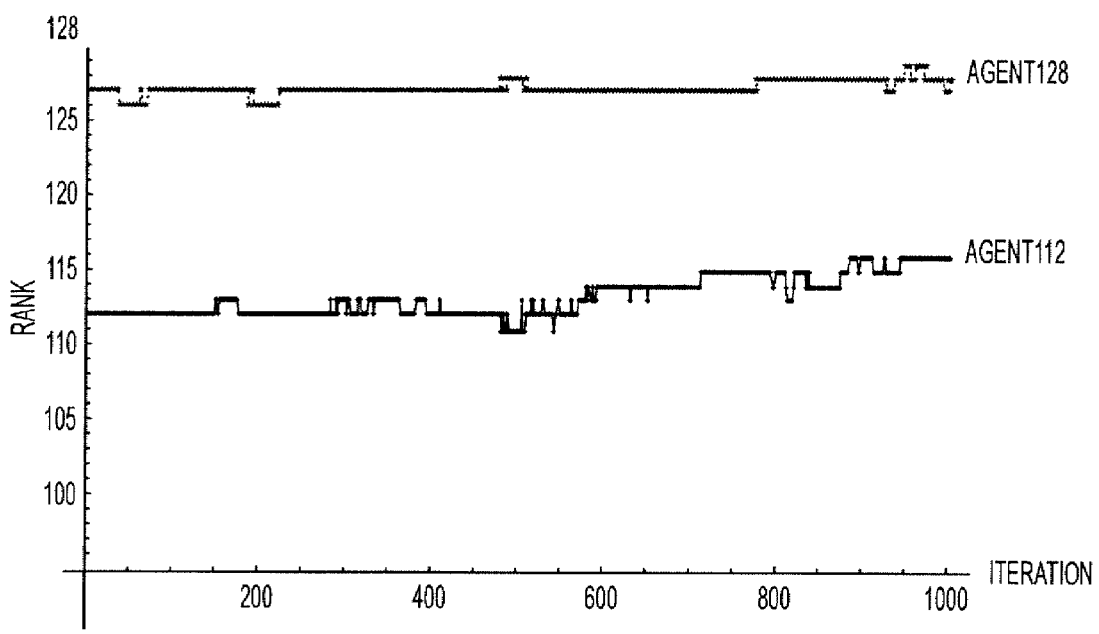
Figure 38D:
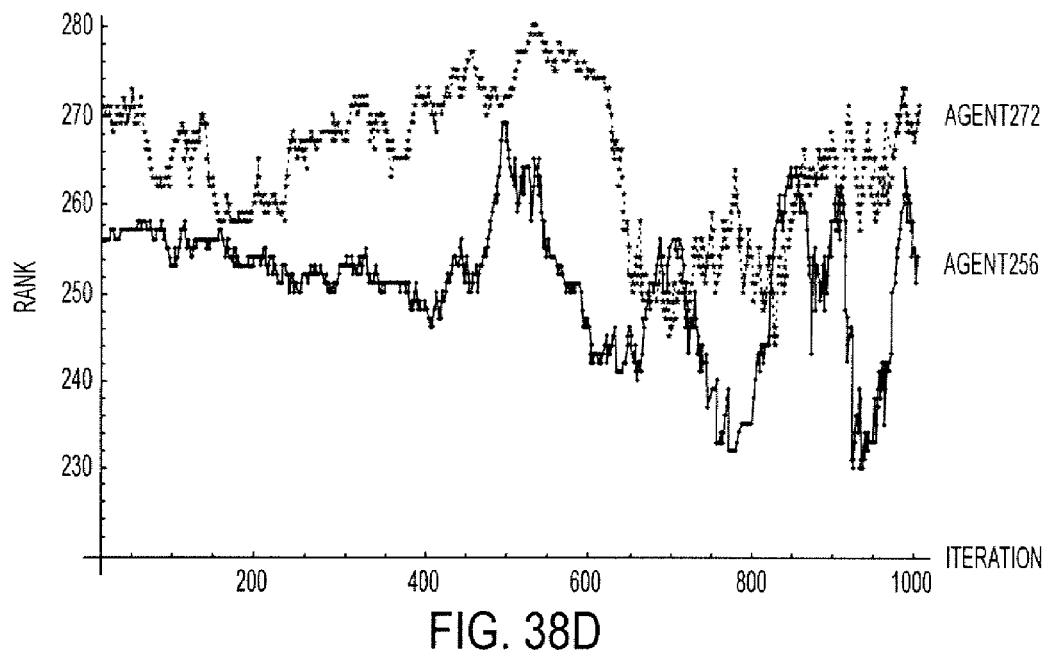
Figure 38E:
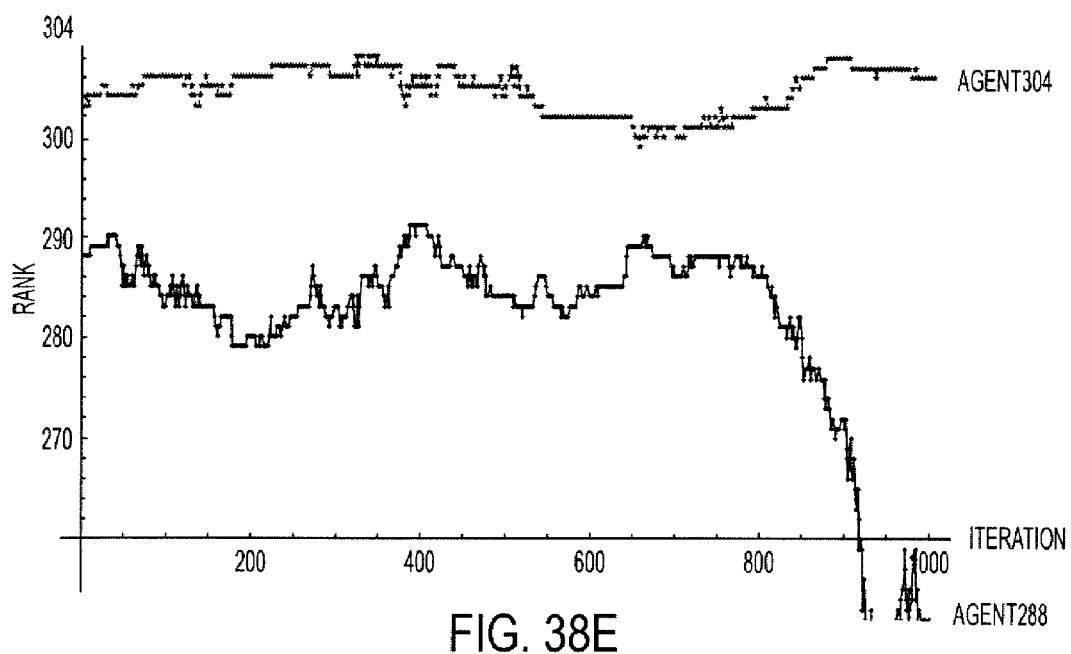
Figure 38F:
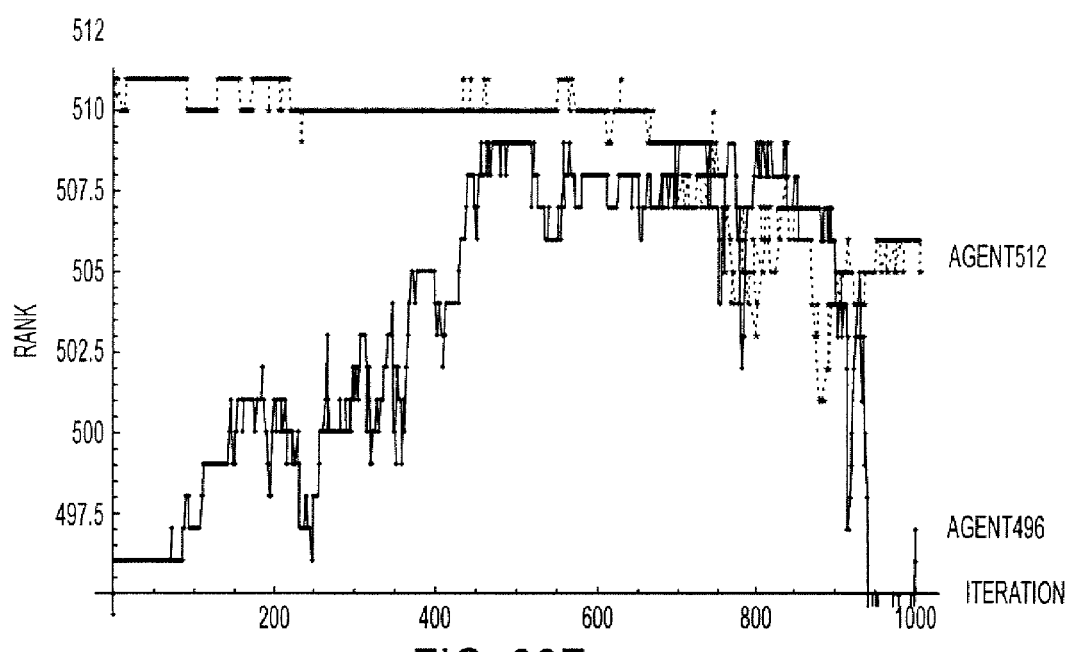

FIGS. 38A-38F illustrate the rank history for specific iterations of game play for various agents. FIG. 38A illustrates agents beginning at ranks 1 and 16. FIG. 38B illustrates agents beginning at ranks 17 and 22. FIG. 38C illustrates agents beginning at ranks 112 and 128. FIG. 38D illustrates agents beginning at ranks 256 and 272. FIG. 38E illustrates agents beginning at ranks 288 and 304. FIG. 38F illustrates agents beginning at ranks 496 and 512. These ranks were chosen to illustrate representative differences in agent behavior across the simulated population.

The illustrative ABM system as a Theoretical Research System. Rational choice theorists stress that norms and group membership exist because they serve the material needs of the individuals within groups. For instance, the formation of territorial groups occur when resources are predictable and dense, and therefore profitable for individuals to cooperate defending them. In contrast to the common Prisoner's dilemma game, coordination games in which solutions include both mutual cooperation and mutual defection are proposed as better models of many human interactions. They demonstrate that optimality analysis provides the range of solutions decision makers can choose, although other considerations may be necessary to explain which Nash equilibrium solution people actually choose.

In contrast, bounded rationality theorists argue that optimization requires an unreasonable amount of information and cognitive ability, and instead people use fast and frugal heuristics to make decisions. Furthermore, they maintain that there is no global decision rule (like optimization), and that people use varied simple heuristics attuned to specific environments. Altruistic heuristics could be selected for if cooperation is necessary to produce a public good, allowing members of groups of cooperative individuals to benefit and reproduce more than members of groups of selfish (and therefore less productive) members. They argue that altruistic heuristics could explain the evolution of ethnic cooperation, and account for ethnocentrism and xenophobia, and that the evolution of arbitrary ethnic markers can enhance coordination among group members. Economists and anthropologists have used the concept of cultural group selection to explain patterns of cooperation in experimental bargaining games, deference to authority, and the adoption of innovations.

Simultaneous testing of these decision rules is especially important because of the dynamic nature of competition. A Nash equilibrium solution (and a game may have more than one) is optimizing. However, Nash equilibrium is based on the assumption that your opponent is as rational and intelligent as you are. If an opponent is non-rational (considered a mutant strategy), then that assumption is no longer valid. An evolutionarily stable strategy (ESS) is one that cannot be beaten by such mutant invaders. All ESS's are Nash equilibria, but not all Nash equilibria are ESS's. Fast and frugal heuristics are non-rational strategies, and so a true test of these competing claims requires a mechanism such as the illustrative ABM system for testing the long-run adaptability of different decision rules against each other. The backdrop of these theoretical debates provide four basic hypotheses, various aspects of which can be tested with the illustrative ABM simulation system.

Hypothesis 1: Rational Choice: Agents using Nash equilibrium to solve coordination problems will form coalitions that are well adapted (provide competitive material benefits to their members) under a variety of environmental conditions.

The use of Nash equilibrium in non-zero-sum payoff games is a good example of rational choice optimization for coordinated games. In order to achieve Nash equilibrium a player must be able to understand everything needed to know to make an optimal decision, and also appreciate everything the opponent understands as well. Given the interactive nature of sociability and coordination games, Nash equilibrium is selected as the decision rule to model rational choice.

Hypothesis 2: Boundedly Rational Conformist Transmission: Agents using conformist transmission rules will form effective coalitions based on a norm of imitating the most common behavior of their neighbors. These coalitions will be adaptive in stable environments.

One of the boundedly rational tools relevant to the formation of ethnic norms is conformist bias, or conformist transmission. Conformist transmission involves basing ones actions and beliefs on what is most common in a population. Conformist transmission is argued to be adaptive, provided that environments are stable and do not change too rapidly. It is also argued that conformist transmission is involved in the adoption of innovations and attitudes toward risk, and it plays a role in the evolution of ethnic markers.

Hypothesis 3: Boundedly Rational Prestige Bias. Agents using prestige bias will form coalitions based on the norm of doing what their wealthiest neighbor does. These coalitions will be very dynamic, and changing norms within a group are expected as individual fortunes wax and wane. Therefore, prestige bias may be particularly effective in randomly fluctuating environments.

Prestige bias is another bounded rationality proposition related to the formation of coalitions and norms, and refers to the imitation of high status individuals. Researchers have proposed that prestige bias can explain a wide range of behaviors such as fads, innovation adoption, deference to high status, and the evolution of ethnic markers.

Given the competing claims of existence and efficacy of these various decision rules, the illustrative ABM simulation system may be used for testing the following hypothesis in order to see which rules are likely to have survived and become part of the human behavioral repertoire.

Hypothesis 4: If information constraints exist, then boundedly rational decision heuristics would be expected to outperform optimization rules, with conformist bias dominating in a stable environment, and prestige bias dominating in a fluctuating environment. However, it has been noted that in dynamic models involving competing strategies, the strategies that eventually win out tend to be Nash equilibria. The illustrative ABM simulation system under information constraints provides a test of the robustness of Nash equilibrium solutions.

Further Hypotheses Considered: Space prohibits full exploration of all combinations of proposals in the literature. For instance, the important role language plays in pre-game communication, allowing players to achieve optimal solutions. Also, coordination games come in a variety of types such as Battle of the Sexes, Chicken, and Assurance, and a full analysis should consider the effects of altering payoffs to model these varied scenarios. Furthermore, modeling the effects of learning in any realistic repeated game scenario. The illustrative ABM simulation system allows modeling of all these variants, beyond the several basic hypotheses outlined herein.

A recent example of modeling ethnic interaction with coordination games illustrates the promise and limitation of current attempts. One tool models the extent to which norms (shared behaviors) become marked (indicated by some symbol) based on agents playing coordination games with two Nash equilibria. Difference equations are used to measure the changing frequencies of norms and markers in order to model the development of ethnic groups, defined as those whose members share both norms and markers. The model assumes that agents use prestige bias or conformism to decide upon which strategy to employ, and parameters measuring their effects are introduced into the model. The modeling begins by pre-defining groups, and then monitoring how changes in parameters would influence the formation of groups with norms, groups with shared markers, and groups with both.

The mathematics of the difference equations is intractable so a computer simulation is used to monitor the effects of changes in their parameters.

The model yields the following results: differences in shared behaviors usually become marked, increasing number of populations increases likelihood of markers, and group differences are greatest at boundaries. These findings are suggestive, but both the framing of the model and the method of analysis have drawbacks that preclude genuine testing of current theories and limit the realism of the model.

First, some of the model's expectations are anticipated by the construction of their model. For instance, the model assumes that individuals tend to interact with others who have the same variant of marker trait, and offers the parameter, e, to measure this effect. It seems that assuming the existence of such a propensity and introducing it into the model guarantees the basic expectation that norms will form. Also, groups are predefined, which sets the stage for inter-group dynamics, and drives the modeling results in the expected direction. Finally, the model incorporates only the rules thought to exist, and not alternative boundedly rational rules or optimization rules, precluding a true test of which rules are most adaptive. The prefiguring of results, along with the lack of alternative decision rules in the model, weakens the ability of the model to provide a genuine test of competing claims regarding how and why ethnic groups evolve.

Another limitation is that the model characterizes whole populations by propensities that are assumed equal for all individuals within a population. For instance, the propensity to interact with others of same marker, migration rates, and rates of random borrowing of norms and markers, are all assumed equal across populations for any simulation. While doing so gives a general sense of how average individuals are likely to interact, in reality populations are made up of individuals, not averages. Analyzing behavior through aggregate means may elide localized phenomena and short-term variances as well as chaotic-like performances or bifurcations in system response.

Modeling individual differences requires discontinuous models, which are extremely difficult to analyze mathematically, thus the immediately aboved discussed research model has limitations. Overcoming these limitations is daunting, since a more appropriate methodology would involve simulation of discrete interactions among individuals in a realistically large population with the use of powerful parallel processing computers with tremendous storage space (measured in tetrabytes).

The illustrative ABM simulation system provides a more realistic simulation that will allow the modeling of discrete interactions among a large population of individuals under a variety of environmental and social conditions, and the testing of competing theories of human decision making and ethnic group formation. One illustrative ABM simulation system provides a small-scale simulation on a desktop computer, and provides evidence for coalition generation with the illustrative simulation algorithm (see below), providing proof of concept and demonstration of the potential for the larger simulation on a high-end computing cluster. Such a cluster, each with large amounts of random access memory and secondary storage fully networked via fiber-optic, provides computing power to test several competing theories of decision making by demonstrating how well they can account for coalition and norm formation. In addition, differences in how environmental structure and information constraints impact the performance of each kind of decision rule can be examined. Running the illustrative simulation algorithm on such a cluster also supports large-scale simulations in which these rules are pitted against one another in order to see which is most competitive or survivable through time, and therefore more likely to account for the evolution of ethnicity in human groups.

The illustrative simulation system, also described in part above and below, includes a large number of agents, akin to cellular automata, distributed in an environment and having access to a resource necessary for survival. Each agent has to play a coordination game with its neighbors via a decision rule (Nash equilibrium, conformism, or prestige-bias rule, depending on the simulation) results in either cooperation and therefore coalition formation, or non-cooperation and therefore coalition defection. Such decisions should lead to the formation of coalitions if agents are able to garner more resources through cooperation than defection. All cells, constituted as a large grid on a two-dimensional surface, are mapped onto the surface of a sphere to avoid the influence of boundary conditions. Finally, the cells adjacent to an individual agent/cell constitute the neighborhood for that agent/cell. Resources are relevant to the game play, and constitute a hazard for players since agents may be eliminated from the simulation when their individual resources are depleted.

Simulation System Methodology. The following symmetric, nonzero-sum game is a modification of the Assurance Game central to models of strategy coordination and group formation. In this model, R is the reward for cooperation, P is the punishment for not cooperating, T is the temptation to defect, and S is the sucker's payoff if one's partner defects while one cooperates. In the Assurance Game, $R>P>T>S$. These games are referred to as Stag hunt games based on an analogy proposed by Jean Jacques Rousseau. In a stag hunt, hunters must coordinate to kill a stag and reap a large payoff, but hunters can hunt hares alone for a smaller payoff. Considering the analogy further, if one agreed to hunt stags but one's partner defected and hunted hares alone, the sucker would receive nothing, but the defector should still receive the same payoff as if both went their separate ways hunting hares. In other words, P=T. Therefore, in the illustrative simulation algorithm, the payoffs are $R>P=T>S$ (FIG. 5) to model typical human coordinated interaction situations.

The optimal, mixed strategy for both Row and Column players is (3/5 Join, 2/5 Defect). A Join coalition is counted as all those agents that played Join during the current game, regardless of their payoff. The optimal mixed-strategy (Nash equilibrium) produces a greater amount of resource for two players who play Join-Join. This biased payoff should give a long-term advantage to coalition formation, when players are playing the optimal mixed strategy.

Following a coordination game framework, the Defecting players receive a reward, albeit less than Joining players, and there is a greater indirect penalty for the Joining player who plays a Defector. The Joiner will gain nothing in the play with a defector. A resource depletion through a metabolic tax payment during each round of game play and successive zero payoffs could cause some players to "die" from resource depletion. Agent-players must have non-zero resources to play. An important point to note is that previous analyses of ethnicity assume the existence of groups. In the illustrative simulation algorithm, groups that share behaviors and develop norms evolve on their own, providing a further test of the efficacy of current theories; if a decision rule never allows formation of ethnic groups, then it probably is not valid.

The illustrative ABM algorithm 100 shown in FIGS. 7A-7D implements the above discussed algorithm and can be used for evaluating theoretical models by using variations from the basic decision rule and analyzing results, for example as described below.

Variation in Resources Experiment. Resources are distributed unevenly, creating pockets of wealth and poverty. Resources are randomly fluctuated through time, creating unstable environments.

Conformist Strategy Experiment. A conformist agent strategy is selected. Initialize agents by flipping a fair coin to choose first strategy. Thereafter, agents chooses most-used strategy among neighbors during last iteration. If there is a tie, break arbitrarily by a fair coin flip.

Prestige Bias Experiment. The agents are initialized by flipping a fair coin to choose first strategy. Thereafter, agents choose dominant strategy of neighbor with most resources at end of last iteration. If there is a tie, break arbitrarily by a fair coin flip.

Sensitivity Analysis. Modify the payoff matrix in the coordination game with small increases/decreases in Join reward and defect rewards separately. Rerun the above variations and compare new results for simulation dependency or over-sensitivity to payoff entries in game matrix. Note: In the basic and first variation of the simulation, re-calculate Nash equilibrium mixed strategy. Use these results to plot results from changes in matrix entries, and use regression curve fitting techniques to analyze any trends in system response.

Information Constraint Experiment. Perturbed Matrix for Information Constraint Experiment. Information constraints are modeled by randomly altering the payoff matrices agents use to formulate decisions, but paying out the standard payoffs. This models an agent's imperfect information about the payoff-generating environment. For example, alter an agent's payoff matrix by replacing the cooperation payoff, R=5, with a random variable, a≧3, which alters the probability of cooperating from 3/a to near zero, therefore altering an agent's choice. Agent flips biased coin according to these new probabilities, but is rewarded according to the actual environment of payoffs in the original coordination game.

Method of Analysis. Fourier analysis of the time series generated by the number of cells in a coalition is used. Fractal behavior of coalitions may be detected in this iterated function system, such as the cellular-automata-like structure, through a plot of the Fourier analysis power spectrum.

Model Expectations. The basic model expectations for hypotheses 1-3 are as follows: Hypothesis 1. Rational Choice. The coordination strategy should dominate through time and lead to the formation of coalitions. Given the theoretical long-term stability of Nash equilibria, coalitions should form under a wide variety of environmental conditions (unevenness of resources, instability of resources), and potential payoffs. Following studies of cellular automata, dynamic behavior in coalition size in both frequency and amplitude is expected. However, because agents are randomizing between Nash equilibria, a somewhat cyclical response that will be evident in Fourier analysis is expected. Since a coalition's boundaries influences its next size, fractal analysis is used to monitor time-dependent, distributions of increments in coalition size to gain further insight into fractal patterns in coalition size fluctuations and the frequencies at which they may fluctuate.

Hypothesis 2. Boundedly Rational Conformist Transmission. Conformist transmission is expected to be most adaptive in stable environments, and to lead to a breakdown in coalition formation in unstable environments. There is no reason to expect conformism to break down in a geographically uneven environment because agents are imitating most common adaptive behaviors in response to local resource levels. Conformist transmission should have an averaging effect on coalition size fluctuations because agents are imitating the majority of their neighbors. Therefore, lower amplitudes are expected in the Fourier analysis of coalition size, and fractional Brownian motion measures smaller in relation to other decision rules.

Hypothesis 3. Boundedly Rational Prestige Bias. Coalitions are expected to form based on prestige bias. Given fluctuations in individual's wealth the opposite of conformist transmission's averaging effect is expected. The behavior of coalitions in this system are expected to exhibit greater amplitude as measured through Fourier analysis, and a higher fractal response than other rules.

Referring to FIG. 21, basic model expectations are illustrated by cell entries that refer to strengths of effects relative to different decision rules.

Hypothesis 4. Information Constraints. Testing the Adaptiveness of Alternative Decision Rules and Rational Choice vs. Bounded Rationality Programs. Limiting environmental information should decrease the adaptiveness of optimizing techniques relative to a perfect information environment, and relative to boundedly rational decision rules. However, how much one must interfere with the environment to achieve this affect will gauge how profound ignorance should be in order to select for boundedly rational decision rules. Should information constraints require near or total ignorance to make boundedly rational rules more adaptive, then this would cast doubt upon the bounded rationality program. In contrast, if little perturbation is required, then the rational choice program would be questioned. The methods above can be used to explore the further effects of varying environmental structure on the performance of the rules, and gauge cycles and fractal effects.

There are many practical applications for research into coalition formation. For instance, the post-Cold War era has seen the unexpected rise of ethnic identity and strife on a global scale, even when maintaining ethnic distinctions appears counterproductive to those who maintain them. This proliferation of ethnicity poses a historical paradox. Anthropologists have proposed theories to explain, in hindsight, ethnic formation as a response to economic and political domination. However, other periods of history are marked by the collapse of ethnicity and cultural homogenization in the face of economic and political domination, considering examples as diverse as the ancient Sumerians, the Inca Empire of South America, and westward expansion in U.S. history. How can one explain the rise of ethnic coalitions today and the dissolution of ethnic coalitions in the past? To date there are no singular social theories that effectively explain both the formation and dissolution of coalitions. Research using the illustrative ABM simulation system will allow a better appreciation of both phenomena. Political machinations within nation states involve the same coalition formation, but on a smaller scale. Likewise, clique formation among teens (all-important in their lives) and alliance formation in small-scale human and non-human primate societies involve the same complex combination of strategies, levels of understanding, and chance. Therefore, the illustrative ABM simulation system described herein, based on the best understanding of the cognitive tools humans have at their disposal, can inform a very wide range of issues in the social and behavioral sciences.

Although certain illustrative embodiments have been described in detail above, variations and modifications exist within the scope and spirit of this disclosure as described and as defined in the claims.

The invention claimed is:

1. A method in a parallel processing computer system for simulating individual and social behavior, comprising:

creating a neighborhood of cells;

allocating resources to the cells;

assigning an agent to each cell;

selecting one of a plurality of decision rules for interactions between agents, wherein one of the plurality of decision rules includes a coordination game;

analyzing risk sensitivity using an analytical function $W(x) = e^{(d+ax+c\ sin(bx))}$, where $a>bc$;

iteratively conducting discrete interactions between the agents using the selected decision rule and allocated resources, wherein the discrete interactions of a first subset of the agents are conducted on a first computing device of the parallel processing computer system and the discrete interactions of a second subset of the agents are conducted on a second computing device of the parallel processing computer system; and recording interaction outcome.

2. The method of claim 1, wherein the coordination game includes a mixed strategy matrix of:

|  | Join | Defect |
| --- | --- | --- |
| Join | R, R | S, T |
| Defect | T, S | P, P | wherein payoffs include R>P=T>S.

3. The method of claim 2, wherein R=5, P=3, T=3, and S=0.

4. The method of claim 2, wherein R, P, T, and S are modified with small increases and decreases for payoff sensitivity analysis.

5. The method of claim 2, wherein P=3, T=3, S=0, and R is a random variable $\geq 3$.

6. The method of claim 1, wherein one of the plurality of decision rules includes a conformist strategy.

7. The method of claim 1, wherein one of the plurality of decision rules includes a prestige-bias strategy.

8. The method of claim 1, wherein one of the plurality of decision rules includes a modified risk posture based on at least one of a sigmoid and an expo-sigmoid function for distribution of resources among agents.

9. The method of claim 1, wherein allocating resources includes uniformly allocating resources to the cells.

10. The method of claim 1, wherein allocating resources includes allocating resources according to a function of a data set, the function including at least one of a sigmoid and an expo-sigmoidal function derived from Fourier signature analysis fit of residuals from at least one of a linear regression to the data set and a logarithm of the data set.

11. The method of claim 1, wherein the one of the plurality of decision rules includes a join probability according to a function of a data set, the function including at least one of a sigmoid and an expo-sigmoidal function derived from Fourier signature analysis fit of residuals from at least one of a linear regression to the data set and a logarithm of the data set.

12. The method of claim 1, wherein at least one of the resources and the one of a plurality of decision rules includes a function of a data set, the data set including a measure of at least one of well-being, social status, and social worth.

13. The method of claim 12, wherein the measure of at least one of well-being, social status, and social worth includes a measure of at least one of demographic data, income, net worth, wealth, personal property ownership, real estate ownership, social prestige, mortality, morbidity, marital status, family status, sex, age, education, health, literacy, human development index, geography, environmental factors, movement, communication, informational constraints, mass media, infrastructure, social services, materials, conflict, peacekeeping forces, provocateurs, influential agents, risk sensitivity, cultural norms, ethnic affiliation, ideological affiliation and kinship.

14. The method of claim 12, further comprising analyzing recorded interaction outcome.

15. The method of claim 14, wherein analyzing recorded interaction outcome includes determining an effect on risk sensitivity of the measure of at least one of well-being, social status, and social worth.

16. The method of claim 14, wherein analyzing recorded interaction outcome includes determining at least one of an individual's likelihood of taking a risk, a distribution of well-being, a distribution of social status, a distribution of social worth, a potential for social unrest due to wealth inequalities, an impact of nepotism on social unrest, an influence of class origin of insurgency members, and an influence of class origin and terrorist recruitment.

17. The method of claim 1, wherein creating a neighborhood includes mapping a grid onto a sphere, thereby providing eight neighboring cells for each cell.

18. The method of claim 1, wherein iteratively conducting discrete interactions includes one agent interacting with multiple agents in a single iteration.

19. The method of claim 1, wherein iteratively conducting discrete interactions includes an agent interacting with a non-neighboring agent.

20. The method of claim 1, wherein recording interaction outcome includes recording coalition dynamics, including at least one of coalitions, coalition size, join count, total resources, and coalition locations.

21. The method of claim 1, further comprising collecting a predetermined measure of resources from each agent after conducting each discrete interaction between the agents.

22. The method of claim 1, further comprising displaying Fourier transform of at least one of coalition size and join count.

23. A non-transitory, computer-readable medium having machine-executable code for simulating the interactions of agents, comprising:

code for creating a neighborhood of cells;

code for allocating resources to the cells;

code for assigning an agent to each cell;

code for selecting one of a plurality of decision rules for interactions between agents, wherein one of the plurality of decision rules includes a coordination game;

code for analyzing risk sensitivity using an analytical function $W(x) = e^{(d+ax+c\ sin(bx))}$, where $a>bc$;

code for iteratively conducting discrete interactions between the agents using the selected decision rule and allocated resources; and code for recording interaction outcome.

24. The non-transitory, computer-readable medium of claim 23, wherein the coordination game includes a mixed strategy matrix of:

|  | Join | Defect |
| --- | --- | --- |
| Join | R, R | S, T |
| Defect | T, S | P, P | wherein payoffs include R>P=T>S.

25. The non-transitory, computer-readable medium of claim 23, wherein one of the plurality of decision rules includes a conformist strategy.

26. The non-transitory, computer-readable medium of claim 23, wherein one of the plurality of decision rules includes a prestige-bias strategy.

27. The non-transitory, computer-readable medium of claim 23, wherein one of the plurality of decision rules includes a modified risk posture based on at least one of a sigmoid and an expo-sigmoid function for distribution of resources among agents.

28. The non-transitory, computer-readable medium of claim 23, wherein allocating resources includes allocating resources according to a function of a data set, the function including at least one of a sigmoid and an expo-sigmoidal function derived from Fourier signature analysis fit of residuals from at least one of a linear regression to the data set and a logarithm of the data set.

29. The non-transitory, computer-readable medium of claim 23, wherein the one of the plurality of decision rules includes a join probability according to a function of a data set, the function including at least one of a sigmoid and an expo-sigmoidal function derived from Fourier signature analysis fit of residuals from at least one of a linear regression to the data set and a logarithm of the data set.

30. The non-transitory, computer-readable medium of claim 23, wherein at least one of the resources and the one of a plurality of decision rules includes a function of a data set, the data set including a measure of at least one of well-being, social status, and social worth.

31. The non-transitory, computer-readable medium of claim 23, further comprising code for analyzing recorded interaction outcome.

32. The non-transitory, computer-readable medium of claim 31, wherein the analyzing recorded interaction outcome includes determining an effect on risk sensitivity of the measure of at least one of well-being, social status, and social worth.

33. The non-transitory, computer-readable medium of claim 31, wherein analyzing recorded interaction outcome includes determining at least one of an individual's likelihood of taking a risk, a distribution of well-being, a distribution of social status, a distribution of social worth, a potential for social unrest due to wealth inequalities, an impact of nepotism on social unrest, an influence of class origin of insurgency members, and an influence of class origin and terrorist recruitment.

34. The non-transitory, computer-readable medium of claim 23, wherein creating a neighborhood includes mapping a grid onto a sphere, thereby providing eight neighboring cells for each cell.

35. The non-transitory, computer-readable medium of claim 23, wherein iteratively conducting discrete interactions includes one agent interacting with multiple agents in a single iteration.

36. The non-transitory, computer-readable medium of claim 23, wherein iteratively conducting discrete interactions includes an agent interacting with a non-neighboring agent.

37. The non-transitory, computer-readable medium of claim 23, wherein recording interaction outcome includes recording coalition dynamics, including at least one of coalitions, coalition size, join count, total resources, and coalition locations.

38. The non-transitory, computer-readable medium of claim 23, further comprising code for collecting a predetermined measure of resources from each agent after conducting each discrete interaction between the agents.

* * * * *